(12) United States Patent
Ezawa et al.

(10) Patent No.: US 8,108,885 B2
(45) Date of Patent: Jan. 31, 2012

(54) DISK CARTRIDGE

(75) Inventors: Kozo Ezawa, Osaka (JP); Masahiro Inata, Hyogo (JP); Teruyuki Takizawa, Osaka (JP); Hironori Tomita, Nara (JP)

(73) Assignee: Panasonic Corporation, Osaka (JP)

( * ) Notice: Subject to any disclaimer, the term of this patent is extended or adjusted under 35 U.S.C. 154(b) by 424 days.

(21) Appl. No.: 12/374,753

(22) PCT Filed: Oct. 11, 2007

(86) PCT No.: PCT/JP2007/069884
§ 371 (c)(1),
(2), (4) Date: Jan. 22, 2009

(87) PCT Pub. No.: WO2008/044743
PCT Pub. Date: Apr. 17, 2008

(65) Prior Publication Data
US 2009/0235294 A1   Sep. 17, 2009

(30) Foreign Application Priority Data

Oct. 12, 2006  (JP) .................................. 2006-278714
Apr. 19, 2007  (JP) .................................. 2007-110249

(51) Int. Cl.
*G11B 23/03* (2006.01)
(52) U.S. Cl. ........ 720/738; 720/739; 720/740; 720/741; 720/742; 720/743
(58) Field of Classification Search .................. 720/725, 720/738, 739, 740, 741, 742, 743, 744
See application file for complete search history.

(56) References Cited

U.S. PATENT DOCUMENTS 3,788,576 A   1/1974   Buslik
4,608,681 A   8/1986   Shiosaki
(Continued)

FOREIGN PATENT DOCUMENTS

EP          1 202 269 A2    5/2002
(Continued)

OTHER PUBLICATIONS

Extended European Search Report for corresponding European Application No. 07829622.5 dated Sep. 14, 2011.
(Continued)

*Primary Examiner* — Trong Phan
(74) *Attorney, Agent, or Firm* — Renner, Otto, Boisselle & Sklar, LLP

(57) ABSTRACT

A disk cartridge includes: a pair of disk housing portions, housing a disk entirely when put together; a supporting base member with a disk housing rotating and supporting portion for rotating and supporting the housing portions to open or shut a window to the disk such that the disk gets chucked externally, and a head can access the disk and read and write information from/on the storage layer thereof, though the window; and a locking unit including a pair of locking lever portions to keep the housing portions closed from rotating and a locking lever supporting portion supporting the lever portions rotatably and attached to the base member, wherein the pair of disk housing portions open the window wide enough to remove the disk while the lock unit is not inserted into the supporting base member, and contact with the lock unit and have their angle of rotation limited while the lock unit is inserted into the supporting base member, thereby controlling the size of the window such that the disk is unremovable.

18 Claims, 48 Drawing Sheets

U.S. PATENT DOCUMENTS

| | | | |
|---|---|---|---|
| 4,695,911 A | 9/1987 | Loosen | |
| 4,740,949 A | 4/1988 | Davis | |
| 6,809,903 B2 * | 10/2004 | Bagnell et al. | 720/739 |
| 6,816,340 B2 * | 11/2004 | Oishi et al. | 720/744 |
| 6,826,773 B2 * | 11/2004 | Oishi et al. | 720/739 |
| 6,912,725 B2 * | 6/2005 | Oishi | 720/741 |
| 7,086,074 B2 * | 8/2006 | Oishi | 720/740 |
| 7,340,753 B2 * | 3/2008 | Inata et al. | 720/742 |
| 7,526,782 B2 * | 4/2009 | Kurita et al. | 720/740 |
| 7,673,311 B2 * | 3/2010 | Okazawa et al. | 720/738 |

FOREIGN PATENT DOCUMENTS

| | | |
|---|---|---|
| GB | 1 488 273 A | 10/1977 |
| JP | 62-003477 | 1/1987 |
| JP | 63-153373 | 10/1988 |
| JP | 64-23776 | 2/1989 |
| JP | 09-153264 | 6/1997 |
| JP | 09-213044 | 8/1997 |
| JP | 11-219575 | 8/1999 |
| JP | 2001-035119 | 2/2001 |
| JP | 2007-513450 | 5/2007 |
| WO | 2005/055234 | 6/2005 |
| WO | 2005/055234 A1 | 6/2005 |

OTHER PUBLICATIONS

International Search Report for corresponding Application No. PCT/JP2007/069884 mailed Nov. 13, 2007.

* cited by examiner (a)

(b)

(a)

(b)

(a)

(b)

(a)

(b)

(c)

(a)

(b)

(a)

(b)

(a)

(b)

(a)

(b)

(a)

(a)

(b)

(a)

(b)

(a)

(b)

DISK CARTRIDGE

TECHNICAL FIELD

The present invention relates to a disk cartridge for housing a disklike data storage medium such as an optical disk or a magnetic disk.

BACKGROUND ART

Various disklike data storage media, including CDs and DVDs to read and write data using a light beam, Floppy™ disks to read and write data using magnetism, and MOs and MDs to read and write data using a light beam and magnetism in combination, have already been used extensively around the world. Among other things, DVD-RAMs, MOs and other rewritable media are housed in a protective casing such as the one disclosed in Patent Document No. 1 in order to protect the data stored there.

FIG. 47 is a perspective view schematically illustrating the disk cartridge that is disclosed in Patent Document No. 1. As shown in FIG. 47, the disk cartridge 100 includes a supporting base member 101 that houses a disk 10, which is a read-only or rewritable data storage medium, and that forms the outer shell of the disk cartridge 100.

The supporting base member 101 consists of an upper housing 101a and a lower housing 101b, which are joined together to store the disk 10 inside.

The supporting base member 101 has a window 101w to allow some means for rotating the disk 10 (such as a spindle motor) and read/write means such as an optical head to enter the supporting base member 101 and access the disk 10. The window 101w has been cut through the principal surfaces of the upper and lower housings 101a and 101b and the disk 10 housed in the supporting base member 101 is exposed through the window 101w.

The disk cartridge 100 includes a cartridge shutter 103 that has been folded in a C-shape to close the window 101w on the upper and lower surfaces of the supporting base member 101 and to sandwich the supporting base member 101 and protect the data side of the disk 10 to be exposed inside the window 101w.

The cartridge shutter 103 can move parallel in the direction indicated by the arrow P in FIG. 47 and is biased by a spring so as to keep the window 101w closed. Thus, this disk cartridge 100 is designed so as not to expose the disk 10 inside the window 101w unless some external force is applied to the cartridge shutter 103.

The supporting base member 101 further includes a bridge portion 104 that bridges an outer side of the window 101w. The bridge portion 104 not only maintains the rigidity of the supporting base member 101 but also guides the cartridge shutter 103 in the direction indicated by the arrow P.

With this cartridge shutter 103, the disk cartridge 100 prevents dust from entering the disk cartridge 100 being carried through the window 101w and also prevents the user from leaving a fingerprint on the disk 10.

To load this disk cartridge 100 into a disk drive and to read/write data from/on the disk 10, the disk needs to be clamped and rotated by the spindle motor and the optical head needs to access the disk 10. For that purpose, as the disk cartridge 100 being inserted into the disk drive goes in the direction indicated by the arrow Q, the notched portion 103a of the cartridge shutter 103 gets engaged with the protrusion 104a of a shutter opener 104 and the shutter opener 104 is turned around the center of rotation 104b in the direction indicated by the arrow R, thereby sliding the cartridge shutter 103 in the direction indicated by the arrow P as shown in FIG. 48. As a result, the cartridge shutter 103 can be opened and the disk 10 can be exposed through the window 101w.

Patent Document No. 1: Japanese Patent Application Laid-Open Publication No. 9-153264

DISCLOSURE OF INVENTION

Problems to be Solved by the Invention

In the disk cartridge 100 described above, however, the cartridge shutter 103 has a C-folded shape. For that reason, unless a high-precision machining process is carried out, it is difficult to mass-produce the cartridge shutters 103 with little shape error. Thus, the manufacturing costs should go up to get that done. On top of that, although there has been a growing trend in recent years toward products with a reduced thickness, it is difficult to reduce the thickness of the cartridge shutter 103 with such a structure.

In addition, if a cartridge shutter 103 with such a structure is used, it is also difficult to reduce the gap between the cartridge shutter 103 and the supporting base member 101. For that reason, it is hard to entirely prevent dust, which could affect a read or write operation to be performed on the disk 10, from entering the supporting base member 101.

Besides, it is also difficult to thicken the plate material to make the cartridge shutter 103 due to a restriction on the thickness of the disk cartridge 100, and therefore, the cartridge shutter 103 should have a fragile structure. That is why if the disk cartridge 100 were subjected to any impact or trodden by mistake, devastating damage could be done to the information storage layer of the disk.

Also, in the disk cartridge 100 with such a structure, the bridge portion 104 needs to be arranged as a guide for opening and closing the cartridge shutter 103 on either the upper housing 101a or the lower housing 101b so as to bridge the window 101w. That is why if the optical head to access the disk 10 were thick in the height direction, then the head would be obstructed by the bridge portion 104 and unable to access the disk 10.

Furthermore, the cartridge shutter 103 performs its opening and closing operations just linearly. That is why if the outer dimensions of the disk cartridge 103 are reduced to house a small disk there, then the area of the window 101w will be very small. For that reason, if such a small cartridge should be used in a device of a small size or a disk video camera, the size of the head should also be very small, thus producing a problem in designing such a head.

Also, to load the disk cartridge 100 into a disk drive and get a read/write operation performed on the rotating disk 10 by the drive, a space that would allow the disk cartridge 100 some positioning error in the disk drive should be left inside the supporting base member 101. That is why the disk 10 can move freely within that space that would allow the positioning error inside the supporting base member 101 without being held by the disk cartridge 100. As a result, the disk 10 will loosen and rattle inside the supporting base member 101, thus possibly getting the information storage layer of the disk 10 scratched or producing particles due to a collision between the disk 10 and the inner walls of the supporting member 101 and depositing the particles on the disk 10.

Furthermore, in making the disk cartridge 100, the manufacturing process of the disk 10 and the processes of making respective members to form the disk cartridge 100 and assembling those members into the disk cartridge 100 have big differences in manufacturing and processing methods, the type of tests and so on. Meanwhile, to get the disk 10 housed inside the supporting base member 101, the disk 10 should be inserted while the upper and lower housings 101a and 101b are merged together. That is to say, the disk 10 needs to be inserted during the manufacturing process of the disk cartridge 100. That is why it is impossible to perform the manufacturing process of the disk 10 itself and the assembling process of the disk cartridge 100 itself in two different places totally separately from each other. As a result, the manufacturing costs cannot be cut down, which is a problem.

In order to overcome at least one of the problems described above, the present invention has an object of providing a disk cartridge that can open a big head access window even though its overall size is small. Another object of the present invention is to provide a disk cartridge that can be made by performing the manufacturing process of a disk and a disk cartridge assembling process in two different places.

Means for Solving the Problems

A disk cartridge according to the present invention includes: first and second disk housing portions, each of which defines a space to house a portion of a disk with an information storage layer on at least one side thereof and which house the disk in its entirety when put together; a supporting base member that has a disk housing rotating and supporting portion for rotating and supporting the first and second disk housing portions so as to open or shut a window with respect to the disk such that the disk gets chucked externally, and a head is able to access the disk and read and write information from/on the information storage layer thereof, though the window; and a locking unit, which includes first and second locking lever portions for keeping the first and second disk housing portions closed from rotating and a locking lever supporting portion that supports the first and second locking lever portions rotatably and that is attached to the supporting base member. The supporting base member has an insertion port to insert the locking unit. While the locking unit is yet to be inserted into the supporting base member through the insertion port, the first and second disk housing portions open the window to such an angle of rotation that is wide enough to remove the disk easily. But with the locking lever supporting portion inserted into the supporting base member through the insertion port, the first and second disk housing portions contact with the locking unit and have their angle of rotation limited, thereby controlling the size of the window such that the disk is unremovable.

In one preferred embodiment, while being inserted into the supporting base member through the insertion port, the locking unit rotates the first and second disk housing portions while contacting with parts of the first and second disk housing portions, thereby shutting the window.

In this particular preferred embodiment, the insertion port of the supporting base member has a substantially rectangular shape, and the locking lever supporting portion of the supporting base member includes a body that closes the insertion port fully when the locking unit is inserted into the supporting base member.

In a specific preferred embodiment, the supporting base member includes a first pair of catching portions in the vicinity of both ends of the body in the longitudinal direction thereof, and the locking lever supporting portion includes a first pair of latching portions that engages with the first pair of catching portions when the locking unit is inserted into the supporting base member.

In a more specific preferred embodiment, the supporting base member includes a second pair of catching portions around the center of the body in the longitudinal direction thereof, and the locking lever supporting portion includes a second pair of latching portions that engages with the second pair of catching portions when the locking unit is inserted into the supporting base member.

In an even more specific preferred embodiment, the locking lever supporting portion is made of an elastic material, and by inserting the locking lever supporting portion into the supporting base member through the insertion port while deforming the locking lever supporting portion elastically, the first and second pairs of latching portions get engaged with the first and second pairs of catching portions, respectively.

In still another preferred embodiment, each of the first and second locking lever portions includes an elastic portion that produces biasing force in the rotating direction thereof.

In this particular preferred embodiment, the first and second locking lever portions and the locking lever supporting portion form an integral member and each of the first and second locking lever portions is secured to the locking lever supporting portion so as to turn on a hinge portion.

In a specific preferred embodiment, the supporting base member has a positioning hole to position the supporting base member externally, and the locking lever supporting portion includes a cover portion that covers the positioning hole such that a recess that has the positioning hole as an open bottom is defined when the locking unit is inserted into the supporting base member.

In a more specific preferred embodiment, the supporting base member overlaps at least partially with the first and second disk housing portions so as to prevent the first and second disk housing portions from moving perpendicularly to the disk.

Another disk cartridge according to the present invention includes: first and second disk housing portions, each of which defines a space to house a portion of a disk with an information storage layer on at least one side thereof and which house the disk in its entirety when put together; a supporting base member that has a disk housing rotating and supporting portion for rotating and supporting the first and second disk housing portions so as to open or shut a window with respect to the disk such that the disk gets chucked externally, and a head is able to access the disk and read and write information from/on the information storage layer thereof, though the window; and a locking member for keeping the first and second disk housing portions closed from rotating. The supporting base member has at least one side surface that crosses, at right angles, a line segment that connects together the respective centers of rotation of the first and second disk housing portions. The side surface runs parallel to the disk housed in the first and second disk housing portions and has a main groove that includes a bottom, an opening on the bottom, and a protrusion on the bottom. The locking member includes a locking/unlocking portion for unlocking the first and second disk housing portions externally. The locking/unlocking portion protrudes through the opening of the main groove to first and second levels when the first and second disk housing portions are locked and when the first and second disk housing portions are unlocked, respectively. The second level is lower than the first level. A level reached by the protrusion on the bottom of the main groove is lower than the first level but higher than the second level.

In one preferred embodiment, the protrusion is located in the vicinity of an end of the main groove.

In this particular preferred embodiment, the protrusion has a sloped surface that tilts non-perpendicularly to the bottom of the main groove.

A disk drive according to the present invention can be loaded with a disk cartridge according to any of the preferred embodiments of the present invention described above. The drive includes: a cartridge holder for holding the disk cartridge, the holder having a holder opening to externally insert the disk cartridge into the cartridge holder and eject the disk cartridge out of the cartridge holder; a pair of guide walls, which is arranged in the vicinity of the holder opening of the cartridge holder to define a direction in which the disk cartridge is inserted; a disk motor for mounting and rotating the disk thereon; a head for reading and/or writing information from/on the disk; and a base for supporting the head and the disk motor. An unlocking portion, which is arranged on the guide walls, presses the locking/unlocking portion, thereby unlocking the first and second disk housing portions.

In one preferred embodiment, while the disk cartridge is being inserted into the cartridge holder to open the first and second disk housing portions, the unlocking portion goes inside the main groove and contacts with the protrusion in the main groove, thereby defining how deep the disk cartridge is inserted into the cartridge holder.

In this particular preferred embodiment, the disk cartridge has two side surfaces, only one of which has the main groove. The unlocking portion is arranged on only one of the two guide walls. And the minimum width of an interval between the unlocking portion and the other guide wall with no unlocking portions is smaller than the width of an interval between the top of the protrusion on the main groove and the other side surface with no main grooves.

In another preferred embodiment, the disk cartridge has two side surfaces, each of which has the main groove. The unlocking portion is arranged on each of the two guide walls. The minimum width of a width controlling guide portion, including the unlocking portions, is smaller than the width of an interval between the respective tops of the protrusions on the two main grooves.

In still another preferred embodiment, the unlocking portion is a rib that has tapered sides, which are tilted with respect to directions in which the disk cartridge is inserted and ejected, on both ends.

A disk cartridge manufacturing process according to the present invention is a method of making a disk cartridge, which includes: first and second disk housing portions, each of which defines a space to house a portion of a disk with an information storage layer on at least one side thereof and which house the disk in its entirety when put together; a supporting base member that has a disk housing rotating and supporting portion for rotating and supporting the first and second disk housing portions so as to open or shut a window with respect to the disk such that the disk gets chucked externally, and a head is able to access the disk and read and write information from/on the information storage layer thereof, though the window; and a locking member, which includes first and second locking lever portions for keeping the first and second disk housing portions closed from rotating and a locking lever supporting portion that supports the first and second locking lever portions rotatably and that is attached to the supporting base member. The supporting base member has an insertion port to insert the locking member. Unless the locking member is inserted into the supporting base member through the insertion port, the first and second disk housing portions open the window to such an angle of rotation that is wide enough to remove the disk easily. But with the locking lever supporting portion inserted into the supporting base member through the insertion port, the first and second disk housing portions contact with the locking member and have their angle of rotation limited, thereby controlling the size of the window such that the disk is unremovable. The method includes the steps of: (A) providing a supporting base member on which first and second disk housing portions are supported rotatably; (B) holding the supporting base member such that the first and second disk housing portions are opened to an angle of rotation that is wide enough to remove the disk; (c) inserting the disk into the disk cartridge through the window defined by the first and second disk housing portions; and (D) inserting the locking member into the supporting base member.

In one preferred embodiment, the steps (A), (B), (C) and (D) are performed with the supporting base member, on which the first and second disk housing portions are supported, standing upright and facing downward.

In another preferred embodiment, in the step (B), the first and second disk housing portions are rotated by gravity.

In still another preferred embodiment, in the step (D), the locking member is inserted while being deformed elastically.

EFFECTS OF THE INVENTION

The disk cartridge of the present invention has no conventional housing, which defines the profile of the cartridge in the prior art, but includes a pair of disk housing portions that not only defines the profile of the cartridge but also functions as shutters as well. When opened, the pair of disk housing portions can define a big head access window that does not have the guide portion, which should be arranged in the window of a conventional disk cartridge with a shutter to guide the shutter on the move. Consequently, even a cartridge of a small size can open as big a head access window as a cartridge of a large size. In addition, since the disk cartridge of the present invention includes a supporting base member that partially overlaps with the pair of disk housing portions, a steady disk cartridge that sufficiently resists a deformation perpendicularly to the disk housed there is realized.

In addition, a locking member, which not only controls the angle of the window defined by the disk housing portions but also keeps the disk housing portions in the closed state from rotating, can be inserted after the disk housing portions and the supporting base member, consisting of the supporting base portions, have been assembled together. For that reason, even after the supporting base member has been assembled, the disk housing portions can also be opened wide enough to readily remove the disk from the disk cartridge. That is why after the supporting base member has been assembled, the disk may be inserted, and the assembling process of the disk cartridge can be completed by inserting the locking member through the insertion port of the supporting base member. As a result, the disk manufacturing process and the disk cartridge assembling process can be totally separated from each other. Consequently, a disk cartridge manufacturing process can be carried out with the disk manufacturing process and the disk cartridge assembling process, which have significantly different process and testing methods, performed in two different places, thus increasing the degree of flexibility of the manufacturing process and cutting down the manufacturing costs significantly.

Besides, the disk cartridge of the present invention can prevent the user from inserting the disk cartridge wrong end first, i.e., opposite to the proper inserting direction, into the disk drive. That is to say, it is possible to avoid an unwanted situation where the disk cartridge is inserted wrong end first, the unlocking portions of the disk drive reach the locking/unlocking portions to unlock the locking members that keep the disk housing in the closed state, and the disk housing is opened with the disk side sticking out of the disk drive.

Figure 1:
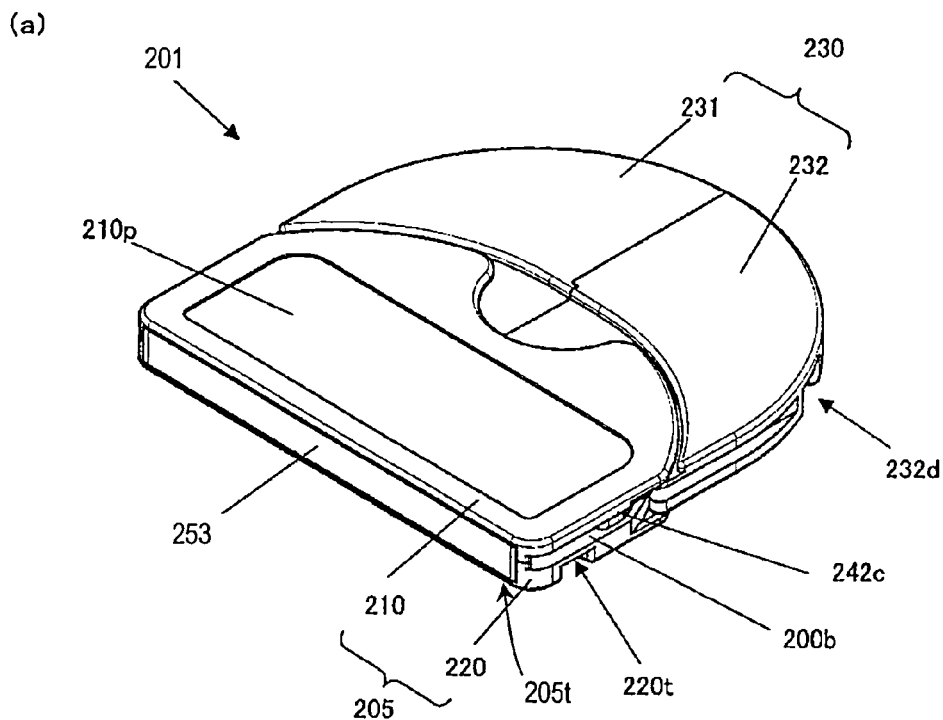
FIGS. 1(a) and 1(b) are perspective views illustrating how the upside of a disk cartridge as a first preferred embodiment of the present invention looks when its disk housing is closed and when its disk housing is opened, respectively.
Figure 1:
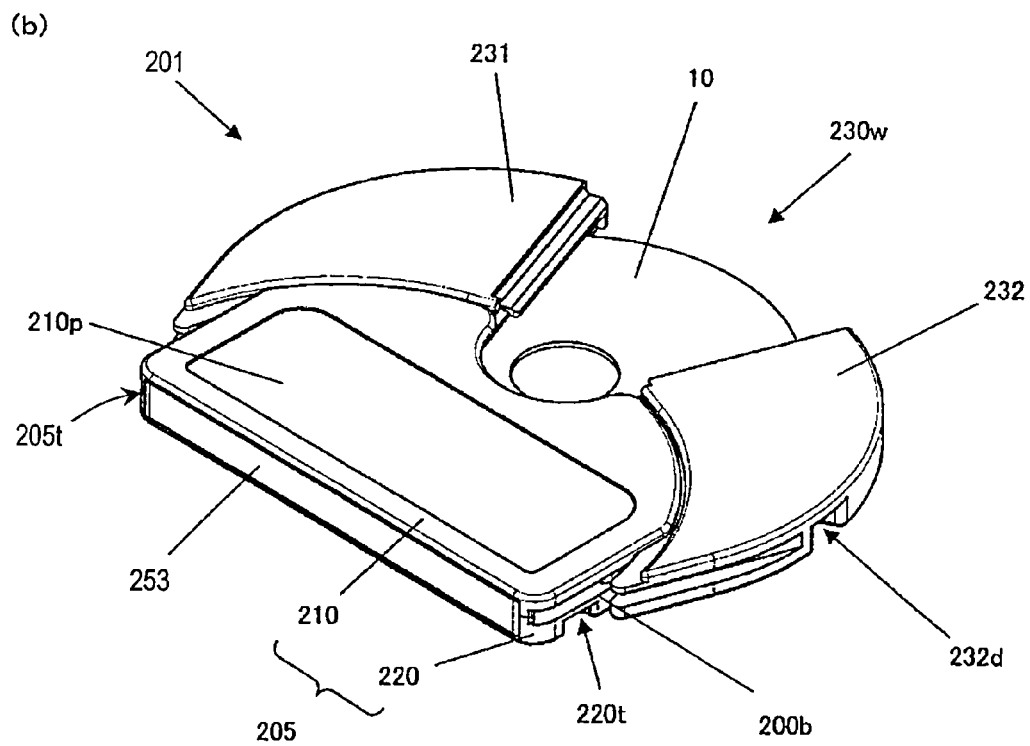

DESCRIPTION OF REFERENCE NUMERALS 10, 910 disk
201, 201', 202, 202', 203 disk cartridge
205 supporting base member
210 upper supporting base portion
220 lower supporting base portion
230 disk housing
230w window
231 first disk housing portion
232 second disk housing portion
241 first locking lever portion
242 second locking lever portion
250 locking lever supporting portion
253 locking unit
500 disk drive
720 traverse base
720a shaft hole
720b shaft hole
721 positioning pin
721a bearing surface
722 positioning pin
722a bearing surface
730 spindle motor
730a turntable
740 optical head
741 first guide shaft
742 second guide shaft
760 cartridge holder
760a pivot
760b pivot
761a guide wall
761b guide wall
762a first unlocking portion
762b second unlocking portion
762c first positioning contact portion
763a clearance hole
763b clearance hole
781 shaft screw
782 shaft screw
800 cartridge stand
801 multiple cartridge stands
830 supporting wall
840 supporting wall
850 guide rib
860 guide rib
851 first opening/closing lever
851a pivot hole
851c engaging portion
852 second opening/closing lever
852a pivot hole
852c engaging portion
853 first lever biasing spring
854 second lever biasing spring
900A window
920 first disk housing portion
920A first housing portion groove
921 first disk housing portion upper shell
922 first disk housing portion lower shell
922A pivot hole
922B notch
922C engaging portion
922D first latching portion
930 second disk housing portion
930A second housing portion groove
931 second disk housing portion upper shell
932 second disk housing portion lower shell
932A pivot hole
932B notch
932C engaging portion
932D second latching portion
940 supporting base member
940AL left body groove
940AR right body groove
940BR right wall
940CL first positioning hole
940CR second positioning hole
940DL first notch
940DR second notch
941 upper supporting base portions
942 lower supporting base portions
942A first pivot
942B second pivot
942C first pivot 942D second pivot
947L left protrusion
947La top of sub-groove
947Lb sub-groove portion
947R right protrusion
947Rb sub-groove portion
949L left outer surface
950 first locking member
951 first locking pivot hole
952 first locking/unlocking portion
953 latching lever portion
954 first elastic portion
960 second locking member
961 second locking pivot hole
962 second locking/unlocking portion
963 latching lever portion
964 second elastic portion

BEST MODE FOR CARRYING OUT THE INVENTION

Embodiment 1

Hereinafter, a First Preferred Embodiment of the present invention will be described in detail with reference to the accompanying drawings. First of all, the configuration and structure of a disk cartridge as a first preferred embodiment of the present invention will be described with reference to FIGS. 1 to 3.

Figure 2:
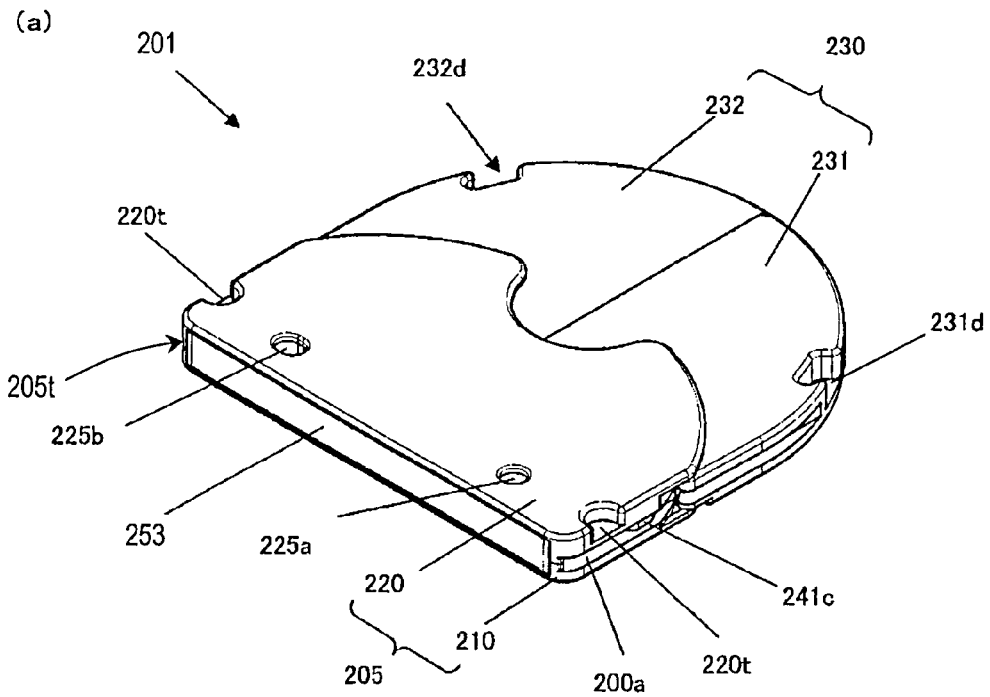
FIGS. 2(a) and 2(b) are perspective views illustrating how the downside of the disk cartridge as the first preferred embodiment of the present invention looks when its disk housing is closed and when its disk housing is opened, respectively.
Figure 2:
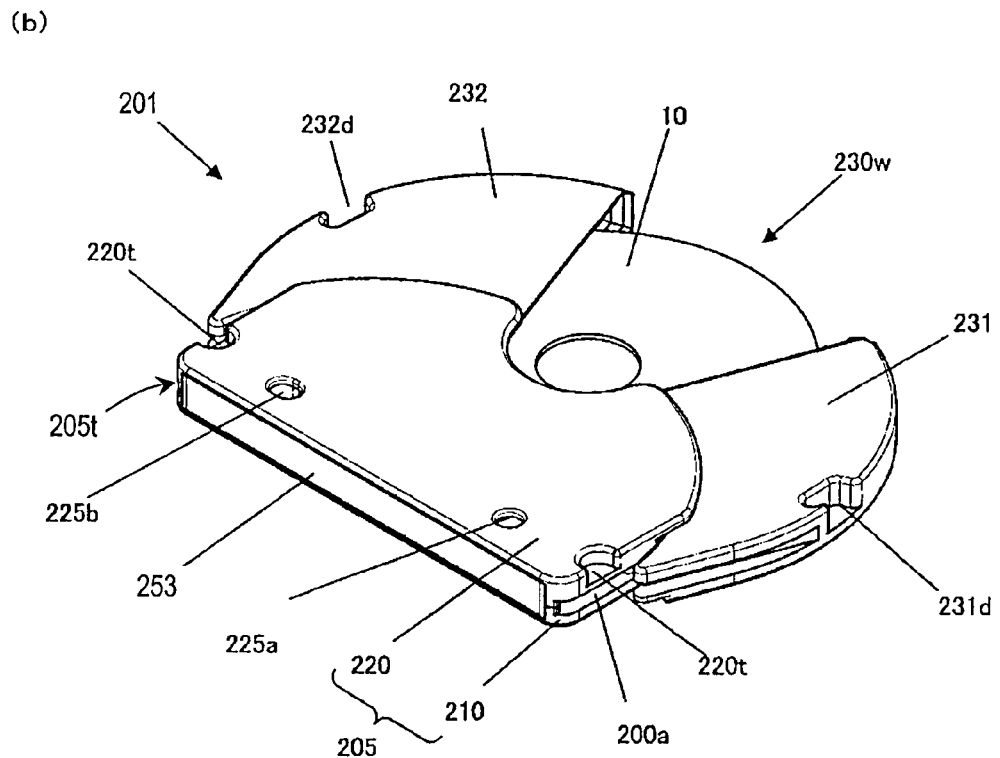
Figure 3:
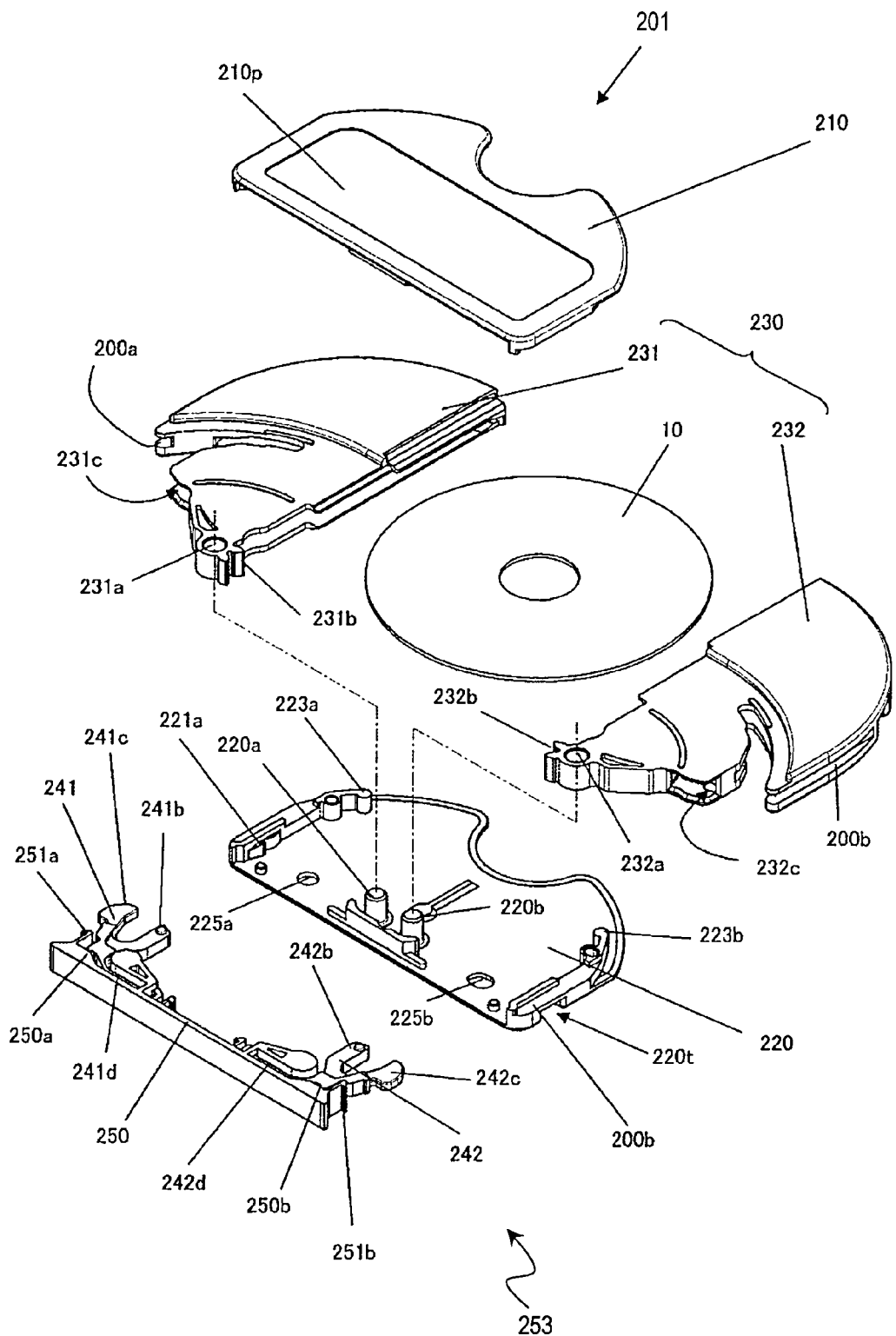
FIG. 3 is an exploded perspective view illustrating the structure of the disk cartridge as the first preferred embodiment of the present invention.

FIG. 1 shows perspective views illustrating the general appearance of a disk cartridge 201. Specifically, FIG. 1(a) illustrates how the disk cartridge 201 looks when its disk housing 230 is closed, and FIG. 1(b) illustrates how the disk cartridge 201 looks when the disk housing 230 is opened. On the other hand, FIG. 2 shows perspective views illustrating the general appearance of the disk cartridge 201 as viewed from above the lower side thereof. Specifically, FIG. 2(a) illustrates how the disk cartridge 201 looks when its disk housing 230 is closed, and FIG. 2(b) illustrates how the disk cartridge 201 looks when the disk housing 230 is opened. And FIG. 3 is an exploded perspective view illustrating respective members that form the disk cartridge 201.

As shown in these drawings, the disk cartridge 201 includes first and second disk housing portions 231 and 232, which form the disk housing 230, and a supporting base member 205. The supporting base member 205 consists of an upper supporting base portion 210 and a lower supporting base portion 220. By joining these portions together, the first and second disk housing portions 231 and 232 can be partially sandwiched and supported rotatably. As shown in FIGS. 1 and 2, the disk housing 230, which is partially exposed from the supporting base member 205, and the supporting base member 205 together form the outer shell of the disk cartridge 201.

As described above, the disk housing 230 is composed of the first and second disk housing portions 231 and 232, each of which has a baglike space that defines a gap in the thickness direction of the disk 10 and that is big enough to house a portion of the disk 10. As shown in FIGS. 1(a) and 2(a), when the disk housing 230 is closed, the first and second disk housing portions 231 and 232 are merged together with the edges of their baglike openings fitted closely into each other. In this manner, the disk 10 can be housed in its entirety so as not to be exposed at all.

As shown in FIGS. 1(b) and 2(b), when the disk housing 230 is opened, a substantially fan-shaped window 230w is created by the supporting base member 205 and the disk housing 230 to allow a spindle motor, clamper and other members for rotating the disk 10 to chuck and rotate the disk 10 and also allow a read/write head to enter the disk cartridge 201 and access the disk 10 from outside of the disk cartridge 201.

Therefore, the disk housing 230 functions not only as a housing, or an outer shell for the disk cartridge 201, but also as shutters for opening and shutting the window 230w.

It should be noted that the function of covering and uncovering the disk 10 with respect to an external member could also be performed by the first and second disk housing portions 231 and 232 alone, theoretically speaking. In a structure with only the first and second disk housing portions 231 and 232, however, if disturbance forces were applied perpendicularly to the disk 10 and in mutually opposite directions to the first and second disk housing portions 231 and 232 in the closed state, then some torsional force would be produced to cause significant deformation or damage.

To overcome these problems, the disk cartridge 201 includes the supporting base member 205, which overlaps at least partially with the first and second disk housing portions 231 and 232 so as to prevent the first and second disk housing portions 231 and 232 from moving perpendicularly to the disk 10. Then, even if any torsional force were applied to the first and second disk housing portions 231 and 232, it would be still possible to prevent the first and second disk housing portions 231 and 232 from being deformed at least in the portions that are sandwiched by the supporting base member 205. As a result, the steadiness of the overall disk cartridge 201 can be increased. Optionally, as will be described in detail later, a locking structure for preventing the first and second disk housing portions 231 and 232 closed from rotating may also be provided.

Furthermore, the supporting base member 205 stands still even while the disk housing 230 is being opened or closed. That is why when the user inserts the cartridge 201 into a disk drive, the supporting base member 205 can function as a holder portion to be held by the user with his or her hands. On top of that, the upper supporting base portion 210 may have a label affixing depressed portion 210p, to which a piece of label sticker showing the contents of information stored in the disk 10 can be affixed. In this manner, the contents of the information stored in the disk 10 that is housed in the disk cartridge 201 can be shown.

The bigger the area of overlap between the supporting base member 205 and the first and second disk housing portions 231 and 232, the greater the degree of steadiness of the disk cartridge 201. However, if the supporting base member 205 reached the head access window beyond the center of the disk 10 that is housed in the first and second disk housing portions 231 and 232 in the closed state, then the window to be defined when the first and second disk housing portions 231 and 232 are opened would be covered by the supporting base member 205. For that reason, the supporting base member 205 preferably covers a part of the disk 10 that is closer to the rotating and supporting portion of the first and second disk housing portions 231 and 232 with respect to the center of the disk 10 that is housed in the first and second disk housing portions 231 and 232 in the closed state.

As shown in FIG. 2, the lower supporting base portion 220 has positioning holes 225a and 225b to position the disk cartridge 201 on a plane that is parallel to the disk 10 in a disk drive (not shown).

Also, the lower supporting base portion 220 has notches 220t on both sides thereof. These notches 220t may be used to prevent the user from loading the disk cartridge 201 upside down in a tray loading system or to hold the disk cartridge 201 in a slot loading system, for example.

As shown in FIG. 3, the first and second disk housing portions 231 and 232 have pivot holes 231a and 232a, respectively, into which pivots 220a and 220b on the lower supporting base portion 220 are respectively inserted, thereby supporting the first and second disk housing portions 231 and 232 rotatably such that these housing portions 231 and 232 can turn around the pivots 220a and 220b, respectively.

The first and second disk housing portions 231 and 232 further have engaging portions 231b and 232b that engage and interlock with each other. By interlocking these engaging portions 231b and 232b with each other, the first and second disk housing portions 231 and 232 can turn in mutually opposite directions and synchronously with each other.

Also, as shown in FIGS. 1 and 2, the first and second disk housing portions 231 and 232 have notches 231d and 232d, which can be used to open or close the disk housing 230 externally.

The disk cartridge 201 further includes a locking unit 253. As will be described in detail later, the locking unit 253 is made up of members that are provided separately from the supporting base member 205. The locking unit 253 is integrated with the supporting base member 205 by being inserted into the insertion port 205t of the supporting base member 205 and prevents the first and second disk housing portions 231 and 232 in the closed state from rotating.

As shown in FIG. 3, the locking unit 253 includes a locking lever supporting portion 250 and first and second locking lever portions 241 and 242. In this preferred embodiment, the first and second locking lever portions 241 and 242 are secured to the locking lever supporting portion 250 with rotating hinge portions 250a and 250b, respectively, and the locking lever supporting portion 250 and the first and second locking lever portions 241 and 242 have been formed as an integral member.

The first locking lever portion 241 includes a latching lever portion 241b, an opener/closer 241c and an elastic portion 241d. The latching lever portion 241b fits into the catching portion 231c of the first disk housing portion 231 (see FIG. 6), thereby preventing the first disk housing portion 231 from turning in the opening direction while the disk housing 230 is closed. If the opener/closer 241c is pressed down externally, the first locking lever portion 241 can be biased so as to turn on the rotating hinge portion 250a. And the elastic portion 241d (see FIG. 5) deforms elastically while overcoming the biasing force applied by the opener/closer 241c, thereby producing biasing force in the first locking lever portion 241.

Likewise, the second locking lever portion 242 includes a latching lever portion 242b, an opener/closer 242c and an elastic portion 242d. The latching lever portion 242b gets engaged with the catching portion 232c of the second disk housing portion 232 (see FIG. 6), thereby preventing the second disk housing portion 232 from turning in the opening direction while the disk housing 230 is closed. If the opener/closer 242c is pressed down externally, the second locking lever portion 242 can be biased so as to turn on the rotating hinge portion 250b. And the elastic portion 242d (see FIG. 5) deforms elastically while overcoming the biasing force applied by the opener/closer 242c, thereby producing biasing force in the second locking lever portion 242.

By forming the locking lever supporting portion 250 and the first and second locking lever portions 241 and 242 as an integral member as described above, the rotating hinge portions 250a and 250b can function as hinges and the elastic portions 241d and 242d are given elasticity.

Furthermore, the disk cartridge 201 has unlocking grooves 200a and 200b for operating the first and second locking lever portions 241 and 242 on the right- and left-hand sides thereof.

The openers/closers 241c and 242c of the first and second locking lever portions 241 and 242 are designed so as to protrude through the openings at the bottom of the unlocking grooves 200a and 200b, respectively, but not to stick out of the outer shell of the disk cartridge 201. That is to say, the protrusion level of the openers/closers 241c and 242c as measured from the bottom of the unlocking grooves 200a and 200b is short of the depth of the unlocking grooves 200a and 200b. That is why normally a person who handles the disk cartridge 201 cannot easily press the openers/closers 241c and 242c with his or her fingers. In this manner, it is possible to prevent the user from unlocking the disk housing 230 intentionally and carelessly.

Next, the supporting base member 205 and the locking unit 253 will be described with reference to FIGS. 4 and 5.

Figure 4:
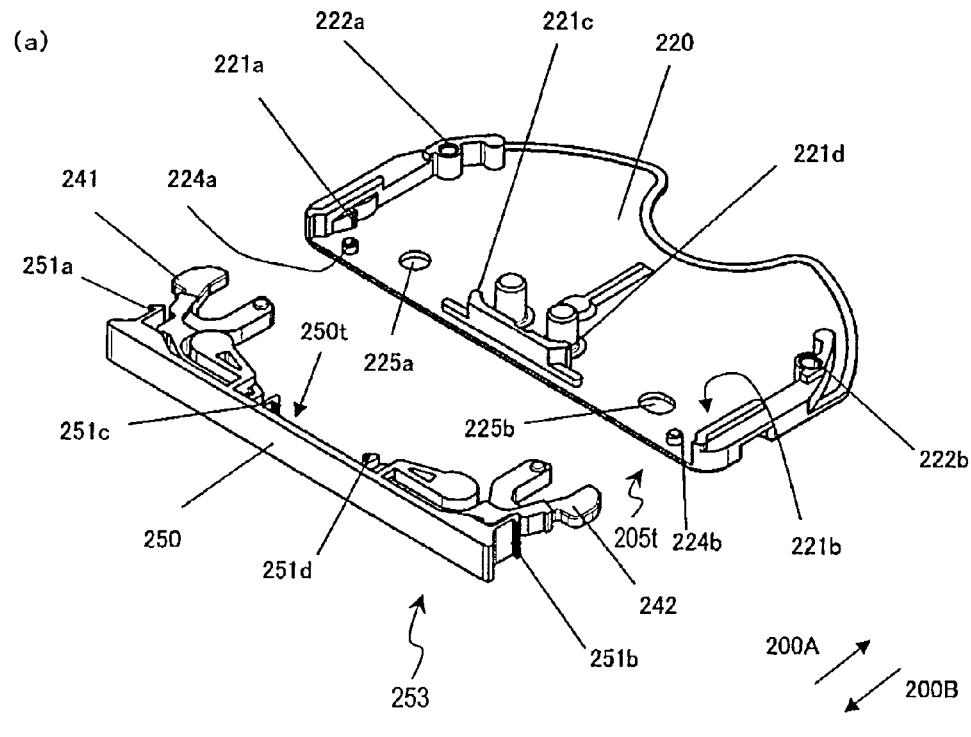
FIGS. 4(a) and 4(b) are perspective views illustrating locking members along with the lower supporting base portion and the upper supporting base portion, respectively, in the disk cartridge as the first preferred embodiment of the present invention.
Figure 4:
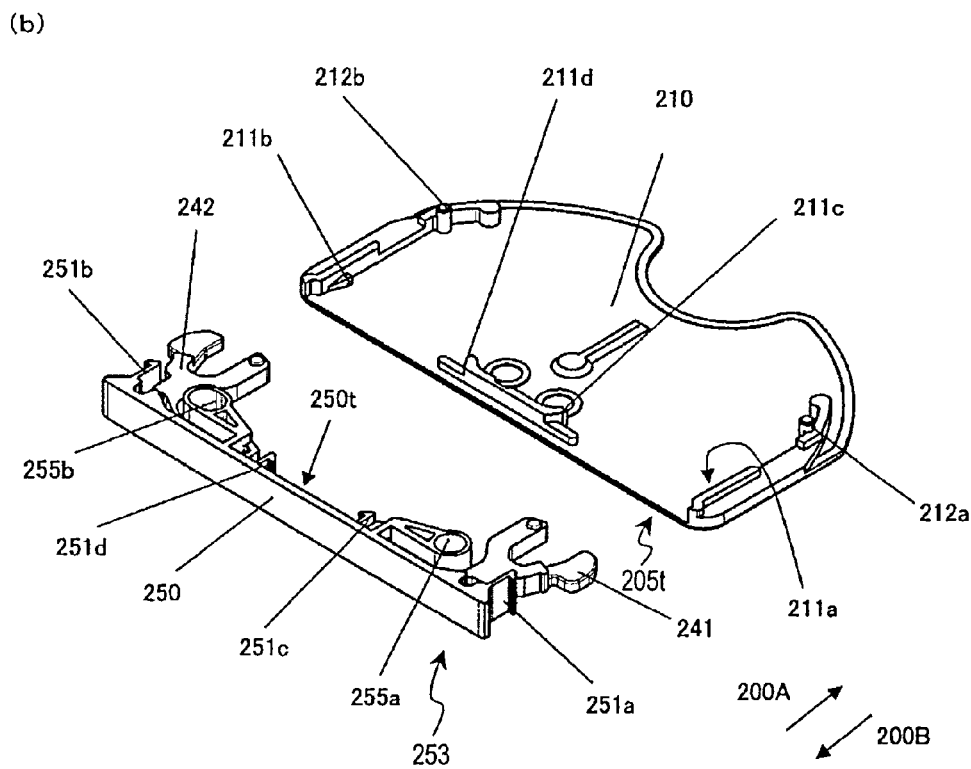

FIG. 4 shows perspective views illustrating the structures of the locking unit 253 and the supporting base member 205. Specifically, FIG. 4(a) illustrates the lower supporting base portion 220 and the locking unit 253, while FIG. 4(b) illustrates the upper supporting base portion 210 and the locking unit 253.

Figure 5:
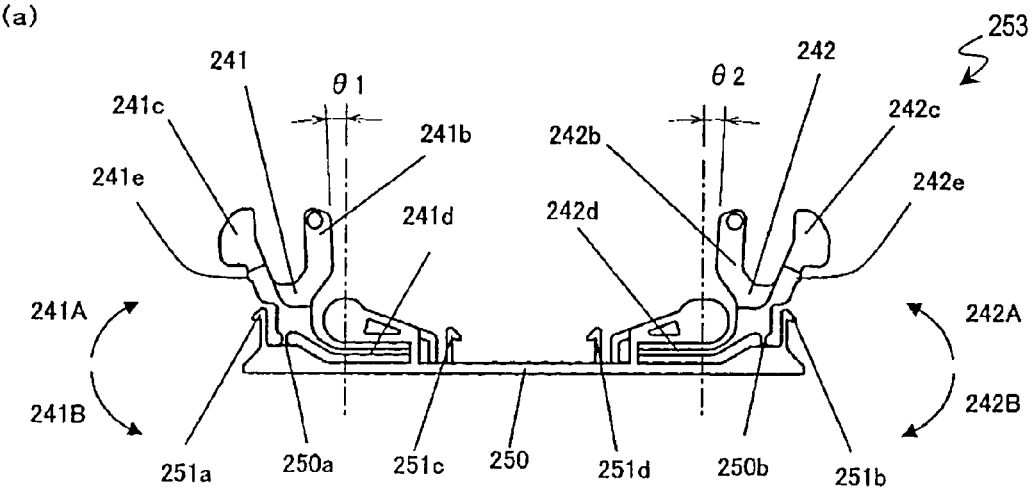
FIGS. 5(a), 5(b) and 5(c) are plan views illustrating the positions of the locking members in the disk cartridge as the first preferred embodiment of the present invention when the locking members are yet to be inserted into the supporting base member, they have just been inserted into the supporting base member, and the locking lever portions are turning, respectively.
Figure 5:
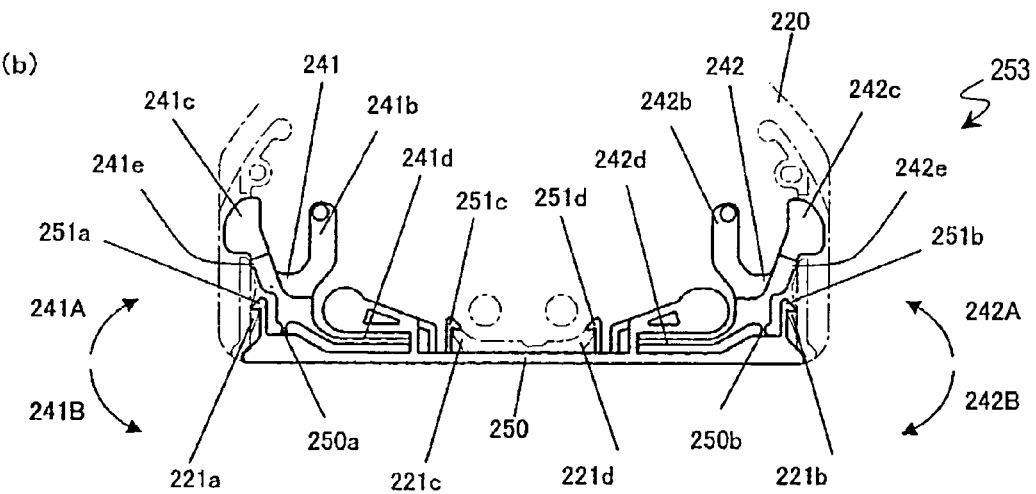
Figure 5:
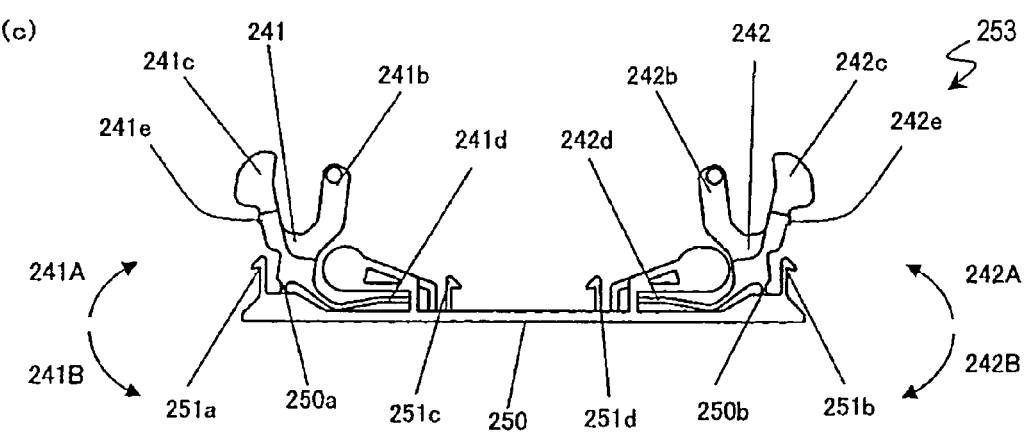

FIG. 5 shows plan views illustrating the structure of the locking unit 253. Specifically, FIG. 5(a) illustrates the position of the locking unit 253 yet to be fitted into the supporting base member 205. FIG. 5(b) illustrates the position of the locking unit 253 that has already been fitted into the supporting base member 205. And FIG. 5(c) illustrates the position of the locking unit 253 while the first and second locking lever portions 241 and 242 are turning.

As shown in FIG. 4, the locking lever supporting portion 250 of the locking unit 253 includes a body 250t, a first pair of latching claw portions 251a and 251b, and a second pair of latching claw portions 251c and 251d. The body 250t has a substantially rectangular shape corresponding to that of the insertion port 205t of the supporting base member 205. When the locking unit 253 is inserted into the insertion port 205t of the supporting base member 205, the body 250t covers the insertion port 205t fully. However, the body 250t is just a substantially rectangular plate with no reinforcing ribs and is easily deformable elastically. That is why when the locking unit 253 is inserted into the insertion port 205t of the supporting base member 205, the body 250t is deformed elastically to flex the entire locking unit 253. As a result, the first and second pairs of latching claw portions 251a, 251b, 251c and 251d can get easily engaged with their associated catching portions on the supporting base member 205, thus getting the assembling process done more smoothly.

The first and second pairs of latching claw portions 251a, 251b, 251c and 251d serve as stoppers when the locking unit 253 is inserted and fitted into the supporting base member 205 in the direction indicated by the arrow 200A. The first pair of latching claw portions 251a and 251b is arranged in the vicinity of both ends of the body 250t in the longitudinal direction, while the second pair of latching claw portions 251c and 251d is arranged around the center of the body 250t in the longitudinal direction.

The locking lever supporting portion 250 further includes positioning hole cover portions 255a and 255b that will cover the positioning holes 225a and 225b of the lower supporting base portion 220 so as to define recesses with the positioning holes 225a and 225b as bottom holes when the locking unit 253 is fitted into the supporting base member 205. In this manner, it is possible to prevent dust from entering the supporting base member 205 through the positioning holes 225a and 225b.

As shown in FIG. 4(a), the lower supporting base portion 220 has a first pair of catching portions 221a and 221b to engage with the first pair of latching claw portions 251a and 251b of the locking lever supporting portion 250 and a second pair of catching portions 221c and 221d to engage with the second pair of latching claw portions 251c and 251d of the locking lever supporting portion 250. Each of these catching portions has a tapered side to get the locking lever supporting portion 250 inserted easily in the direction indicated by the arrow 200A.

The lower supporting base portion 220 further has positioning holes 222a and 222b for aligning the lower supporting base portion 220 with the upper supporting base portion 210 and positioning bosses 224a and 224b for positioning the locking unit 253 fitted.

Likewise, the upper supporting base portion 210 has a first pair of catching portions 211a and 211b to engage with the first pair of latching claw portions 251a and 251b of the locking lever supporting portion 250 and a second pair of catching portions 211c and 211d to engage with the second pair of latching claw portions 251c and 251d of the locking lever supporting portion 250 as shown in FIG. 4(b). Each of these catching portions has a tapered side to get the locking lever supporting portion 250 inserted easily in the direction indicated by the arrow 200A. The upper supporting base portion 210 further has positioning bosses 212a and 212b to be respectively fitted into the positioning holes 222a and 222b of the lower supporting base portion 220, thereby aligning these two supporting base portions with each other.

Also, the second pair of catching portions 211c and 211d of the upper supporting base portion 210 and the second pair of catching portions 221c and 221d of the lower supporting base portion 220 form integral parts of ribs around the center of the insertion port 205t in the longitudinal direction thereof. That is why when the upper and lower supporting base portions 210 and 220 are joined and welded or bonded together, not only the ribs on both sides of the supporting base member 205 but also those ribs may be welded or bonded together to join the center portions of the supporting base member 205 together. As a result, even when the locking unit 253 is not fitted yet, the mechanical strength of the supporting base member 205 can also be increased.

Furthermore, as described above, the first and second pairs of latching claw portions 251a, 251b, 251c and 251d of the locking lever supporting portion 250 engage with not only the first and second pairs of catching portions 221a, 221b, 221c and 221d of the lower supporting base portion 220 but also the first and second pairs of catching portions 211a, 211b, 211c and 211d of the upper supporting base portion 210. Consequently, the locking unit 253 can be firmly held by the supporting base member 205.

As shown in FIG. 5, the first and second locking lever portions 241 and 242 form integral parts of the locking lever supporting portion 250 by way of the rotating hinge portions 250a and 250b, respectively, in the locking unit 253. Also, by utilizing the elastic deformation of the rotating hinge portions 250a and 250b, the first and second locking lever portions 241 and 242 are supported so as to turn substantially on the rotating hinge portions 250a and 250b. Furthermore, the elastic portions 241d and 242d are deformed elastically while overcoming the biasing force applied by the opener/closers 241c and 242c, thereby producing biasing force in the first and second locking lever portions 241 and 242. Due to the elastic deformation at the ends of the rotating hinge portions 250a and 250b and the elastic portions 241d and 241c, some stress is produced in the body of the locking lever supporting portion 250.

However, the first pair of latching claw portions 251a and 251b are arranged near the rotating hinge portions 250a and 250b, respectively, and the second pair of latching claw portions 251c and 251d are arranged near the respective ends of the elastic portions 241d and 242d, thereby fitting the body 250t of the locking lever supporting portion 250 into the supporting base member 205. Consequently, without deforming the body 250t of the locking lever supporting portion 250 due to the stress, the first and second locking lever portions 241 and 242 can rotate on the rotating hinge portions 250a and 250b in the directions indicated by the arrows 241A and 242A, respectively. When the pressure applied to the openers/closers 241c and 242c is removed, the first and second locking lever portions 241 and 242 can rotate in the directions indicated by the arrows 241B and 242B by utilizing the elastic force of the elastic portions 241d and 242d that have been deformed elastically.

Also, as shown in FIG. 5(a), the first and second locking lever portions 241 and 242 by themselves (i.e., before the locking lever supporting portion 250 is fitted into the supporting base member 205) are tilted by θ1 and θ2 degrees in the directions indicated by the arrows 241B and 242B, respectively, compared to the situation where the locking lever supporting portion 250 has been inserted into the supporting base member 205 as shown in FIG. 5(b). That is why once the locking lever supporting portion 250 has been fitted into the supporting base member 205, the contact portions 241e and 242e of the first and second locking lever portions 241 and 242 contact with the inner walls of the supporting base member 205 and the first and second locking lever portions 241 and 242 are biased in the directions indicated by the arrows 241B and 242B, respectively, as shown in FIG. 5(b).

Consequently, as these contact portions 241e and 242e function as stoppers, the positional accuracy of the first and second locking lever portions 241 and 242 can be improved in the disk cartridge 201 by fitting the locking unit 253 into the supporting base member 205.

Hereinafter, it will be described with reference to FIG. 6 exactly how to open or close the disk housing 230 of the disk cartridge 201. FIGS. 6(a) and 6(b) are partial cross-sectional views of the disk cartridge 201 in a situation where the disk housing 230 is closed and a situation where the disk housing 230 is opened, respectively.

As shown in FIG. 6(a), while the disk housing 230 is closed, the latching lever portions 241b and 242b of the first and second locking lever portions 241 and 242 get engaged with the catching portions 231c and 232c of the first and second disk housing portions 231 and 232, thereby stopping the first and second disk housing portions 231 and 232 from turning in the directions indicated by the arrows 231A and 232A, respectively. In this manner, the first and second disk housing portions 231 and 232 are kept from rotating while the disk housing 230 is closed.

Also, to prevent the disk 10 from rattling inside the disk cartridge 201, the inner walls of the first and second disk housing portions 231 and 232 have portions (not shown) that either contact with, or are spaced just slightly from, the outer edge of the disk 10 to hold the disk 10 firmly when the disk housing 230 is closed. As a result, while the disk housing 230 is closed, the disk 10 is held firmly and never rattles.

In the state shown in FIG. 6(a) in which the disk housing 230 is closed, the first and second locking lever portions 241 and 242 are turned at the same time with a member provided for the disk drive (to be described later), thereby unlocking the disk housing 230 while deforming the elastic portions 241d and 242d elastically. At this point in time, the opening/closing members 151 and 152 of the disk drive get engaged with the notches 231d and 232d of the first and second disk housing portions 231 and 232. And as the opening/closing members 151 and 152 turn the first and second disk housing portions 231 and 232 in the directions indicated by the arrows 231A and 232A, respectively, the disk housing 230 comes to have a first opening position as shown in FIG. 6(b).

In this case, the catching portions 231c and 232c of the first and second disk housing portions 231 and 232 move between the latching lever portions 241b and 242b of the first and second locking lever portions 241 and 242 and the openers/closers 231c and 232c. As a result, the first and second locking lever portions 241 and 242 go back to the positions shown in FIG. 6(a) when the disk housing 230 is closed. That is why even in the first opening position in which the disk housing 230 is opened, the first and second locking lever portions 241 and 242 cannot turn in the unlocking directions indicated by the arrows 241A and 242B. Meanwhile, as the elastic portions 241d and 242d also recover their original states, it is possible to avoid creep that would be produced if the elastic portions 241d and 242d were kept deformed elastically.

In the first opening position in which the disk housing 230 is opened, the inner walls of the first and second disk housing portions 231 and 232 come out of contact with the disk 10. Thus, the position regulating portions 223a and 223b of the lower supporting base portion 220 and the positioning portion 65 of the disk drive contact with the outer side surface of the disk 10, thereby positioning the disk 10 with respect to the lower supporting base portion 220 (or the supporting base member 205).

Also, as shown in FIG. 6(b), in the first opening position in which the disk housing 230 is opened, the first and second locking lever portions 241 and 242 limit the rotation of the first and second disk housing portions 231 and 232 in the directions indicated by the arrows 231A and 232A. That is why in the first opening position in which the disk housing 230 is opened, it is possible to prevent the first and second disk housing portions 231 and 232 from rotating so much as to widen the window 230w to the point that the disk 10 drops easily.

To close the disk housing 230, the opening/closing members 151 and 152 of the disk drive turn the first and second disk housing portions 231 and 232 in opposite directions (i.e., in the directions indicated by the arrows 231B and 232B, respectively) compared to the opening operation described above. In the meantime, the first and second locking lever portions 241 and 242 contact with the catching portions 231c and 232c of the first and second disk housing portions 231 and 232 turning to rotate in the directions 241A and 242A, respectively. And when the disk housing 230 is fully closed as shown in FIG. 6(a), the first and second locking lever portions 241 and 242 rotate in the directions indicated by the arrows 241B and 242B, respectively, under the elastic force applied by their elastic portions 241d and 242d. As a result, the latching lever portions 241b and 242b of the first and second locking portions 241 and 242 get engaged with the catching portions 231c and 232c of the first and second disk housing portions 231 and 232, respectively, thereby stopping the disk housing 230 from turning. In this manner, the operation of closing the disk housing 230 can get done.

In the disk cartridge 201, in the first opening position in which the disk housing 230 is opened, the overall cartridge projection area of the disk 10, the disk housing 230 and the supporting base member 205 that is defined perpendicularly to the axis of rotation of the disk 10 is greater as shown in FIG. 6(b) than when the disk housing 230 is closed as shown in FIG. 6(a). However, since the window 230w can have an increased opening area even though the disk cartridge 201 has a reduced overall size, the head can be designed much more flexibly.

Figure 7:
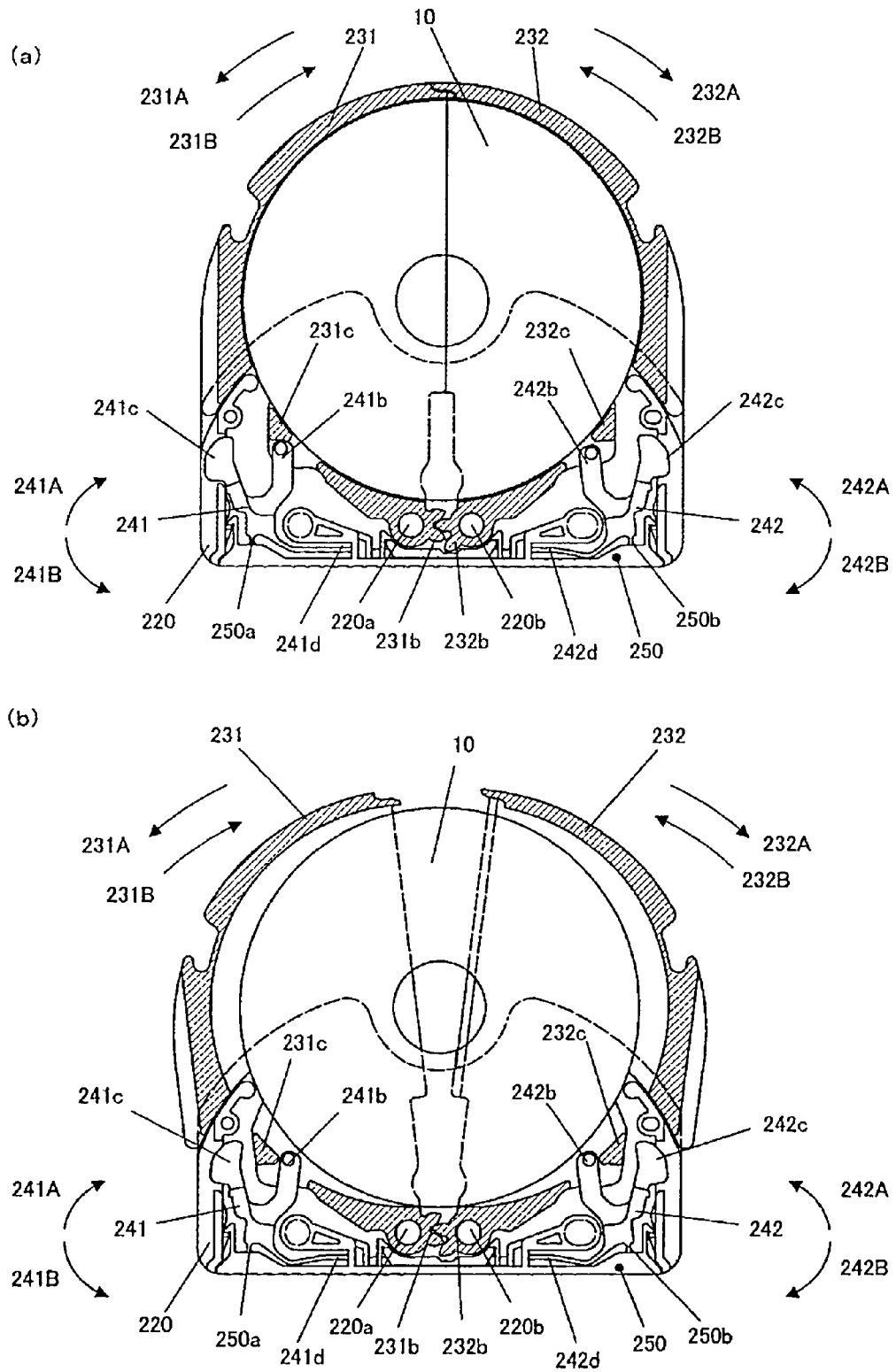
FIGS. 7(a) and 7(b) are partial cross-sectional views illustrating how the disk cartridge as the first preferred embodiment of the present invention looks in a situation where only the second locking lever portion has been unlocked and in a situation where the first and second locking lever portions thereof have both been unlocked, respectively.

Next, it will be described with reference to FIG. 7 how to unlock the disk cartridge 201. FIG. 7 shows partial cross-sectional views of the disk cartridge 201. Specifically, FIG. 7(a) illustrates a situation where only the second locking lever portion 242 has been unlocked by being turned in the direction indicated by the arrow 242A while the first and second disk housing portions 231 and 232 are locked with the first and second locking lever portions 241 and 242. On the other hand, FIG. 7(b) illustrates a situation where both the first and second locking lever portions 231 and 232 have been unlocked by being turned in the directions indicated by the arrows 241A and 242A, respectively, while the first and second disk housing portions 231 and 232 are locked with the first and second locking lever portions 241 and 242.

While closed, the first and second disk housing portions 231 and 232 are kept from turning in the directions indicated by the arrows 231A and 232A, respectively, by the first and second locking lever portions 241 and 242 as shown in FIG. 7(a).

As shown in FIG. 7(a), if the opener/closer 242c of the second locking lever portion 242 is pressed down externally with a member provided for the disk drive, the second locking lever portion 242 rotates in the direction indicated by the arrow 242A with its elastic portion 242d deformed. In this state, the latching lever portion 242b of the second locking lever portion 242 disengages itself from the catching portion 232c of the second disk housing portion 232. However, the first and second disk housing portions 231 and 232 are still engaged with each other by their engaging portions 231b and 232b and the first disk housing portion 231 is still kept from turning in the direction indicated by the arrow 231A by the first locking lever portion 241. For that reason, the first and second disk housing portions 231 and 232 still cannot be opened.

That is to say, even if one of the first and second locking lever portions 241 and 242 were intentionally unlocked externally, the first and second disk housing portions 231 and 232 still could not be opened.

However, if the openers/closers 241c and 242c of the first and second locking portions 241 and 242 are externally pressed down at the same time in the state shown in FIG. 6(a), the first and second locking lever portions 241 and 242 rotate in the directions indicated by the arrows 241A and 242A, respectively, with their elastic portions 241d and 242d deformed as shown in FIG. 7(b). In this state, the latching lever portions 241b and 242b of the first and second locking lever portions 241 and 242 disengage themselves from the catching portions 231c and 232c of the first and second disk housing portions 231 and 232 and unlocked. As a result, the first and second disk housing portions 231 and 232 can now rotate in the directions indicated by the arrows 231A and 232A.

As can be seen, only when the first and second locking lever portions 241 and 242 are unlocked at the same time, the first and second disk housing portions 231 and 232 can be opened.

It should be noted that there is a backlash between the engaging portions 231b and 232b. For that reason, even if the first and second locking lever portions 241 and 242 are not unlocked at quite the same time but with a slight time lag, the disk housing 230 can still be opened by operating both of the first and second locking lever portions 241 and 242.

Next, it will be described how to assemble a disk cartridge 201 with such a structure.

Figure 8:
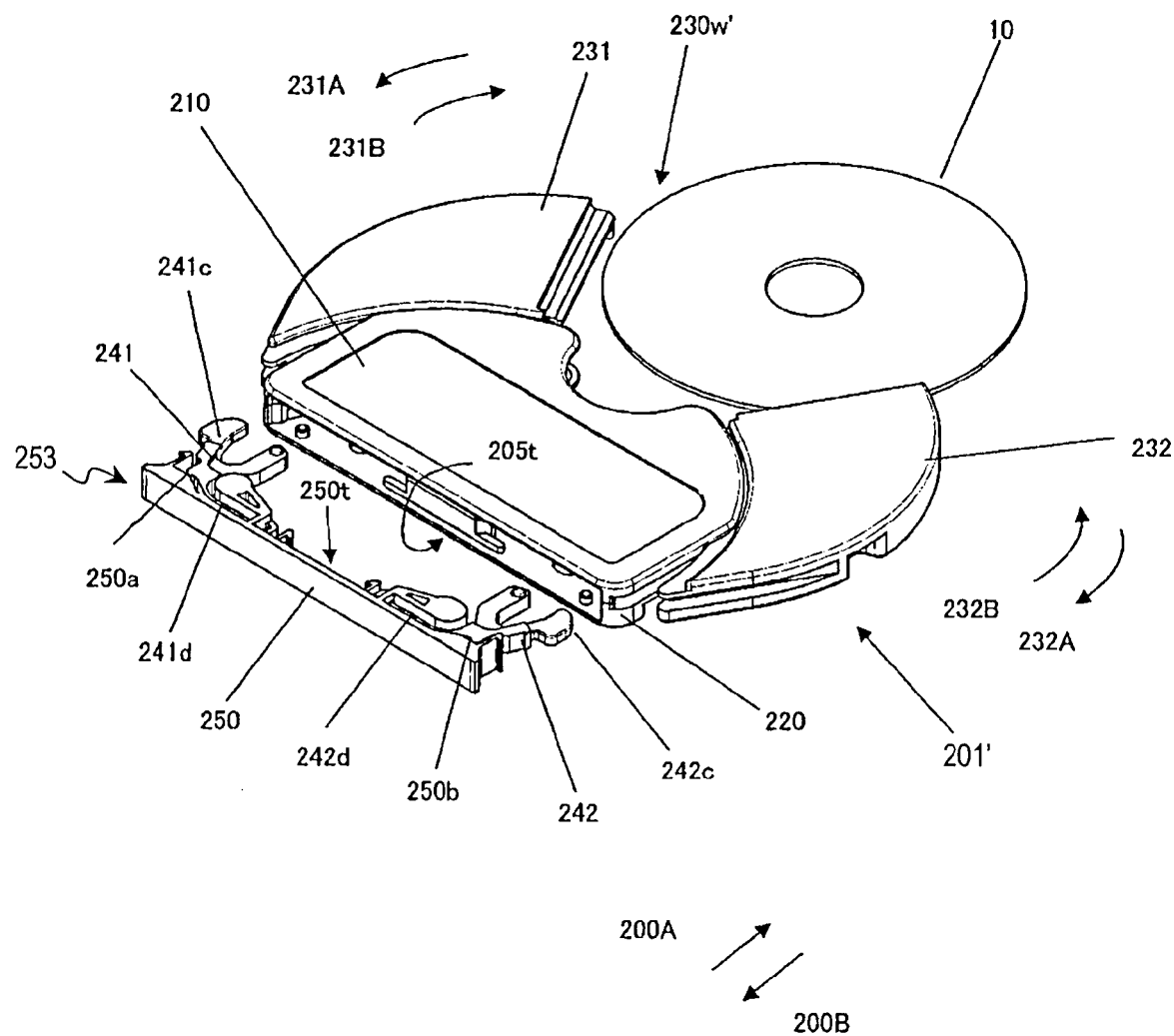
FIG. 8 is a perspective view illustrating how to insert a disk and assemble the locking members into the disk cartridge as the first preferred embodiment of the present invention.

FIG. 8 is a perspective view illustrating an assembly process in which the disk 10 and the locking lever supporting portion 250 are inserted into the disk cartridge 201 in the second opening position in which the disk housing 230 has been opened wide enough to remove the disk 10 easily.

First, as shown in FIG. 3, the first and second disk housing portions 231 and 232, the upper supporting base portion 210, the lower supporting base portion 220, and the locking unit 253 are provided. These members may be made of resin, for example.

Next, the pivots 220a and 220b of the lower supporting base portion 220 are inserted into the pivot holes 231a and 232a of the first and second disk housing portions and 232 and the upper supporting base portion 210 is either welded or bonded with the lower supporting base portion 220. In this manner, the disk cartridge 201' can be assembled as shown in FIG. 8. In this state, however, the locking unit has not been inserted into the disk cartridge 201' yet.

Hereinafter, it will be described with reference to FIGS. 9 through 13 how to complete the disk cartridge 201 by assembling the disk cartridge 201', the disk 10 and the locking unit 253 together.

Figure 9:
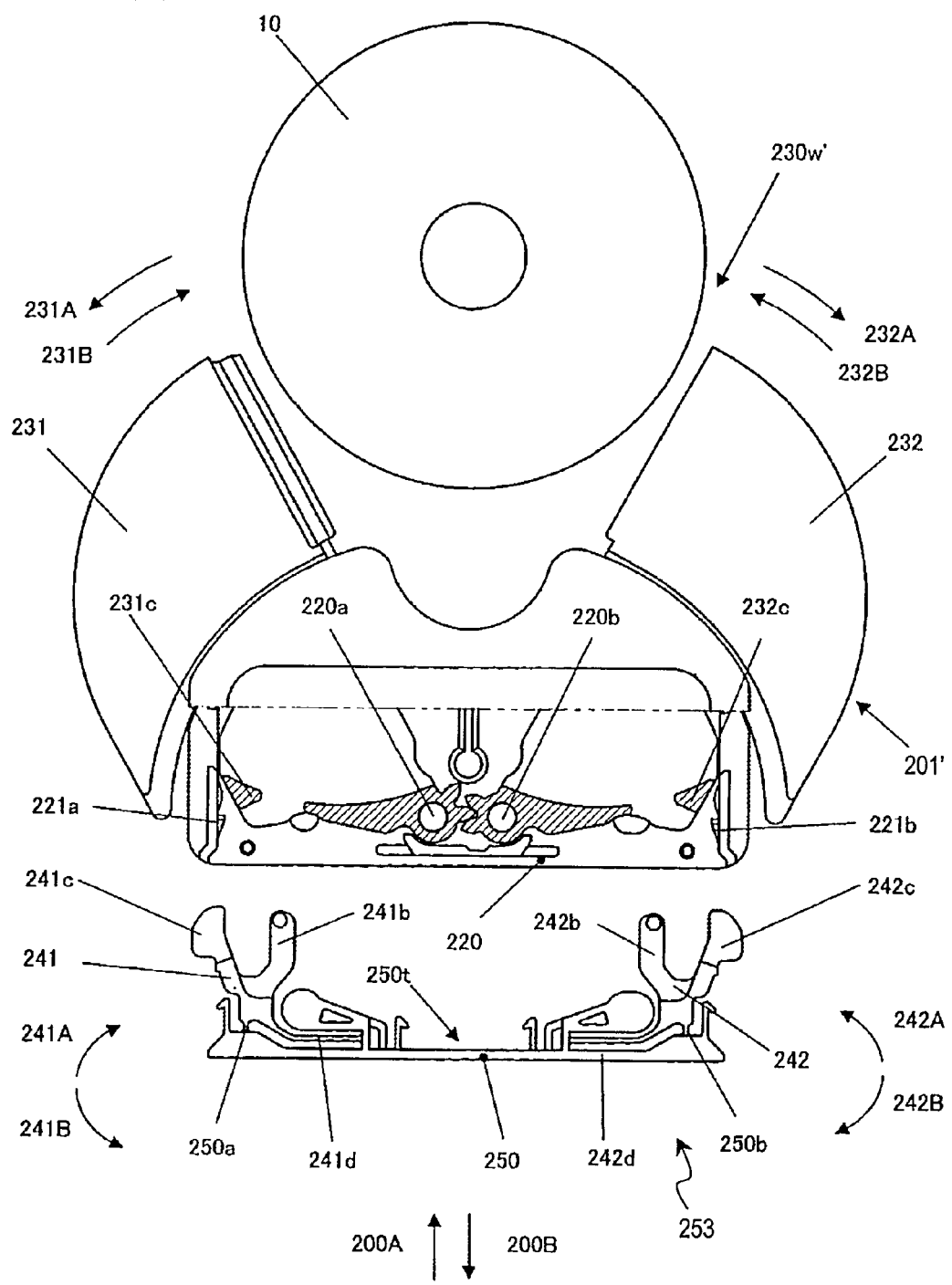
FIG. 9 is a partial cross-sectional view illustrating one stage of the assembling process of the disk cartridge as the first preferred embodiment of the present invention.

FIG. 9 is a partial cross-sectional view showing one stage of the assembly process of the disk cartridge 201 and illustrating a situation where the disk cartridge 201' has been opened to the second opening position. Unlike the state shown in FIG. 6, there is neither the first locking lever portion 241 nor the second locking lever portion 242, and therefore, the first and second disk housing portions 231 and can rotate more freely than in the first position in the directions indicated by the arrows 231A and 232A to contact with the lower supporting base portion 220 (i.e., the supporting base member 205). As a result, a window 230w' in the second opening position, which is wider than the window 230w in the first opening position, is defined. In this second opening position, the disk 10 may be moved either in the direction indicated by the arrow 200B to get inserted into the disk cartridge 201' or in the direction indicated by the arrow 200A to get ejected out of the disk cartridge 201'.

Figure 10:
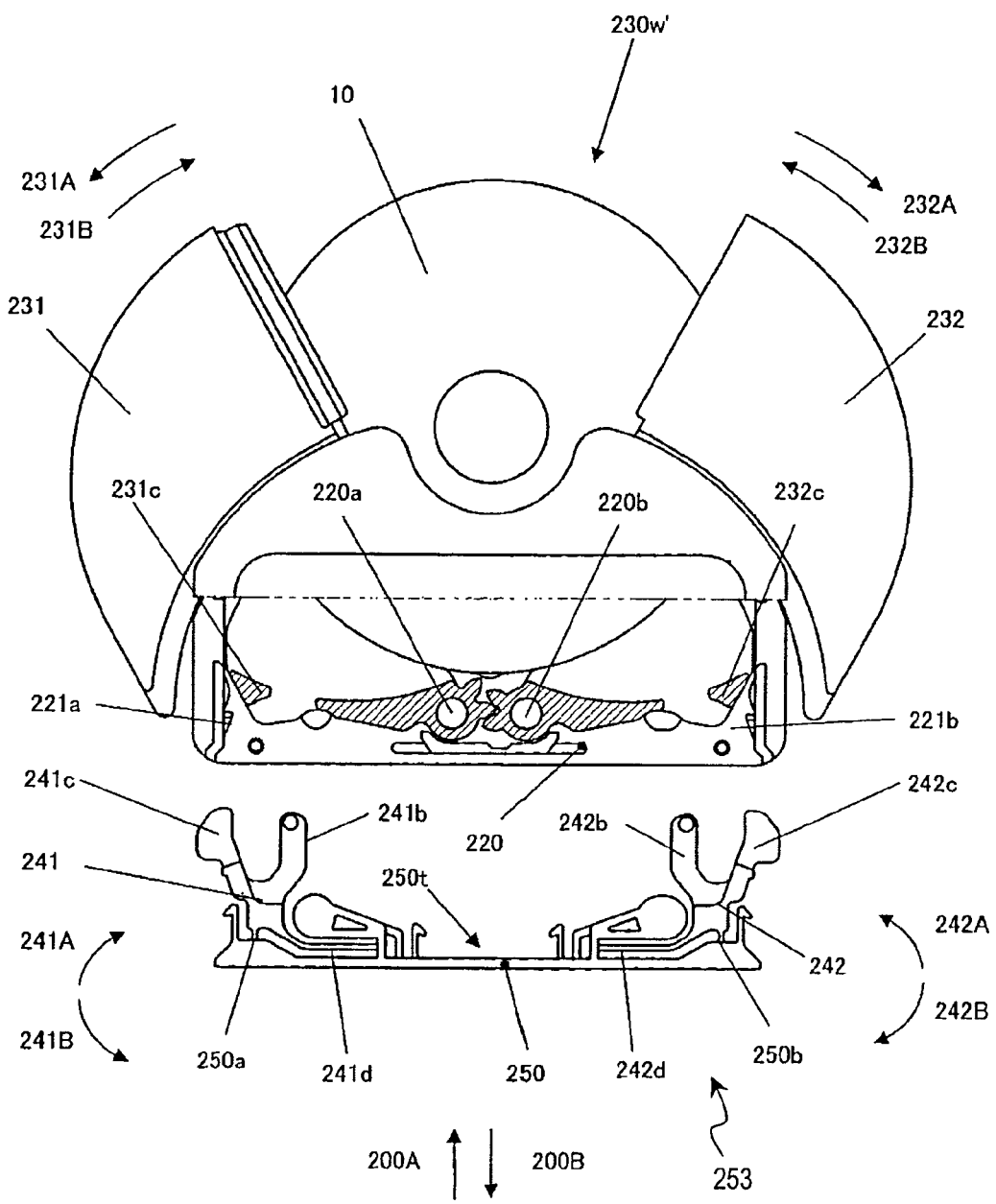
FIG. 10 is a partial cross-sectional view illustrating another stage of the assembling process of the disk cartridge as the first preferred embodiment of the present invention.

For example, if the disk 10 is moved in the direction indicated by the arrow 200B, the disk 10 can be inserted into the disk cartridge 201' through the window 230w' as the disk housing 230 has been opened to the second position as shown in FIG. 10.

Figure 11:
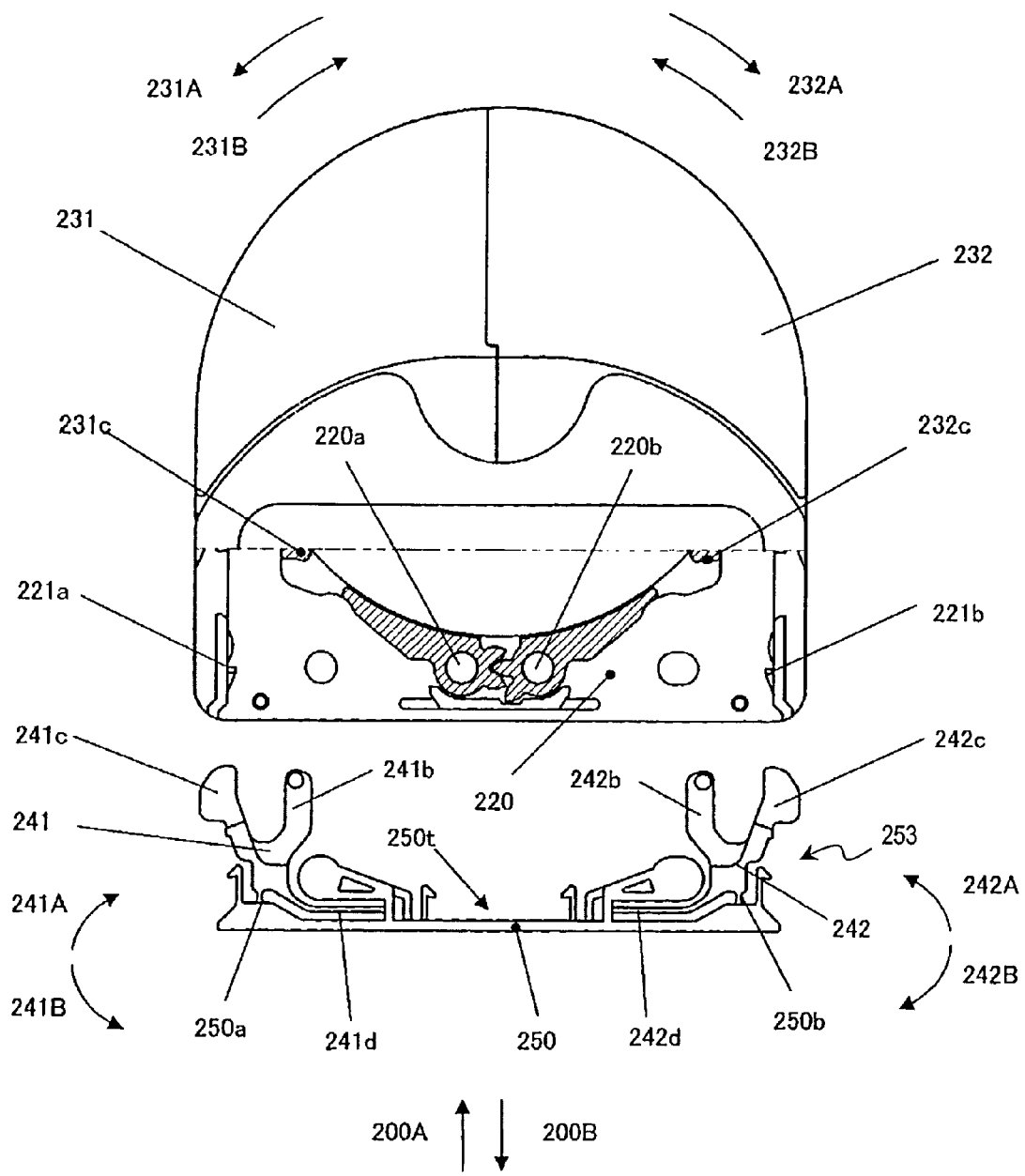
FIG. 11 is a partial cross-sectional view illustrating still another stage of the assembling process of the disk cartridge as the first preferred embodiment of the present invention.

If the first and second disk housing portions 231 and 232 in the positions shown in FIG. 10 are turned in the directions indicated by the arrows 231B and 232B, respectively, then the disk housing 230 will be fully closed and the disk 10 will get housed in the disk housing 230 as shown in FIG. 11. At this point in time, however, the locking unit 253 has not been inserted into the disk cartridge 201' yet, and therefore, the disk housing 230 can be opened or closed freely. If necessary, the disk housing 230 closed may be opened to the second opening position and the disk 10 may be removed.

Figure 6:
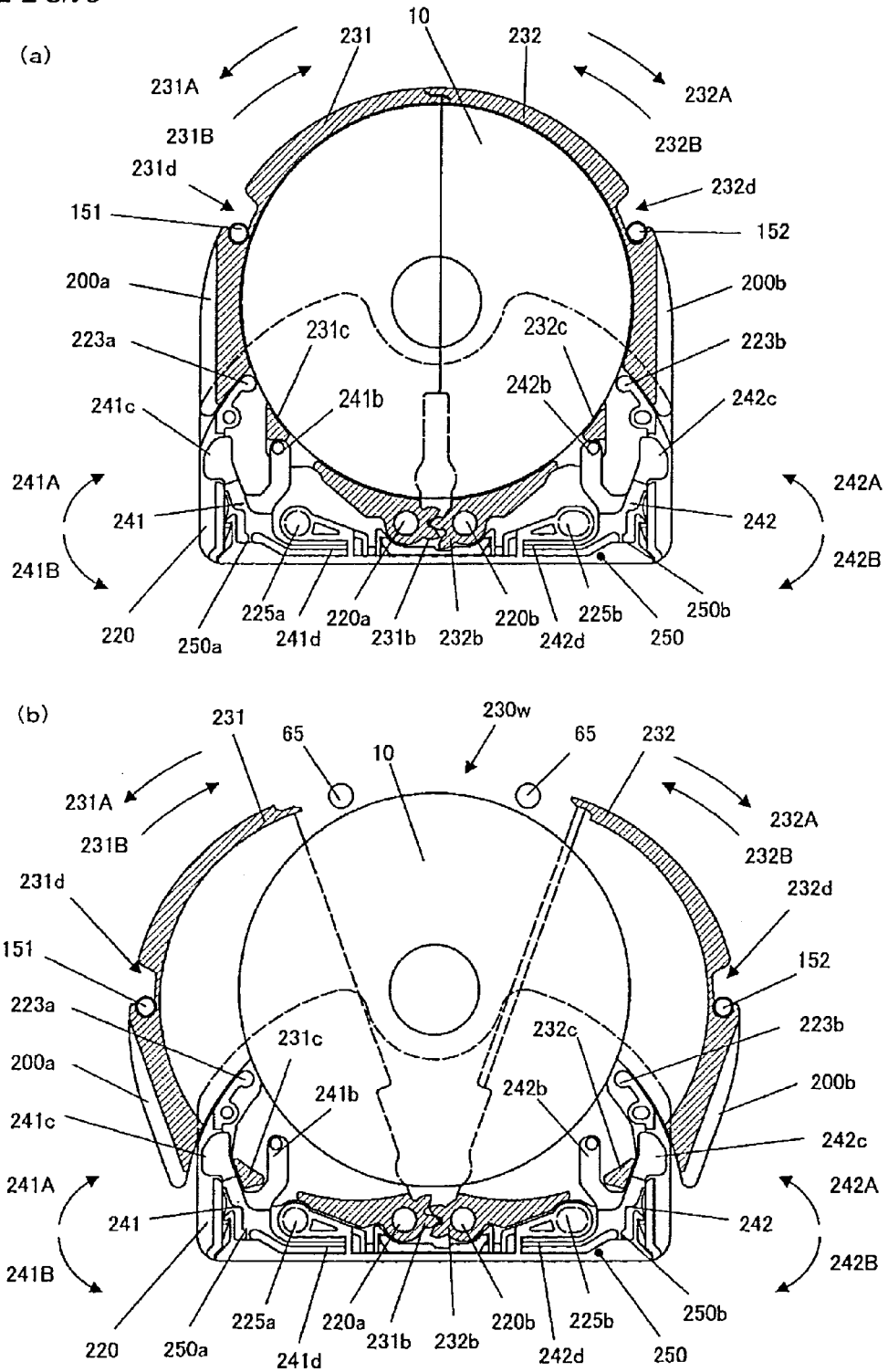
FIGS. 6(a) and 6(b) are partial cross-sectional views illustrating how the disk cartridge as the first preferred embodiment of the present invention looks when its disk housing is closed and when the disk housing is opened, respectively.

Furthermore, the disk drive opens or closes the disk housing 230 with the opening/closing members 151 and 152 of the disk drive fitted into the notches 231d and 232d of the first and second disk housing portions 231 and 232 as shown in FIG. 6. That is why even the disk cartridge 201' in such an incomplete state can also be loaded into the disk drive and can have its disk housing 230 opened or closed with no problem. Consequently, the disk cartridge 201' to which the locking unit 253 has not been inserted yet functions as a disk cartridge, to and from which the disk 10 can be inserted or removed freely. Such a disk cartridge 201' may be used in a manufacturing or development process step in which the disks 10 need to be changed frequently, e.g., in the process step of testing the disk drive to be loaded with the disk cartridge 201 or during the development of game software.

If the locking unit 253 is inserted in the direction indicated by the arrow 200A into the supporting base member 205 through the insertion port 205t (see FIG. 4) in the state shown in FIG. 11, then the openers/closers 241c and 242c of the first and second locking lever portions 241 and 242 will contact with the inner walls of the lower supporting base portion 220 (or supporting base member 205). As a result, the first and second locking lever portions 241 and 242 are turned in the directions indicated by the arrows 241A and 242A, respectively. Meanwhile, the body 250t of the locking lever supporting portion 250 is deformed elastically. As a result, the locking unit 253 gets inserted into the supporting base member 205 with the locking lever supporting portion 250 flexed entirely.

Since the body 250t of the locking lever supporting portion 250 can be flexed in this manner while the first and second locking lever portions 241 and 242 are turning, the locking unit 253 being inserted can be deformed significantly in its entirety. As a result, the load to be placed while the locking unit 253 is inserted can be reduced so much that the locking unit 253 can be inserted easily. In other words, the disk cartridge 201 can be assembled more easily.

In addition, as the locking unit 253 is flexed in its entirety, the first pair of latching claw portions 251a and 251b of the locking lever supporting portion 250 gets engaged with the supporting base member 205 earlier than the second pair of latching claw portions 251c and 251d thereof. That is to say, since only two of the four latching claw portions get engaged at the same time while the locking lever supporting portion 250 is being inserted, the locking unit 253 can be inserted with reduced force. As a result, the disk cartridge 201 can be assembled more easily.

Figure 12:
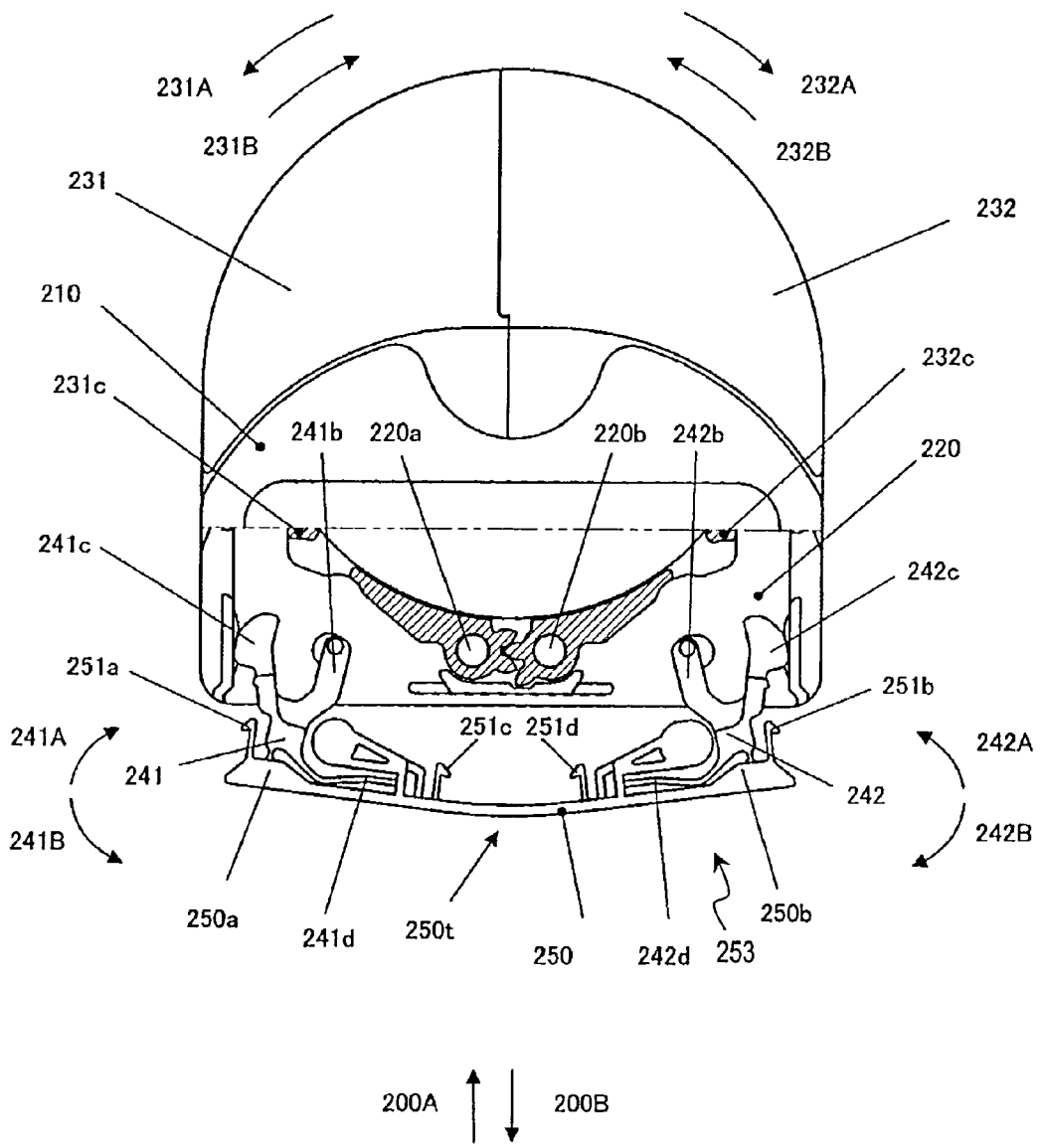
FIG. 12 is a partial cross-sectional view illustrating yet another stage of the assembling process of the disk cartridge as the first preferred embodiment of the present invention.

As the locking unit 253 in the position shown in FIG. 12 is further inserted deeper in the direction indicated by the arrow 200A, the first pair of latching claw portions 251a and 251b gets engaged with the first pair of catching portions 221a and 221b of the lower supporting base portion 220 (and the first pair of catching portions 211a and 211b of the upper supporting base portion 210) earlier than the other pair because the locking unit 253 is flexed in its entirety as described above. After that, the second pair of latching claw portions 251c and 251d gets engaged with the second pair of catching portions 221c and 221d of the lower supporting base portion 220 (and the first pair of catching portions 211c and 211d of the upper supporting base portion 210).

Figure 13:
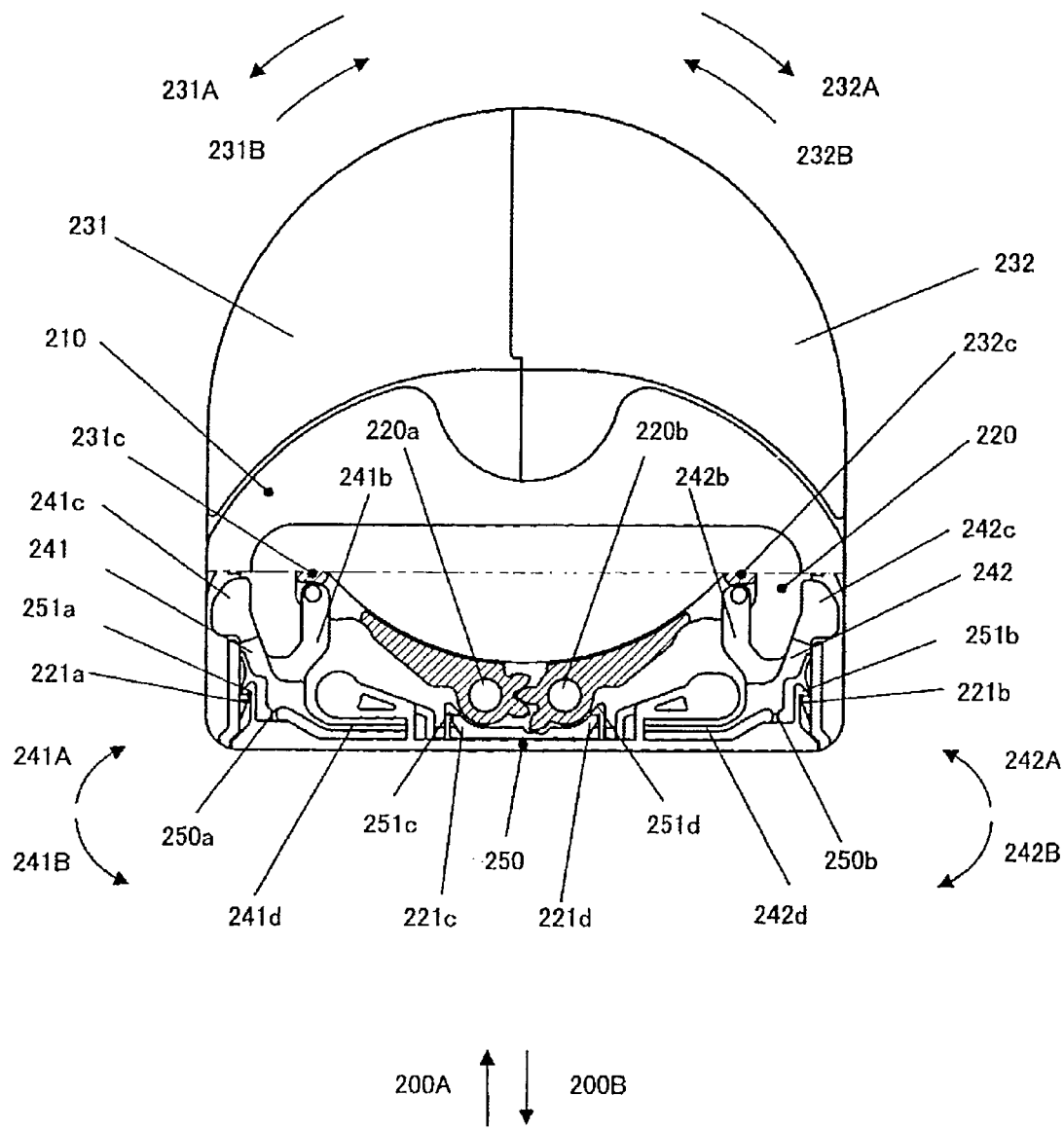
FIG. 13 is a partial cross-sectional view illustrating yet another stage of the assembling process of the disk cartridge as the first preferred embodiment of the present invention.

As a result, the locking unit 253 gets fully fitted into the supporting base member 205 as shown in FIG. 13. The first and second latching lever portions 241b and 242b of the first and second locking lever portions 241 and 242 get engaged with the catching portions 231c and 232c of the first and second disk housing portions 231 and 232, thereby keeping the first and second disk housing portions 231 and 232 from rotating in the directions indicated by the arrows 231A and 232. At the same time, the openers/closers 241c and 242c of the first and second locking lever portions 241 and 242 protrude through the unlocking grooves 200a and 200b on the side surfaces of the supporting base member 205. In this manner, the disk cartridge 201 is completed.

By inserting the locking unit 253 into the disk cartridge 201' in this manner, the first and second locking lever portions 241 and 242 can keep the disk housing 230 in the closed state from rotating. On the other hand, while the disk housing 230 is opened, the first and second locking lever portions 241 and 242 or the locking lever supporting portion 250 can keep the first and second disk housing portions 231 and 232 from rotating in the directions indicated by the arrows 231A and 232A as shown in FIG. 6(b), thereby preventing the user from removing the disk 10.

In the assembling procedure described above, before the locking unit 253 is inserted into the supporting base member 205 of the disk cartridge 201', the first and second disk housing portions 231 and 232 are closed. However, the assembling process may also get done even with the first and second disk housing portions 231 and 232 opened.

Figure 14:
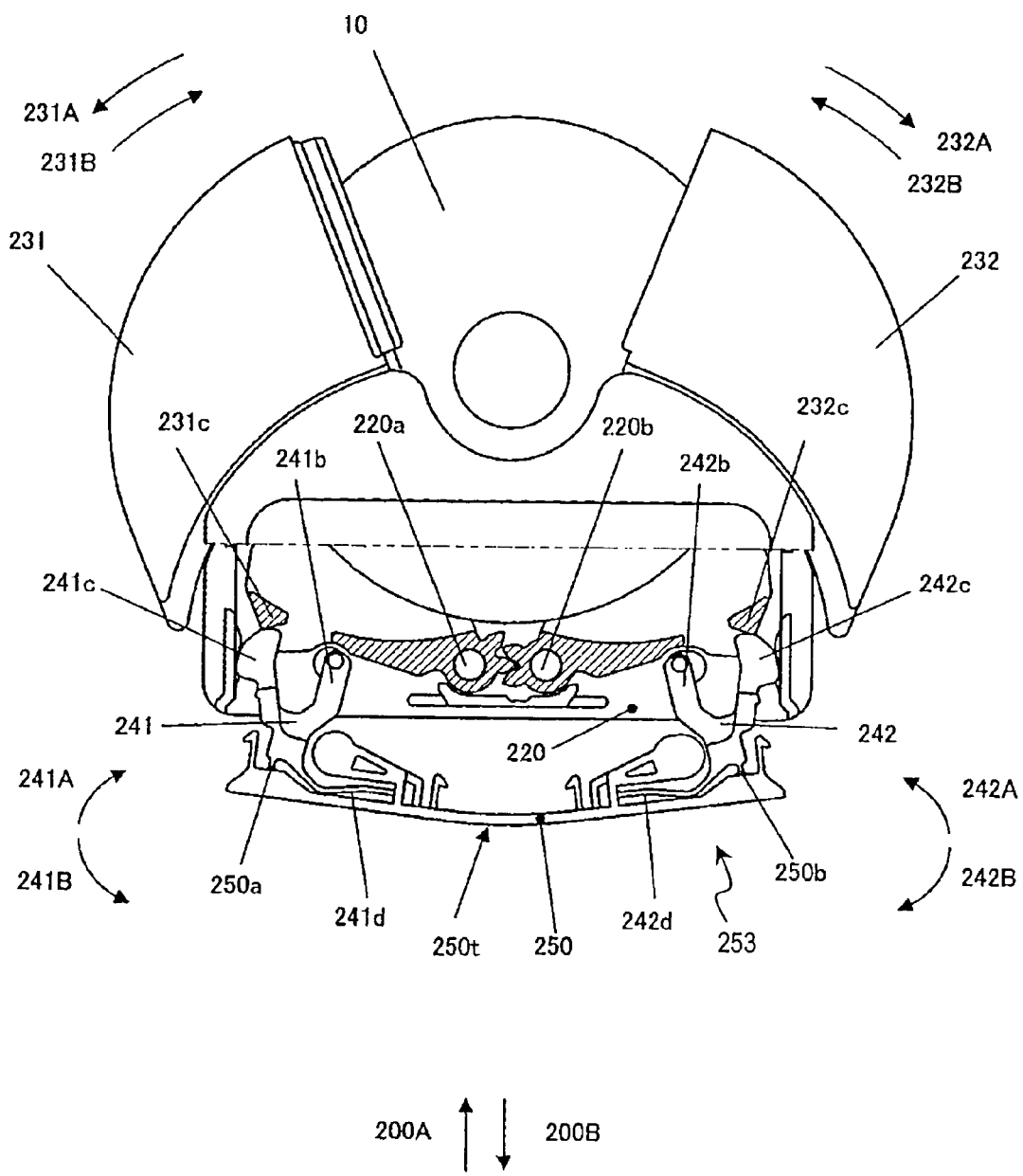
FIG. 14 is a partial cross-sectional view illustrating yet another stage of the assembling process of the disk cartridge as the first preferred embodiment of the present invention in which the locking members are inserted when the disk housing is opened.

FIG. 14 is a partial cross-sectional view illustrating a situation where the locking unit 253 is inserted with the first and second disk housing portions 231 and 232 opened. As shown in FIG. 14, if the locking unit 253 is inserted with the first and second disk housing portions 231 and 232 opened, then the openers/closers 241c and 242c of the first and second locking lever portions 241 and 242 contact with the catching portions 231c and 232c of the first and second disk housing portions 231 and 232, respectively.

For that reason, if the locking unit 253 is inserted deeper in the direction indicated by the arrow 200A, the first and second disk housing portions 231 and 232 being in contact with the openers/closers 241c and 242c of the first and second locking lever portions 241 and 242 rotate in the directions indicated by the arrows 231B and 232B, respectively. That is why even if the locking unit 253 is inserted with the first and second disk housing portions 231 and 232 opened, the first and second disk housing portions 231 and 232 can also be closed and the disk cartridge 201 can be assembled with no problem at all as the locking unit 253 is inserted deeper. As a result, no matter whether the disk housing 230 is opened or closed while the locking unit 253 is being inserted, the disk cartridge 201 can be assembled just as intended with the number of mistakes reduced during the assembling work. On top of that, since the disk housing 230 is closed by itself as the locking unit 253 is inserted, the number of assembling process steps can be cut down, too.

This process of assembling the disk cartridge 201 may be carried out either manually or automatically using an assembling machine. Hereinafter, an example of such a machine for assembling the disk cartridge 200 will be described with reference to FIGS. 15 through 17, which are perspective views illustrating main elements that form such a machine 300 of assembling the disk cartridge 200. Specifically, FIGS. 15, 16 and 17 illustrate three different states of the assembling machine 300 while the disk 10 is being inserted, while the locking unit 253 is being inserted, and when the disk cartridge 200 gets assembled, respectively.

Figure 15:
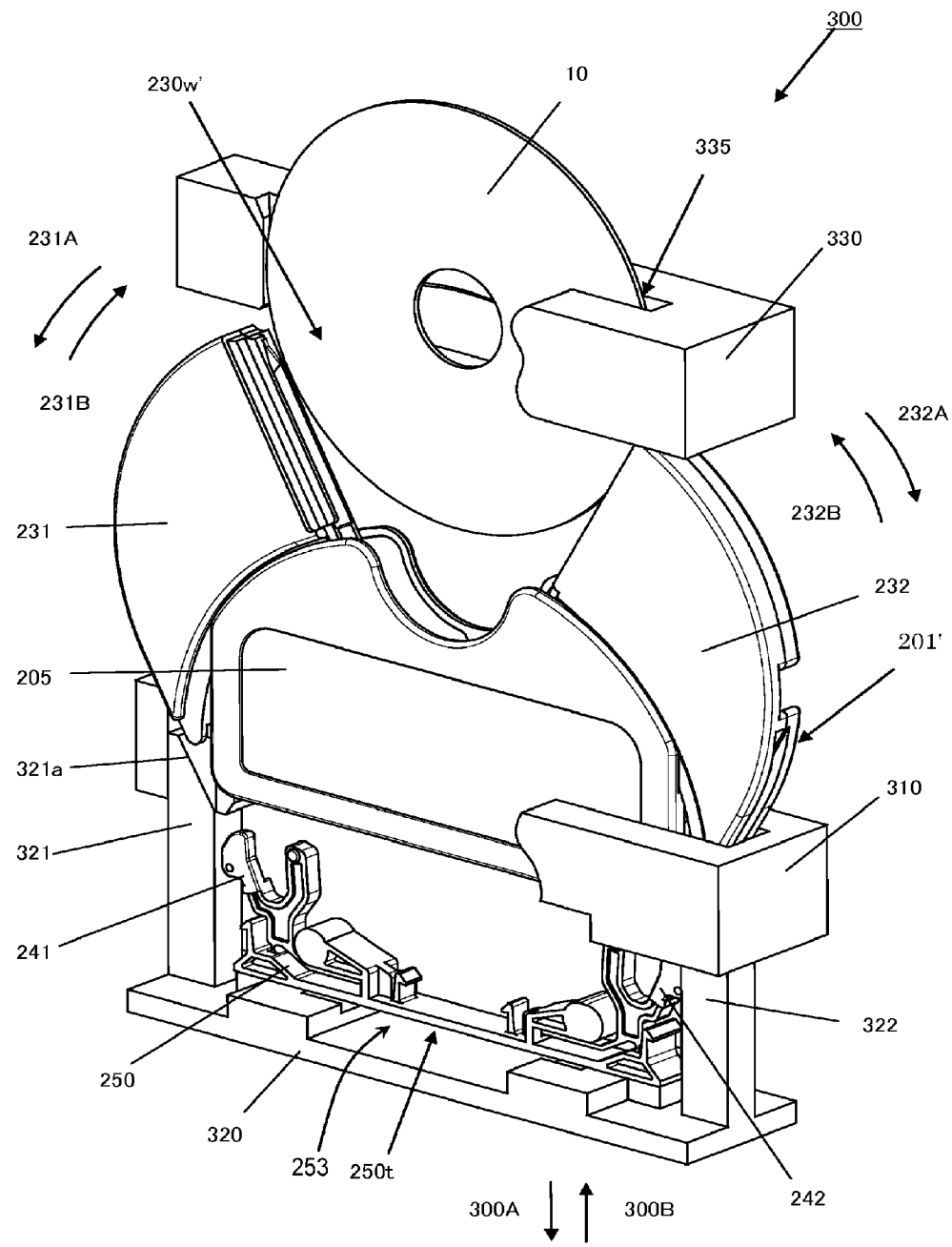
FIG. 15 is a partly sectional perspective view illustrating a working state of an exemplary assembling machine for the disk cartridge as the first preferred embodiment of the present invention.
Figure 16:
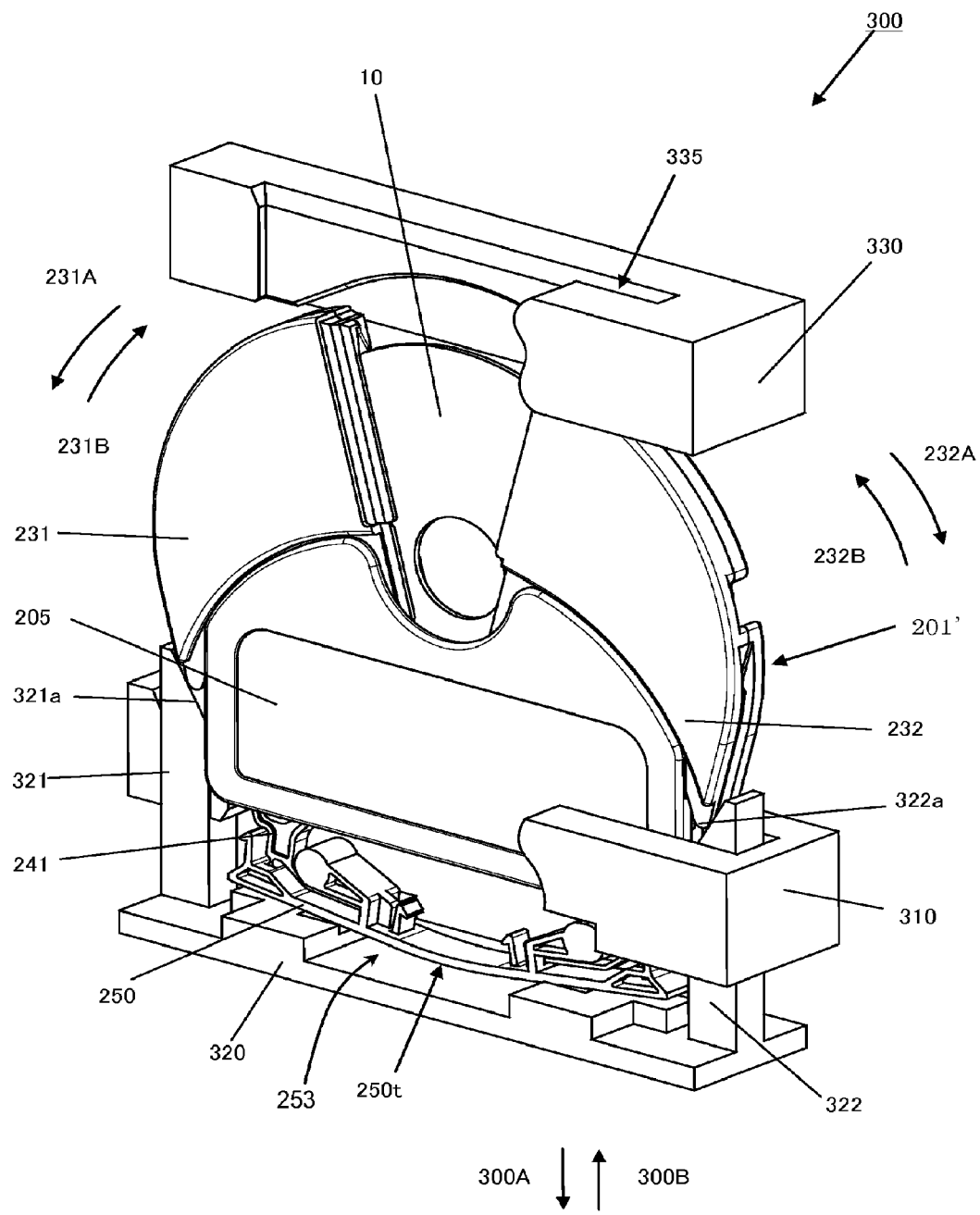
FIG. 16 is a partly sectional perspective view illustrating another working state of the assembling machine for the disk cartridge as the first preferred embodiment of the present invention.
Figure 17:
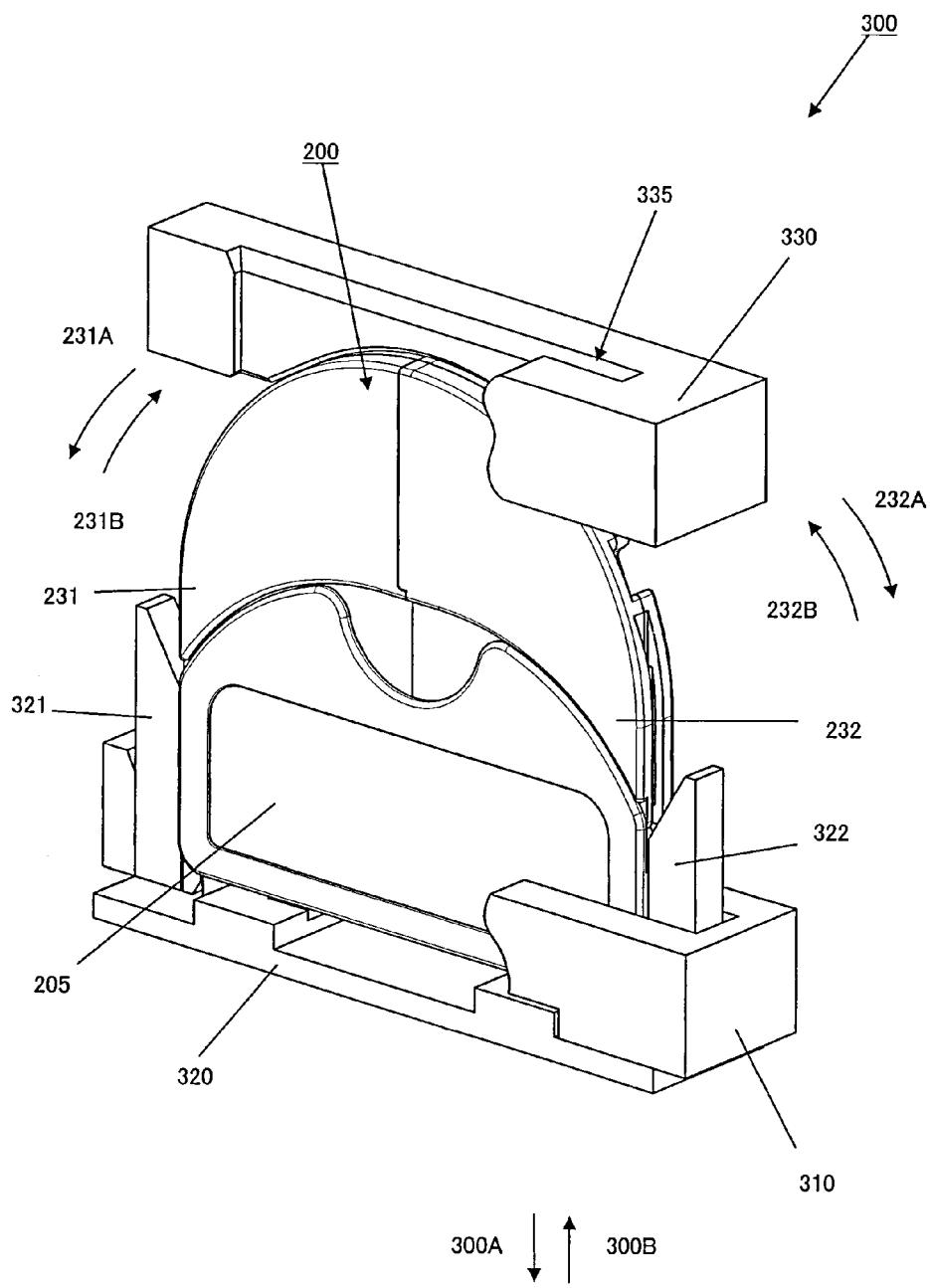
FIG. 17 is a partly sectional perspective view illustrating still another working state of the assembling machine for the disk cartridge as the first preferred embodiment of the present invention.

As shown in FIGS. 15 to 17, the machine 300 of assembling the disk cartridge 200 includes a cartridge supporting portion 310 for supporting the disk cartridge 201' to which the locking unit 253 has not been inserted yet, an assembling base portion 320 for holding and guiding the locking unit 253, and a disk insertion guide portion 330 that has a port for inserting the disk 10 and that serves as a press member when the locking unit 253 is inserted. The assembling base portion 320 further includes assembling guide portions 321 and 322 for guiding the locking unit 253 in the directions indicated by the arrows 300A and 300B. The cartridge supporting portion 310 may also be moved in the directions indicated by the arrows 300A and 300B by a robot arm (not shown), for example.

Hereinafter, it will be described how this assembling machine 300 performs the assembling process. As shown in FIG. 15, with the cartridge supporting portion 310 positioned over the assembling guide portions 321 and 322, the disk cartridge 201' is loaded into the cartridge supporting portion 310 and the locking unit 253 is fitted into the assembling base portion 320. The disk cartridge 201' is held vertically such that the supporting base member 205 faces down. That is why the first and second disk housing portions 231 and 232 of the disk cartridge 201' rotate due to their own weight in the directions indicated by the arrows 231A and 232A, respectively, thereby defining a window 230w' in the second opening position.

The disk 10 is inserted through the disk insertion port 335 of the disk insertion guide portion 330. Then, the disk 10 will go down due to its own weight in the direction indicated by the arrow 300A while being guided along the disk insertion port 335 and will get inserted into the disk cartridge 201' eventually.

If the cartridge supporting portion 310 is moved in the direction indicated by the arrow 300A after the disk 10 has been inserted fully (see FIG. 10), then the first and second disk housing portions 231 and 232 will contact with the tapered portions 321a and 322a of the assembling guide portions 321 and 322, and start to rotate in the directions indicated by the arrows 231B and 232B, respectively, as shown in FIG. 16. Meanwhile, as the cartridge supporting portion 310 goes down in the direction indicated by the arrow 300A, the locking unit 253 soon gets inserted through the insertion port 205t of the supporting base member 205 into the disk cartridge 201'. In the meantime, as already described with reference to FIG. 12, the first and second locking lever portions 241 and 242 contact with the inner walls of the supporting base member 205 of the disk cartridge 201', thereby deforming the body 250t of the locking lever supporting portion 250 elastically and flexing the locking unit 253 in its entirety. As a result, the locking unit 253 gets inserted into the supporting base member 205.

And as the cartridge supporting portion 310 is further moved in the direction indicated by the arrow 300A, the locking unit 253 soon gets inserted into the supporting base member 205 fully as shown in FIG. 17. At this point in time, if the upper part of the disk cartridge 201' is pressed in the direction indicated by the arrow 300A with the disk insertion guide portion 330, then the first and second pairs of latching claw portions 251a, 251b, 251c and 251d get engaged with the first and second pairs of catching portions 221a, 221b, 221c and 221d, respectively, as shown in FIG. 13. Meanwhile, the openers/closers 241c and 242c of the first and second locking lever portions 241 and 242 protrude through the unlocking grooves 200a and 200b on the side surfaces of the supporting base member 205. In this manner, the disk cartridge 201 can get assembled completely.

As described above, while the disk cartridge 201 is assembled, the disk 10 and the locking lever supporting portion 250 are inserted both vertically but in two opposite directions. That is why the disk cartridge 201 can be assembled by performing the assembling operation in a single direction. The machine for assembling the disk cartridge 201 just needs to move in the single direction and does not require any complicated arm movement. As a result, the assembling machine can be simplified.

Also, by designing the assembling machine such that the disk 10 is inserted vertically as described above, the assembling job can get done using the gravity. In that case, the operation of turning the first and second disk housing portions 231 and 232 as described above can be omitted and the assembling machine can be further simplified.

Furthermore, by designing such a machine that works vertically, the machine will occupy a smaller area on the floor. As a result, the assembling facility can use the limited factory space more efficiently, and a greater number of such machines can be introduced into the limited space. Consequently, the productivity will rise, too.

Figure 18:
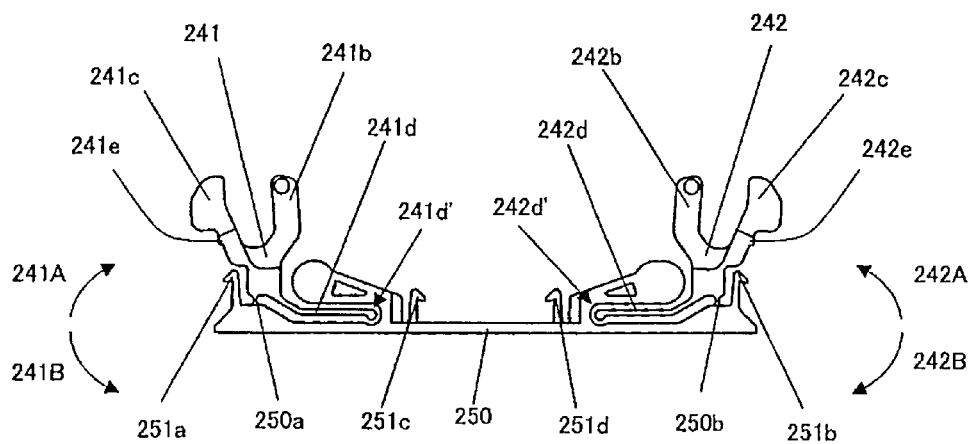
FIGS. 18(a) and 18(b) are plan views illustrating an alternative configuration for the locking members of the disk cartridge as the first preferred embodiment of the present invention.
Figure 18:
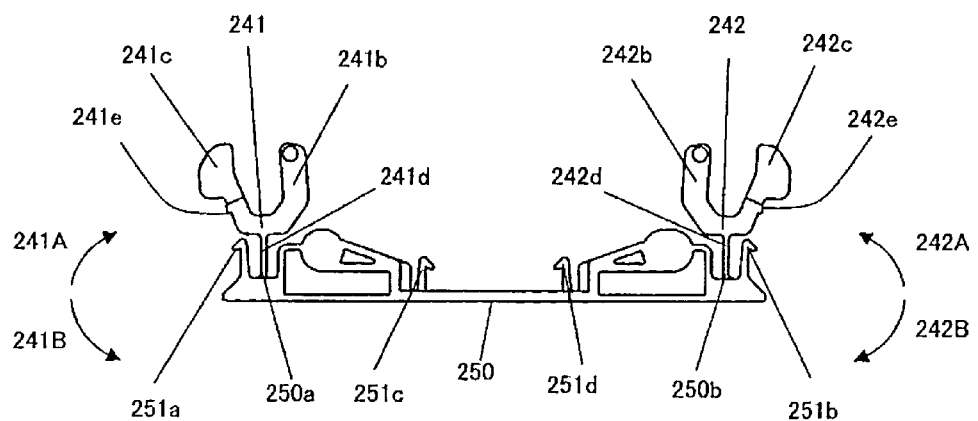

In the preferred embodiment described above, each of the first and second locking lever portions 241 and 242 is integrated with the locking lever supporting portion 250 at two points by way of the rotating hinge portion 250a, 250b and the elastic portion 241d, 242d as shown in FIG. 5. However, as shown in FIG. 18(a), the first and second locking lever portions 241 and 242 may be integrated with the locking lever supporting portion 250 only via the rotating hinge portions 250a and 250b with the ends 241d' and 242d' of the elastic portions 241d and 242d cut off the locking lever supporting portion 250. Alternatively, as shown in FIG. 18(b), the elastic portions 241d and 242d and the rotating hinge portions 250a and 250b may be connected together and the first and second locking lever portions 241 and 242 may be integrated with the locking lever supporting portion 250 only through the rotating hinge portions 250a and 250b.

By integrating the first and second locking lever portions 241 and 242 with the locking lever supporting portion 250 only through the rotating hinge portions 250a and 250b as shown in FIG. 18(a) or 18(b), when the first and second locking lever portions 241 and 242 are turned in the directions indicated by the arrows 241A and 242A, respectively, the overall locking lever supporting portion 250 will not be easily affected by the elastic force produced by the elastic deformation of the elastic portions 241d and 242d. That is to say, the overall locking lever supporting portion 250 will not be easily deformed elastically. Consequently, the elastic portions 241d and 242d may be designed to have reduced elastic force. In other words, the disk housing 230 can be unlocked with reduced force.

Furthermore, in the preferred embodiment described above, unlike a cartridge that is designed to house a disk with a small diameter (such as an MD cartridge), no metallic clamp plate is provided for the disk 10 to be housed in this disk cartridge 201. However, to simplify the disk drive by eliminating the clamp mechanism or to reinforce the disk cartridge by closing the window 230w over the upper side of the disk 10, a clamp plate may be provided for the disk 10.

Also, in the preferred embodiment described above, the first and second locking lever portions 241 and 242 contact with the first and second disk housing portions 231 and 232, thereby closing the disk housing 230 as the locking lever supporting portion 250 is gradually inserted into the disk cartridge. However, the present invention is in no way limited to that specific preferred embodiment. Alternatively, the disk cartridge may also be designed such that the disk housing 230 is closed by making the locking lever supporting portion 250 contact with the first and second disk housing portions 231 and 232.

As can be seen easily from the foregoing description, in the disk cartridge of this preferred embodiment, the locking unit 253, which not only controls the angle of the window defined by the disk housing 230 but also keeps the disk housing 230 in the closed state from rotating, can be inserted after the disk cartridge 201', made up of the disk housing 230 and the supporting base member 205, has been assembled. For that reason, while the disk cartridge 201' still has no locking unit, the disk housing 230 can also be opened wide enough to readily remove the disk 10 from the disk cartridge. That is why the assembling process of the disk cartridge 201 can be completed by inserting the locking unit 253 through the insertion port of the supporting base member 205 after the disk 10 has been inserted into the disk cartridge 201'. As a result, the manufacturing process of the disk 10 and the assembling process of the disk cartridge 201 can be totally separated from each other. Consequently, a disk cartridge manufacturing process can be carried out with the manufacturing process of the disk 10 and the assembling process of the disk cartridge 201, which have quite different process and testing methods, performed in two different places, thus increasing the degree of flexibility of the manufacturing process and cutting down the manufacturing costs significantly.

Furthermore, by inserting the locking unit 253, the disk housing 230 in the closed state can be kept from rotating and the angle of the window defined by the disk housing 230 opened can be controlled so as to prevent the user from removing the disk 10 from the disk cartridge 201.

On top of that, by integrating the first and second locking lever portions 241 and 242 with the locking lever supporting portion 250, the number of members required and the number of assembling process steps can be both reduced. Consequently, the overall manufacturing cost of the disk cartridge 201 can be cut down.

Besides, while the locking unit 253 is inserted into the supporting base member 205, either the first and second locking lever portions 241 and 242 or the locking lever supporting portion 250 contacts with parts of the disk housing 230. That is why the disk housing 230 can be closed just as intended synchronously with the insertion of the locking unit 253. Consequently, no matter whether the disk housing 230 is opened or closed, the locking unit 253 can always be inserted into the supporting base member 253. As a result, the disk cartridge 201 can be assembled just as intended with the number of mistakes reduced during the assembling work. On top of that, since the disk housing 230 is closed by itself as the locking unit 253 is inserted, the number of assembling process steps of the disk cartridge 201 can be cut down, too, and eventually the overall manufacturing cost of the disk cartridge 201 can be reduced.

On top of that, even the disk cartridge 201' that still has no locking unit 253 yet can also be loaded into the disk drive. Thus, such a disk cartridge 201' may be used in a manufacturing or development process step in which the disks 10 need to be changed frequently, e.g., in the process step of testing the disk drive or during the development of game software. As a result, a dedicated jig does not have to be prepared for the manufacturing or development purposes but could be replaced with actual products, thus contributing to cutting down the manufacturing and development costs.

Embodiment 2

Hereinafter, a second preferred embodiment of a disk cartridge according to the present invention will be described.

Figure 19:
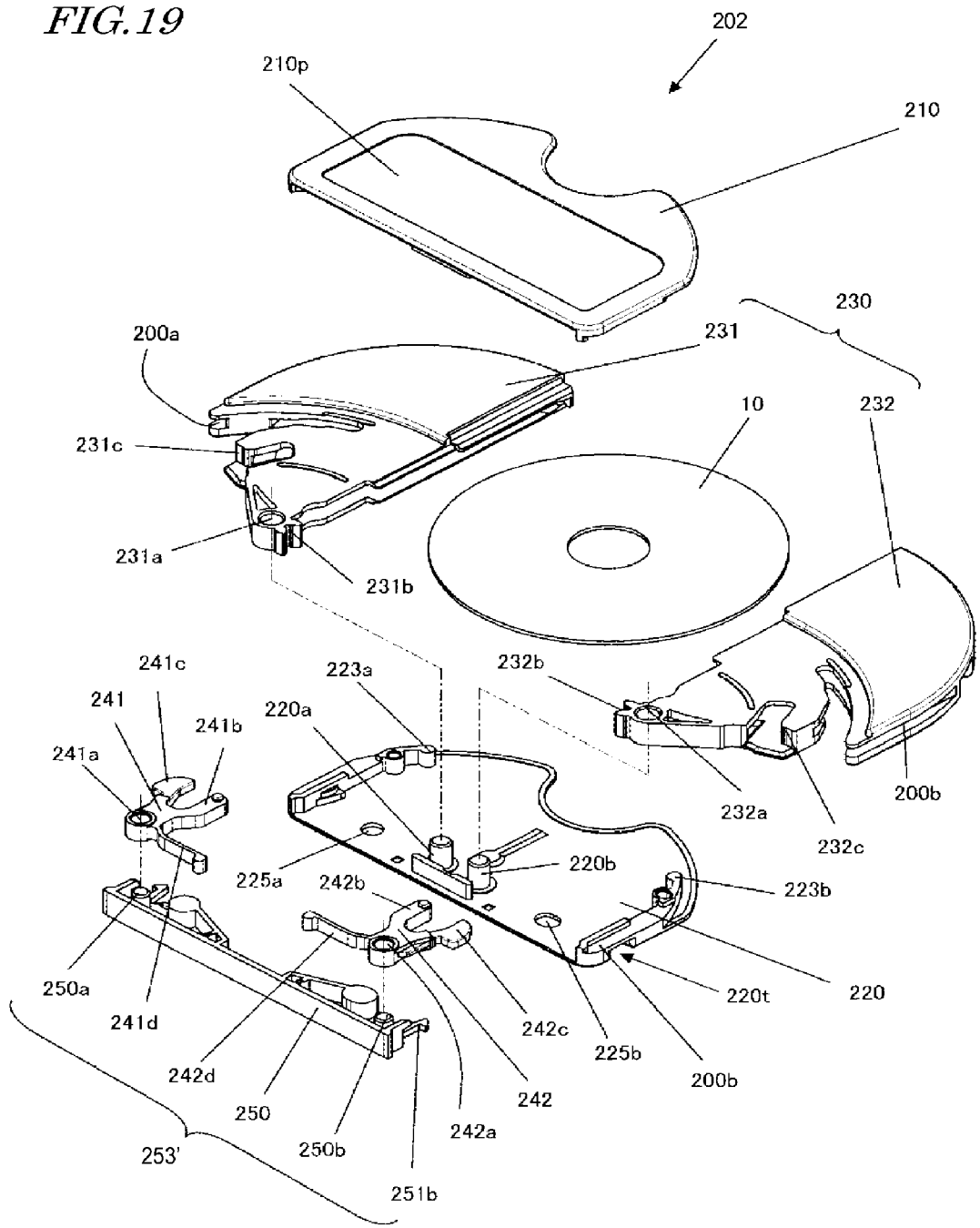
FIG. 19 is an exploded perspective view illustrating the structure of a disk cartridge as a second preferred embodiment of the present invention.

FIG. 19 is an exploded perspective view illustrating the respective components of a disk cartridge 202. Unlike the disk cartridge 201 of the first preferred embodiment described above, the first and second locking lever portions 241 and 242 and the locking lever supporting portion 250 do not form integral parts of the same member in this preferred embodiment as shown in FIG. 19. In the other respects, this preferred embodiment is the same as the first preferred embodiment described above. Therefore, any component having quite or substantially the same function as the counterpart of the first preferred embodiment is identified by the same reference numeral. And the overall structure of the disk cartridge 202 and the operations of opening and closing the disk housing 230 will not be described all over again.

As shown in FIG. 19, the locking unit 253' includes first and second locking lever portions 241' and 242' and a locking lever supporting portion 250. By fitting this locking unit 253' into the supporting base member 205, the first and second disk housing portions 231 and 232 in the closed state can be kept from rotating.

The first and second locking lever portions 241' and 242' can be secured rotatably to the locking lever supporting portion 250 by inserting pivots 250a and 250b on the locking lever supporting portion 250 into the pivot holes 241a and 242a of the first and second locking lever portions 241' and 242', respectively.

The first locking lever portion 241' includes a latching lever portion 241b, an opener/closer 241c and an elastic portion 241d. The latching lever portion 241b fits into the catching portion 231c of the first disk housing portion 231, thereby preventing the first disk housing portion 231 from turning while the disk housing 230 is closed. The operating portion 241 includes the latching lever portion 241b to receive external force, the opener/closer 241c for turning the first locking lever portion 241 externally, and the elastic portion 241d that produces biasing force by deforming elastically responsive to an external manipulation.

The first locking lever portion 241' includes a latching lever portion 241b, an opener/closer 241c and an elastic portion 241d. The latching lever portion 241b fits into the catching portion 231c of the first disk housing portion 231, thereby preventing the first disk housing portion 231 from turning in the opening direction while the disk housing 230 is closed. If the opener/closer 241c is pressed down externally, the first locking lever portion 241' can be biased so as to turn around the pivot hole 241a. And the elastic portion 241d deforms elastically while overcoming the biasing force applied by the opener/closer 241c, thereby producing biasing force in the first locking lever portion 241.

Likewise, the second locking lever portion 242' includes a latching lever portion 242b, an opener/closer 242c and an elastic portion 242d. The latching lever portion 242b gets engaged with the catching portion 232c of the second disk housing portion 232, thereby preventing the second disk housing portion 232 from turning in the opening direction while the disk housing 230 is closed. If the opener/closer 242c is pressed down externally, the second locking lever portion 242' can be biased so as to turn around the pivot hole 241b. And the elastic portion 242d deforms elastically while overcoming the biasing force applied by the opener/closer 242c, thereby producing biasing force in the second locking lever portion 242'.

Besides, the disk cartridge 202 has unlocking grooves 200a and 200b for operating the first and second locking lever portions 241' and 242' on the right- and left-hand sides thereof. The openers/closers 241c and 242c of the first and second locking lever portions 241' and 242' are designed so as to protrude through the opening at the bottom of the unlocking grooves 200a and 200b, respectively, but not to stick out of the outer shell of the disk cartridge 202. That is why it is possible to prevent the user from unlocking the disk housing 230 intentionally and carelessly.

Furthermore, as already described for the first preferred embodiment, the supporting base member 205 has an insertion port 205t, through which the locking unit 253' is supposed to be inserted.

Next, the structures of the supporting base member 205 and the locking unit 253' will be described with reference to FIGS. 20 and 21.

Figure 20:
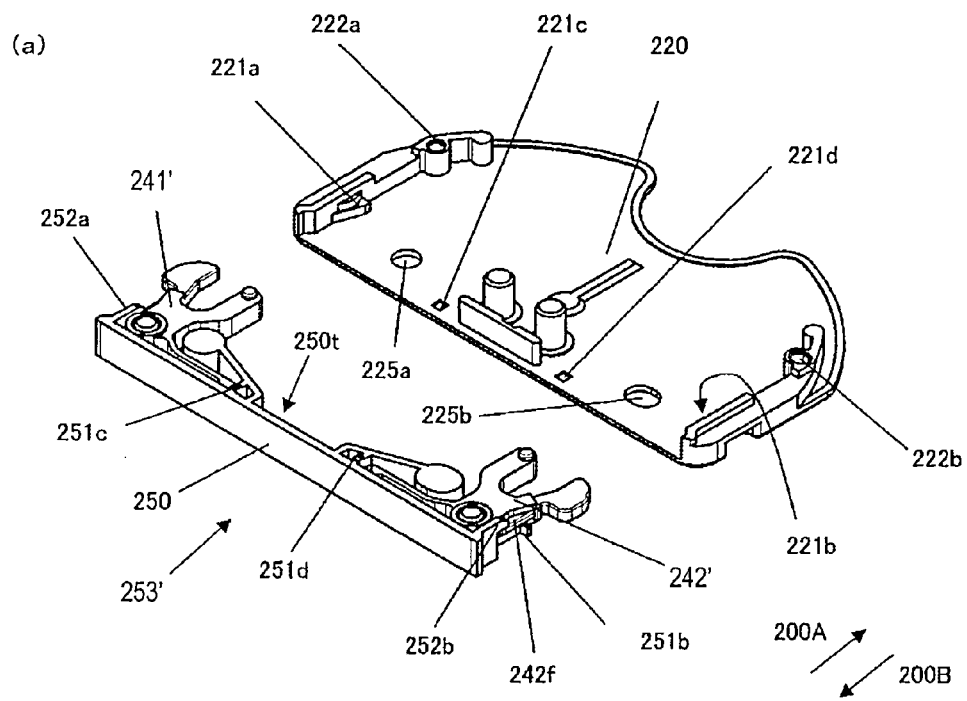
FIGS. 20(a) and 20(b) are perspective views illustrating a locking lever unit along with the lower supporting base portion and the upper supporting base portion, respectively, in the disk cartridge as the second preferred embodiment of the present invention.
Figure 20:
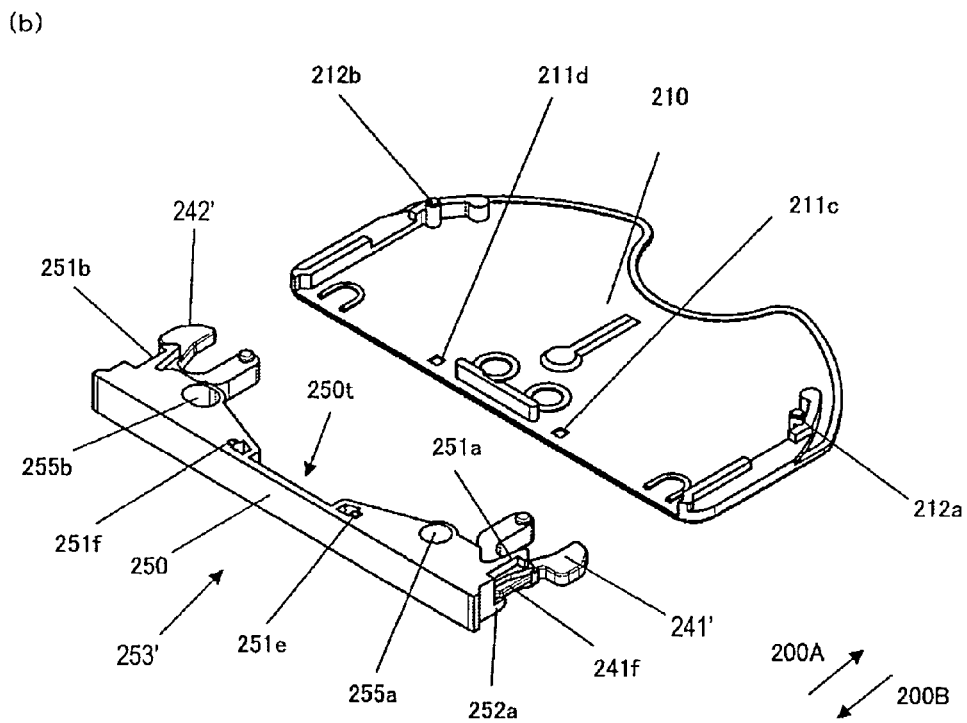

FIG. 20 shows perspective views illustrating the structures of the locking unit 253' and the supporting base member 205. Specifically, FIG. 20(a) illustrates the lower supporting base portion 220 and the locking unit 253', while FIG. 20(b) illustrates the upper supporting base portion 210 and the locking unit 253'.

Figure 21:
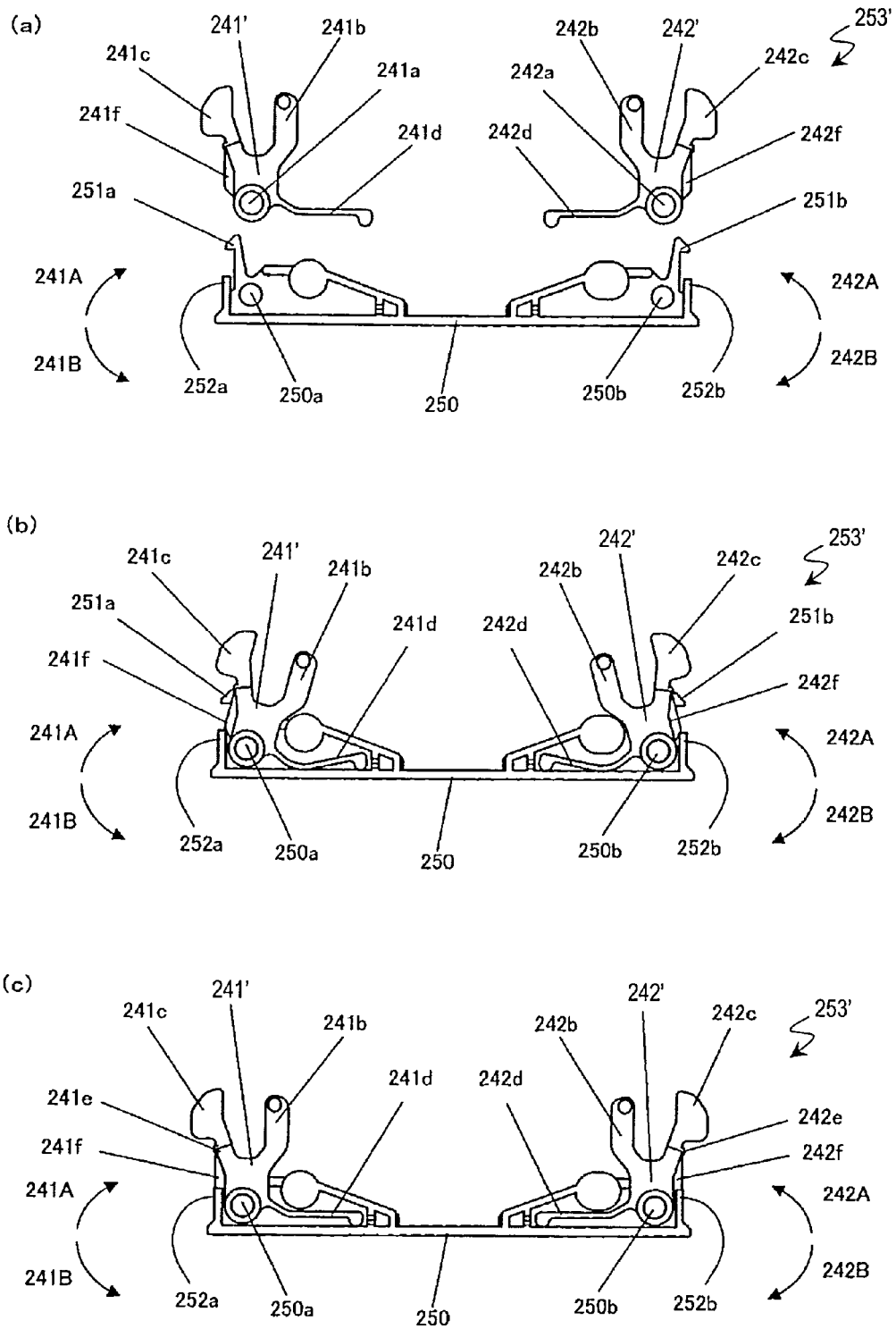
FIGS. 21(a), 21(b) and 21(c) are plan views illustrating the positions of the first and second locking lever portions in the disk cartridge as the second preferred embodiment of the present invention when the locking lever portions are yet to be inserted into the locking lever unit, when they have just been inserted into the locking lever unit, and how the locking lever portions inserted look, respectively.

FIG. 21 shows plan views illustrating the structure of the locking unit 253'. Specifically, FIG. 21(a) illustrates the position of the locking unit 253' yet to be inserted into the supporting base member 205. FIG. 21(b) illustrates the position of the locking unit 253' being inserted into the supporting base member 205. And FIG. 21(c) illustrates the position of the locking unit 253' that has already been inserted into the supporting base member 205.

As shown in FIG. 20, the locking lever supporting portion 250 includes latching claw portions 251a and 251b, upper latching raised portions 251c and 251d, and lower latching raised portions 251e and 251f, which function as stoppers when the locking unit 253' is inserted and fitted in the direction indicated by the arrow 200A.

The latching claw portions 251a and 251b engage with portions of the supporting base member 205 in the vicinity of both ends of the insertion port 205t thereof in the longitudinal direction. On the other hand, the upper and lower latching raised portions 251c, 251d, 251e and 251f engage with respective parts of the upper and lower supporting base portions 210 and 220 around the center of the edges that form the insertion port 205t.

To prevent the first and second locking lever portions 241 and 242, fitted into the locking lever supporting portion 250, from coming off, the locking lever supporting portion 250 further includes stopper portions 252a and 252b and the first and second locking lever portions 241' and 242' have stopper ribs 241f and 242f, respectively.

The locking lever supporting portion 250 is made of an elastic material and the body 250t of the locking lever supporting portion 250 has no reinforcing ribs and is easily deformable elastically. That is why when the locking unit 253' is inserted into the supporting base member 205 in the direction indicated by the arrow 200A, the body 250t of the locking lever supporting portion 250 is deformed elastically to flex the entire locking unit 253'. As a result, the assembling process can get done more smoothly.

The locking lever supporting portion 250 further includes positioning hole cover portions 255a and 255b that will cover the positioning holes 225a and 225b of the lower supporting base portion 220 so as to define recesses with the positioning holes 225a and 225b as bottom holes when the locking unit 253' is fitted into the supporting base member 205. In this manner, it is possible to prevent dust from entering the supporting base member 205 through the positioning holes 225a and 225b.

As shown in FIG. 20(a), the lower supporting base portion 220 has catching portions 221a and 221b to engage with the latching claw portions 251a and 251b of the locking lever supporting portion 250 and catching recessed portions 221c and 221d to engage with the lower latching raised portions 251e and 251f of the locking lever supporting portion 250. The catching portions 221a and 221b have a tapered side to get the locking unit 253' inserted easily in the direction indicated by the arrow 200A.

The lower supporting base portion 220 further has positioning holes 222a and 222b for aligning the lower supporting base portion 220 with the upper supporting base portion 210 when these two portions are joined together.

Likewise, the upper supporting base portion 210 has catching recessed portions 211c and 211d to engage with the upper latching raised portions 251c and 251d of the locking holder 250 as shown in FIG. 20(b).

The upper supporting base portion 210 further has positioning bosses 212a and 212b to be respectively fitted into the positioning holes 222a and 222b of the lower supporting base portion 220, thereby aligning these two supporting base portions with each other.

Also, ribs are arranged in the vicinity of the catching recessed portions 211c, 211d, 221c and 221d of the upper and lower supporting base portions 210 and 220 and around the center of the insertion port 205t in the longitudinal direction. That is why when the upper and lower supporting base portions 210 and 220 are joined and welded or bonded together, not only the ribs on both sides of the supporting base member 205 but also those ribs may be welded or bonded together to join the center portions of the supporting base member 205 together. As a result, even when the locking unit 253' is not fitted yet, the mechanical strength of the supporting base member 205 can also be increased.

Furthermore, the latching claw portions 251a and 251b of the locking lever supporting portion 250 engage with the catching portions 221a and 221b of the lower supporting base portion 220 and the upper and lower latching raised portions 251c, 251d, 251e and 251f of the locking lever supporting portion 250 respectively engage with the catching recessed portions 211c, 211d, 221c and 221d of the upper and lower supporting base portions 210 and 220. Consequently, the locking unit 253 can be firmly held by the supporting base member 205.

Unlike the first preferred embodiment described above, the locking lever supporting portion 250 gets engaged in this preferred embodiment with the supporting base member 250 in the thickness direction thereof around the center of the supporting base member 205. That is why the degree of engagement at those engaging portions cannot be as much as in the first preferred embodiment. However, by providing latching raised portions to get engaged with the upper and lower supporting base portions 210 and 220 such that the engagement is made at an increased number of points, the locking unit 253' can be held more firmly.

Next, it will be described with reference to FIG. 21 how the first and second locking lever portions 241' and 242' and the locking lever supporting portion 250 form the locking unit 253'.

As shown in FIG. 21(a), the first and second locking lever portions 241' and 242' and the locking lever supporting portion 250 do not form integral parts unlike the first preferred embodiment described above. In this preferred embodiment, the first and second locking lever portions 241' and 242' are formed as two identical members (i.e., so as to have the same shape even when turned upside down), thereby cutting down the die cost to make those members and minimizing the arrangement error of those members during the assembling process.

In the state shown in FIG. 21(a), the pivot holes 241a and 242a of the first and second locking lever portions 241' and 242' are respectively inserted into the pivots 250a and 250b on the locking lever supporting portion 250 with the first and second locking lever portions 241' and 242' tilted toward the directions indicated by the arrows 241A and 242A and with their elastic portions 241d and 242d deformed elastically. As a result, the first and second locking lever portions 241 and 242 are inserted into the locking lever supporting portion 250 without allowing the stopper ribs 241e and 242e of the first and second locking lever portions 241' and 242' to contact with the stopper portions 252a and 252b of the locking lever supporting portion 250 as shown in FIG. 21(b).

If the first and second locking lever portions 241' and 242' are rotated in the state shown in FIG. 21(b) in the directions indicated by the arrows 241B and 242B, respectively, with the biasing force applied by the elastic portions 241d and 242d, then the stopper ribs 241f and 242f of the first and second locking lever portions 241' and 242' get engaged with the stopper portions 252a and 252b of the locking lever supporting portion 250 as shown in FIG. 21(c), thus completing the locking unit 253'. The stopper ribs 241f and 242f and the stopper portions 252a and 252b overlap with each other along the axis of the pivots 250a and 250b of the locking lever supporting portion 250, thus preventing the first and second locking lever portions 241' and 242' from coming off the pivots 250a and 250b of the locking lever supporting portion 250. That is why the locking unit 253' can be completed without screwing or fastening with a different member. As a result, the number of members and the number of process steps required can be both cut down.

It should be noted that the first and second locking lever portions 241' and 242' have contact portions 241e and 242e, respectively. As in the first preferred embodiment described above, when the locking unit 253' is inserted into the supporting base member 205, the contact portions 241e and 242e will contact with the inner walls of the supporting base member 205 under the biasing force applied by the elastic portions 241d and 242d of the first and second locking levers 241 and 242. And since these contact portions 241e and 242e serve as stoppers, the positional accuracy of the first and second locking levers 241' and 242' in the disk cartridge 201 can be increased.

Figure 22:
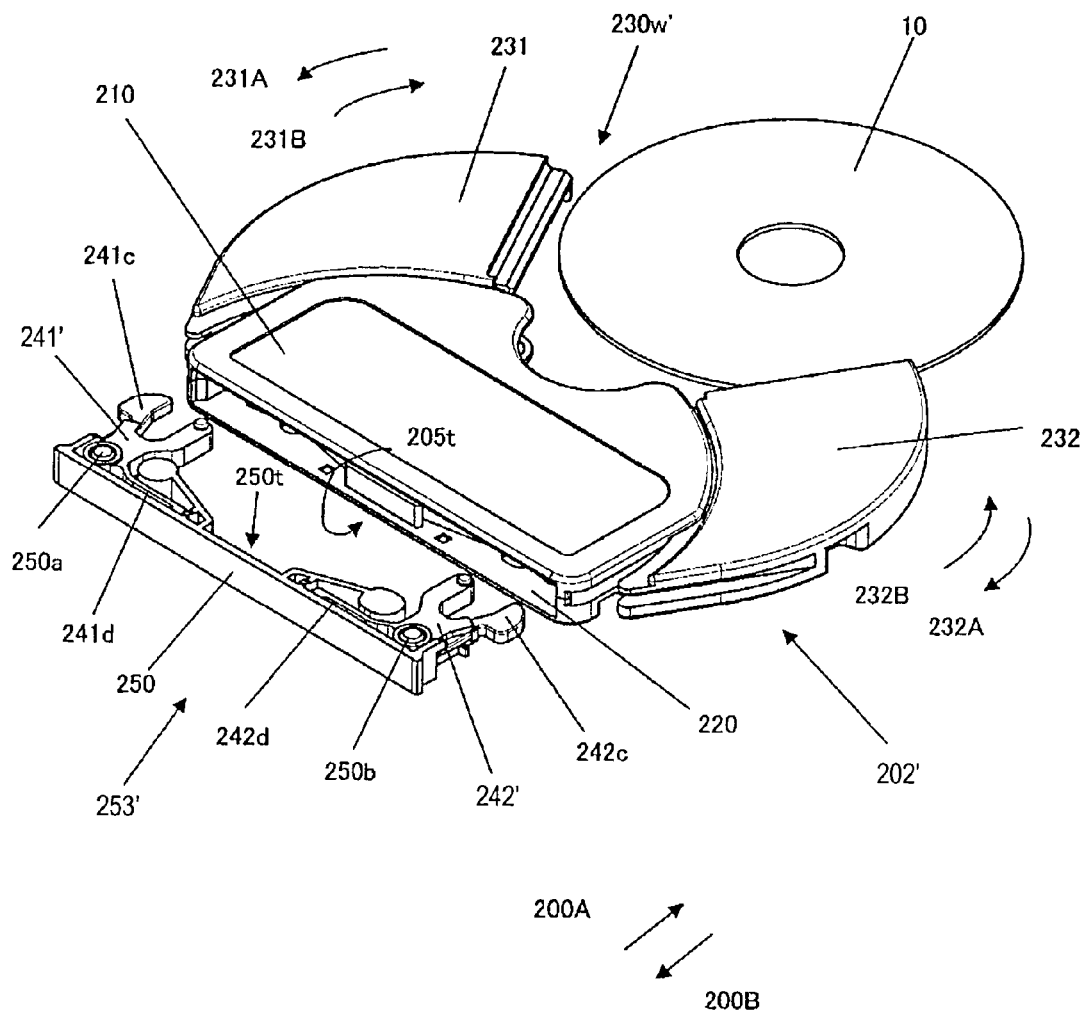
FIG. 22 is a perspective view illustrating how to insert a disk and assemble the locking lever unit into the disk cartridge as the second preferred embodiment of the present invention.

Next, it will be described how to assemble the disk cartridge 202. FIG. 22 is a perspective view illustrating an assembly process in which the disk 10 and the locking unit 253' are inserted into the disk cartridge 202' in the second opening position in which the disk housing 230 has been opened wide enough to insert or remove the disk 10 easily.

As already described for the first preferred embodiment, first, the pivots 220a and 220b of the lower supporting base portion 220 are inserted into the pivot holes 231a and 232b of the first and second disk housing portions 231 and 232 and the upper supporting base portion 210 is either welded or bonded with the lower supporting base portion 220. In this manner, the disk cartridge 202' can be assembled as shown in FIG. 22. Meanwhile, the locking unit 253' is also assembled as described above.

Hereinafter, it will be described with reference to FIGS. 23 through 27 how to complete the disk cartridge 202 by assembling the disk cartridge 202', the disk 10 and the locking unit 253' together.

Figure 23:
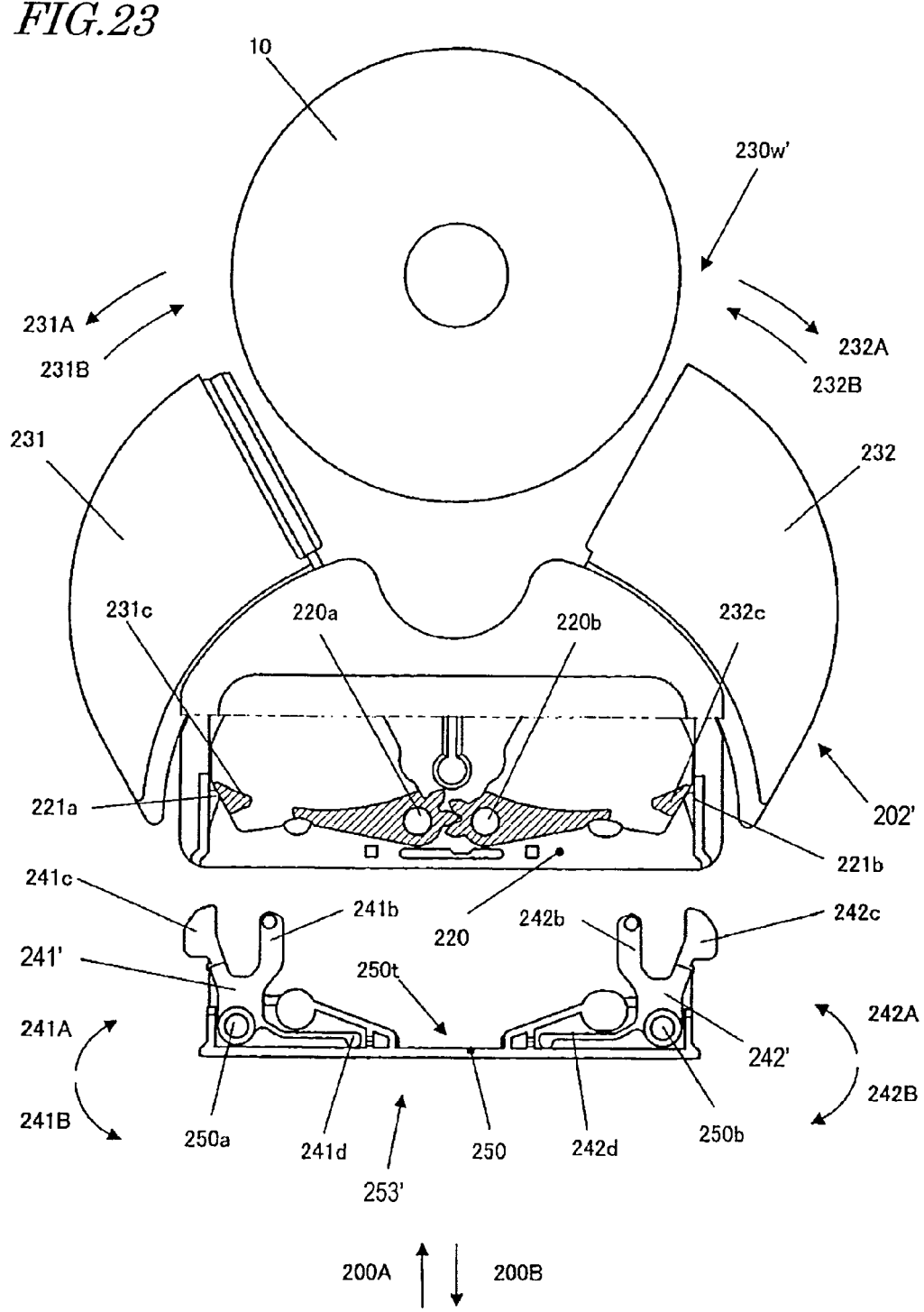
FIG. 23 is a partial cross-sectional view illustrating one stage of the assembling process of the disk cartridge as the second preferred embodiment of the present invention.

FIG. 23 is a partial cross-sectional view showing one stage of the assembly process of the disk cartridge 202 and illustrating a situation where the disk cartridge 202' has been opened to the second opening position. As shown in FIG. 23, the first and second disk housing portions 231 and 232 are kept from rotating in the directions indicated by the arrows 231A and 232A by the lower supporting base portion 220 (i.e., the supporting base member 205). As a result, a window 230w' in the second opening position, which is wider than the window 230w in the first opening position shown in FIG. 6(b), is defined. In this second opening position, the disk 10 may be either inserted in the direction indicated by the arrow 200B or ejected in the direction indicated by the arrow 200A.

In the state shown in FIG. 23, the disk 10 is inserted in the direction indicated by the arrow 200B into the disk cartridge 202'. As the disk housing 230 has been opened to the second position as shown in FIG. 23, the disk 10 can be inserted through the window 230w' into the disk cartridge 202'.

Figure 24:
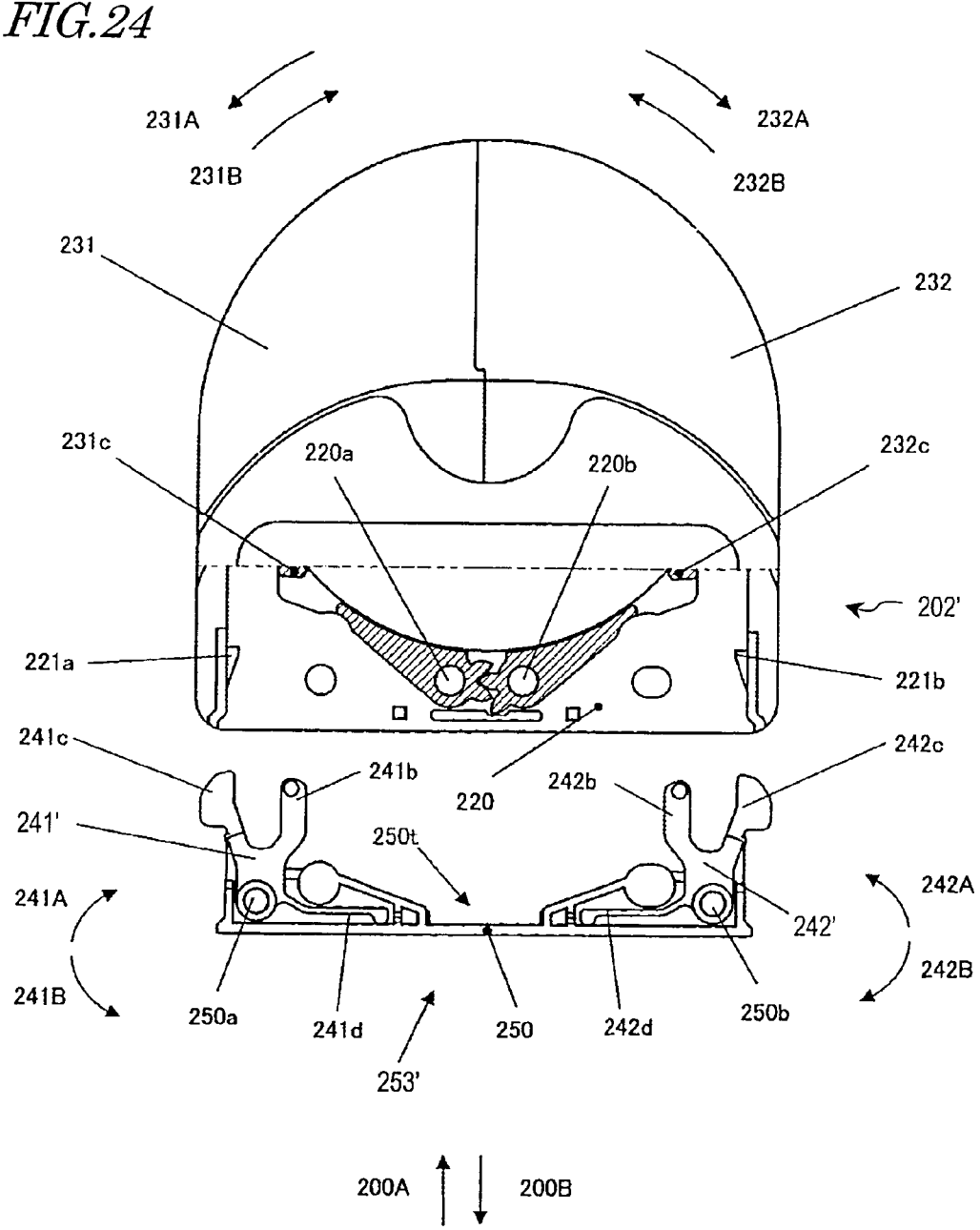
FIG. 24 is a partial cross-sectional view illustrating another stage of the assembling process of the disk cartridge as the second preferred embodiment of the present invention.

If the first and second disk housing portions 231 and 232 in the positions shown in FIG. 23 are turned in the directions indicated by the arrows 231B and 232B, respectively, then the disk housing 230 will be fully closed and the disk 10 will get housed in the disk housing 230 as shown in FIG. 24. At this point in time, however, the locking unit 253' has not been inserted yet, and therefore, the disk housing 230 can be opened or closed freely. If necessary, the disk housing 230 closed may be opened to the second opening position and the disk 10 may be removed.

As already described with reference to FIG. 6, the disk drive opens or closes the disk housing 230 with the opening/closing members 151 and 152 of the disk drive fitted into the notches 231d and 232d of the first and second disk housing portions 231 and 232. That is why even the disk cartridge 202' that has no locking unit 253' yet can also be loaded into the disk drive and can have its disk housing 230 opened or closed with no problem. Consequently, the disk cartridge 202' allows the user to insert or remove the disk 10 freely into/from it. Such a disk cartridge 202' may be used in a manufacturing or development process step in which the disks 10 need to be changed frequently, e.g., in the process step of testing the disk drive to be loaded with the disk cartridge 202 or during the development of game software.

Figure 25:
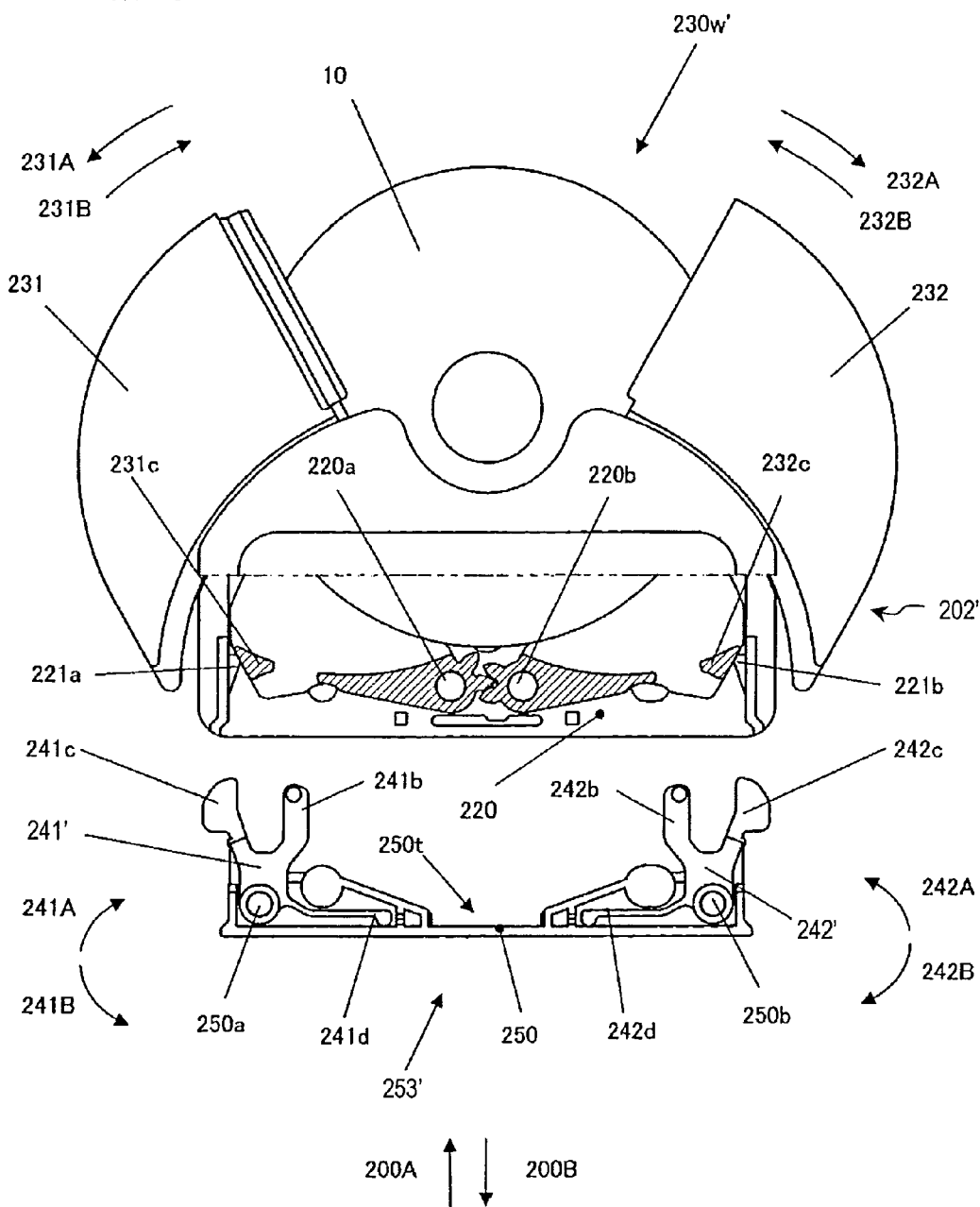
FIG. 25 is a partial cross-sectional view illustrating still another stage of the assembling process of the disk cartridge as the second preferred embodiment of the present invention.
Figure 26:
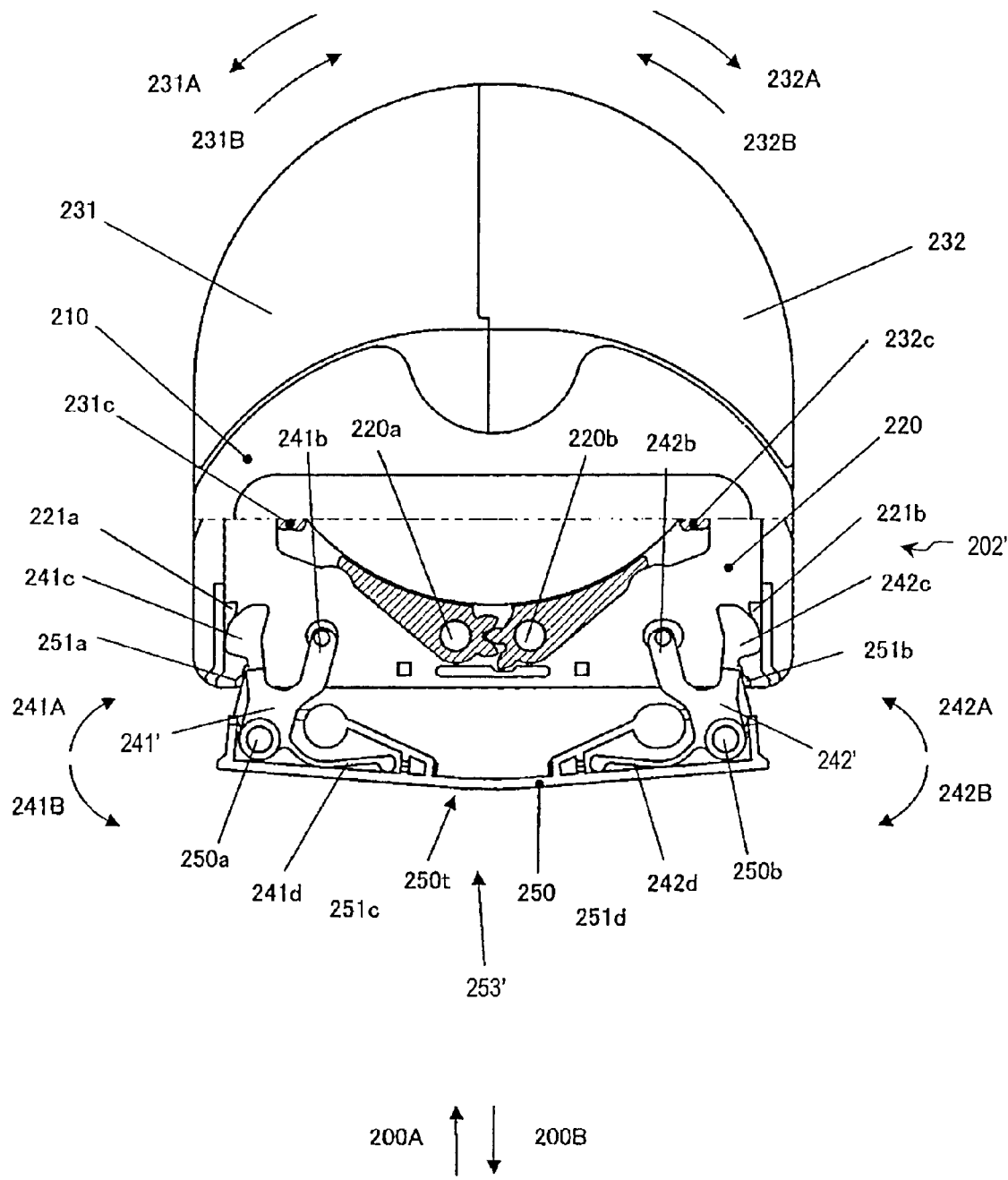
FIG. 26 is a partial cross-sectional view illustrating yet another stage of the assembling process of the disk cartridge as the second preferred embodiment of the present invention.

If the locking unit 253' is inserted in the direction indicated by the arrow 200A into the disk cartridge 202' in the state shown in FIG. 25, then the openers/closers 241c and 242c of the first and second locking lever portions 241' and 242' will contact with the inner walls of the lower supporting base portion 220 (or supporting base member 205) as shown in FIG. 26. As a result, the first and second locking lever portions 241 and 242 are turned around the pivots 250a and 250b in the directions indicated by the arrows 241A and 242A, respectively. Meanwhile, the body 250t of the locking lever supporting portion 250 is deformed elastically. As a result, the locking unit 253' gets inserted into the supporting base member 205 while being flexed entirely.

Since the body 250t of the locking lever supporting portion 250 can be flexed in this manner while the first and second locking lever portions 241' and 242' are turning, the locking unit 253' being inserted can be deformed significantly in its entirety. As a result, the load to be placed while the locking unit 253' is inserted can be reduced so much that the locking unit 253' can be inserted easily. In other words, the disk cartridge 202 can be assembled more easily.

In addition, as the locking unit 253' is flexed in its entirety, the latching claw portions 251a and 251b of the locking lever supporting portion 250 gets engaged with the supporting base member 205 earlier than the latching raised portions 251c to 251f. That is to say, since only two of the six latching claw or raised portions get engaged at the same time while the locking unit 253' is being inserted, the locking unit 253' can be inserted with reduced force. As a result, the disk cartridge 202 can be assembled more easily.

Figure 27:
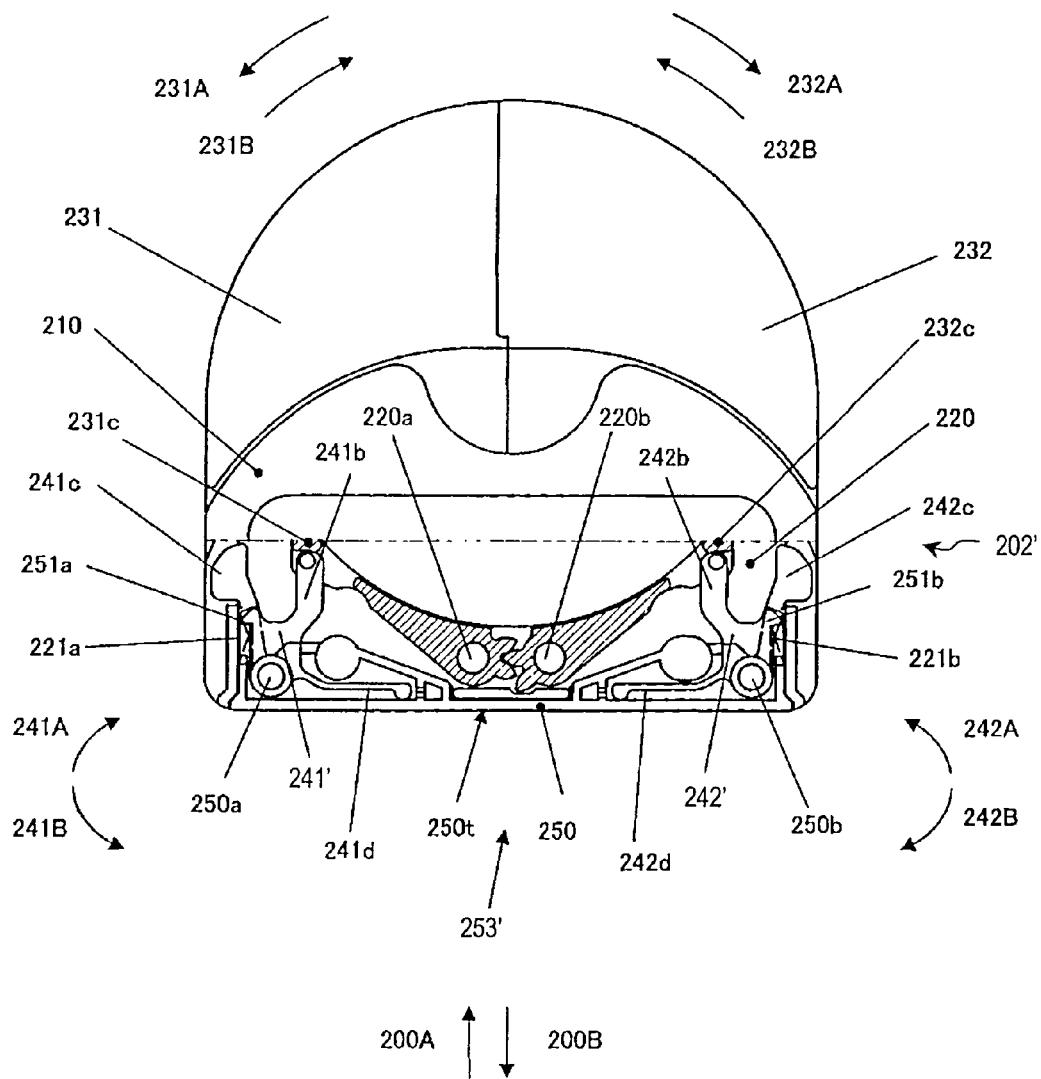
FIG. 27 is a partial cross-sectional view illustrating yet another stage of the assembling process of the disk cartridge as the second preferred embodiment of the present invention.

As the locking unit 253' in the position shown in FIG. 26 is further inserted deeper in the direction indicated by the arrow 200A, the latching claw portions 251a and 251b get engaged earlier than the latching raised portions 251c to 251f because the locking lever supporting portion 250 is flexed in its entirety as described above. As a result, the locking unit 253' gets fully fitted into the supporting base member 205 as shown in FIG. 27. The latching lever portions 241b and 242b of the first and second locking lever portions 241' and 242' get engaged with the catching portions 231c and 232c of the first and second disk housing portions 231 and 232, thereby keeping the first and second disk housing portions 231 and 232 from rotating in the directions indicated by the arrows 231A and 232A. At the same time, the openers/closers 241c and 242c of the first and second locking lever portions 241' and 242' protrude through the unlocking grooves 200a and 200b on the side surfaces of the supporting base member 205. In this manner, the disk cartridge 202 is completed.

By inserting the locking unit 253' into the disk cartridge 202' in this manner, the first and second locking lever portions 241 and 242 can keep the disk housing 230 in the closed state from rotating. On the other hand, while the disk housing 230 is opened, the locking unit 253' can keep the first and second disk housing portions 231 and 232 from further rotating in the directions indicated by the arrows 231A and 232A as shown in FIG. 6(b), thereby avoiding the expansion of the window and preventing the user from removing the disk 10.

In the assembling procedure described above, before the locking unit 253' is inserted into the supporting base member 205 of the disk cartridge 202', the first and second disk housing portions 231 and 232 are closed. However, the locking unit 253' may also be inserted even with the first and second disk housing portions 231 and 232 opened.

Figure 28:
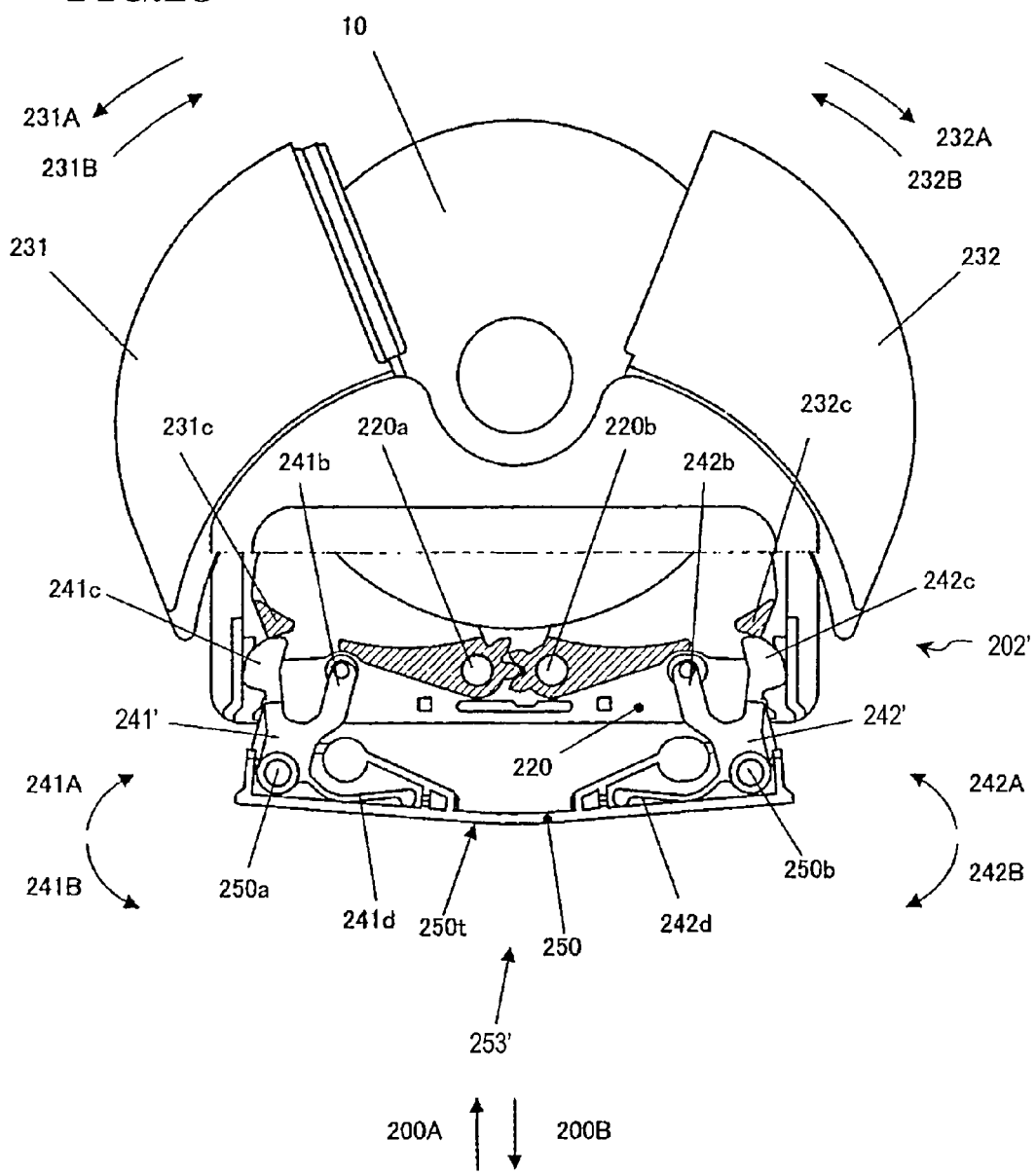
FIG. 28 is a partial cross-sectional view illustrating yet another stage of the assembling process of the disk cartridge as the second preferred embodiment of the present invention in which the locking members are inserted when the disk housing is opened.

FIG. 28 is a partial cross-sectional view illustrating a situation where the locking unit 253' is inserted with the first and second disk housing portions 231 and 232 opened. As shown in FIG. 28, if the locking unit 253' is inserted with the first and second disk housing portions 231 and 232 opened, then the openers/closers 241c and 242c of the first and second locking lever portions 241' and 242' contact with the catching portions 231c and 232c of the first and second disk housing portions 231 and 232, respectively. For that reason, if the locking unit 253' is inserted deeper in the direction indicated by the arrow 200A, the first and second disk housing portions 231 and 232 being in contact with the openers/closers 241c and 242c of the first and second locking lever portions 241' and 242' rotate in the directions indicated by the arrows 231B and 232B, respectively. That is why even if the locking unit 253' is inserted with the first and second disk housing portions 231 and 232 opened, the disk housing 230 can also be closed and the disk cartridge 202 can be assembled with no problem at all as the locking unit 253' is inserted deeper. As a result, no matter whether the disk housing 230 is opened or closed while the locking unit 253' is being inserted, the disk cartridge 202 can be assembled just as intended with the number of mistakes reduced during the assembling work. On top of that, since the disk housing 230 is closed by itself as the locking unit 253' is inserted, the number of assembling process steps can be cut down, too.

As can be seen easily from the foregoing description, in the disk cartridge of this preferred embodiment, the locking unit 253', which not only controls the angle of the window defined by the disk housing 230 but also keeps the disk housing 230 in the closed state from rotating, can be inserted as in the first preferred embodiment after the disk cartridge 202', made up of the disk housing 230 and the supporting base member 205, has been assembled. For that reason, while the disk cartridge 202' still has no locking unit, the disk housing 230 can also be opened wide enough to readily remove the disk 10 from the disk cartridge. That is why the assembling process of the disk cartridge 202 can be completed by inserting the locking unit 253' through the insertion port of the supporting base member 205 after the disk 10 has been inserted into the disk cartridge 202'. As a result, the manufacturing process of the disk 10 and the assembling process of the disk cartridge 202 can be totally separated from each other. Consequently, a disk cartridge manufacturing process can be carried out with the manufacturing process of the disk 10 and the assembling process of the disk cartridge 202, which have quite different process and testing methods, performed in two different places, thus increasing the degree of flexibility of the manufacturing process and cutting down the manufacturing costs significantly.

Besides, by inserting the locking unit 253', the disk housing 230 in the closed state can be kept from rotating and the angle of the window defined by the disk housing 230 opened can be controlled so as to prevent the user from removing the disk 10 from the disk cartridge 202.

Also, unlike the first preferred embodiment described above, the first and second locking lever portions 241' and 242' and the locking lever supporting portion 250 are provided separately in this preferred embodiment. Thus, the first and second locking lever portions 241' and 242' can be rotated around the pivots and the rotating operation can be stabilized. Furthermore, if the first and second locking lever portions 241' and 242' are made of a different material from that of the locking lever supporting portion 250, then the elasticity of the elastic portions 241d and 242d of the first and second locking lever portions 241' and 242' can be optimized. As a result, the first and second locking lever portions 241' and 242' and the locking lever supporting portion 250 can be designed much more flexibly.

Embodiment 3

Figure 29:
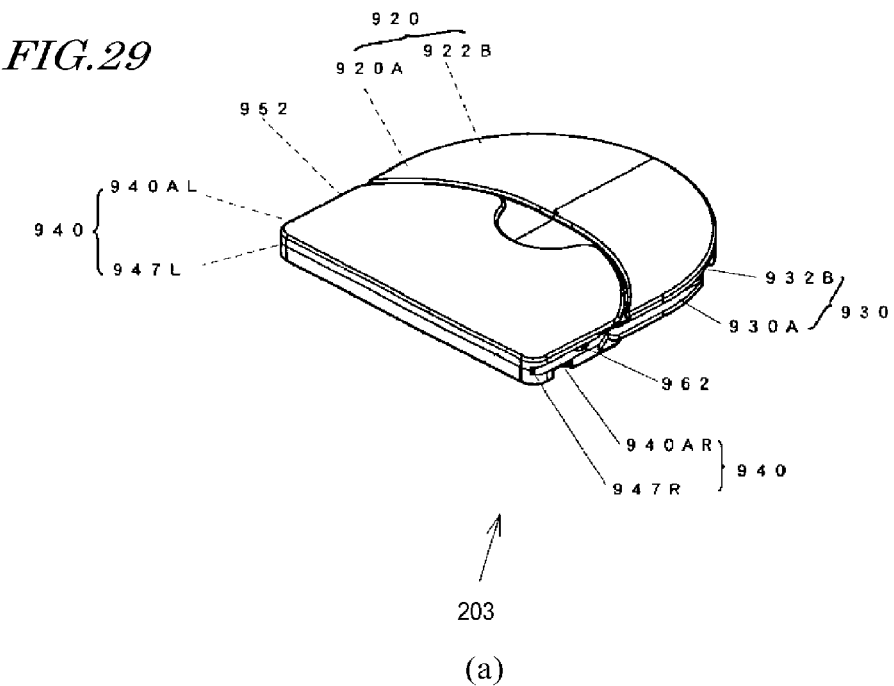
FIGS. 29(a) and 29(b) are perspective views illustrating how a disk cartridge as a third preferred embodiment of the present invention looks when its disk housing is closed and when its disk housing is opened, respectively.
Figure 29:
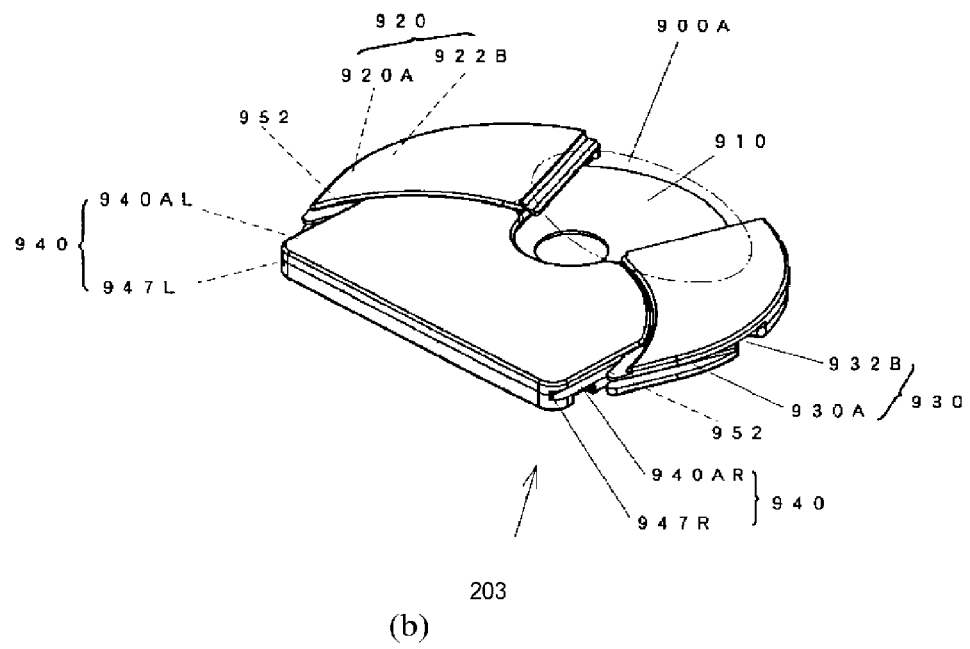
Figure 30:
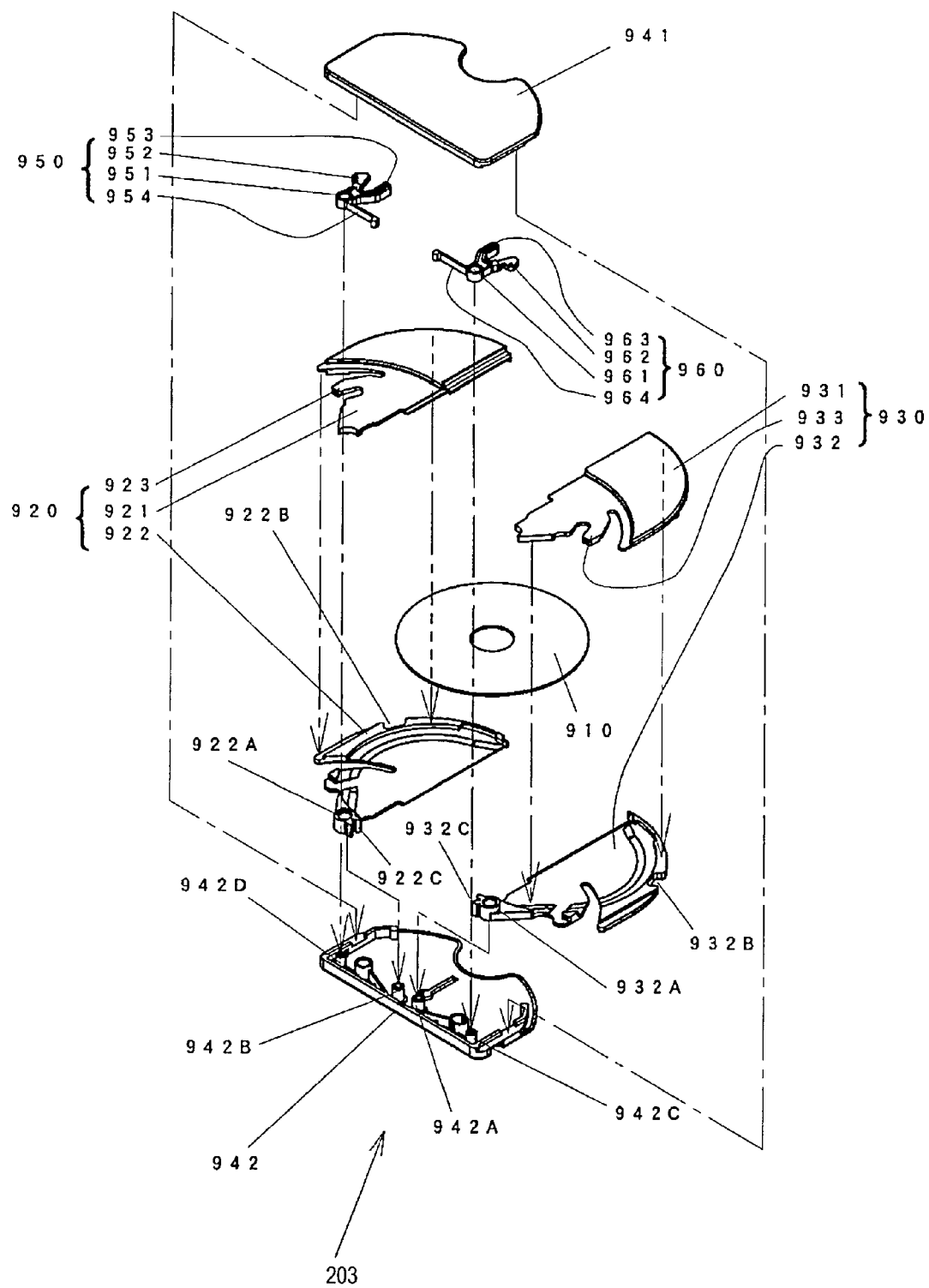
FIG. 30 is an exploded perspective view illustrating the internal structure of the disk cartridge as the third preferred embodiment of the present invention.

Hereinafter, a third preferred embodiment of a disk cartridge according to the present invention will be described. FIGS. 29(a) and 29(b) are perspective views illustrating the overall configuration of a disk cartridge 203 according to the present invention. FIG. 30 is an exploded perspective view illustrating the internal configuration of the disk cartridge 203 shown in FIG. 29. And FIG. 31(a) and 31(b) are perspective views illustrating the backside of the disk cartridge 203 shown in FIG. 29. As shown in these drawings, the disk cartridge 203 includes a supporting base member 940 consisting of an upper supporting base portion 941 and a lower supporting base portion 942, a first disk housing portion 920 made up of first disk housing portion upper and lower shells 921 and 922, and a second disk housing portion 930 made up of second disk housing portion upper and lower shells 931 and 932. The disk cartridge 203 further includes first and second locking members 950 and 960.

The supporting base member 940 and the first and second disk housing portions 920 and 930 correspond to, and perform the same functions as, the supporting base member 205 and the first and second disk housing portions 210 and 220 of the first and second preferred embodiments described above.

Each of the first and second disk housing portions 920 and 930 has a baglike space that defines a gap in the thickness direction of the disk 910. As shown in FIGS. 29(a) and 31(a), when the first and second disk housing portions 920 and 930 are closed, the first and second disk housing portions 920 and 930 are merged together with the edges of their baglike openings fitted closely into each other. In this manner, the disk 910 can be housed in its entirety so as not to be exposed at all.

As shown in FIGS. 29(b) and 31(b), when the first and second disk housing portions 920 and 930 are opened, a substantially fan-shaped window 900A is created by the supporting base member 940 and the first and second disk housing portions 920 and 930 to allow a spindle motor, clamper and other members for rotating the disk 910 to chuck the disk 910 and also allow a read/write head to enter the disk cartridge 203 and access the disk 910 from outside of the disk cartridge 203.

Therefore, the first and second disk housing portions 920 and 930 function not only as a housing, or an outer shell for the disk cartridge 203, but also as shutters for opening and shutting the window 900A.

Figure 31:
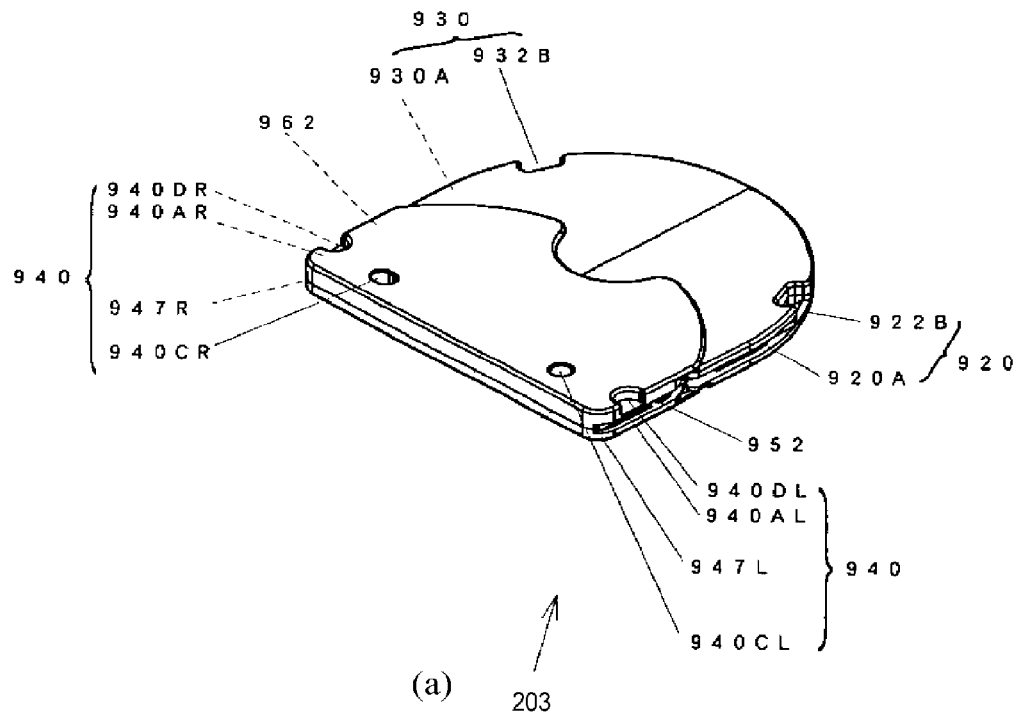
FIGS. 31(a) and 31(b) are perspective views illustrating how the downside of the disk cartridge as the third preferred embodiment of the present invention looks when its disk housing is closed and when its disk housing is opened, respectively.
Figure 31:
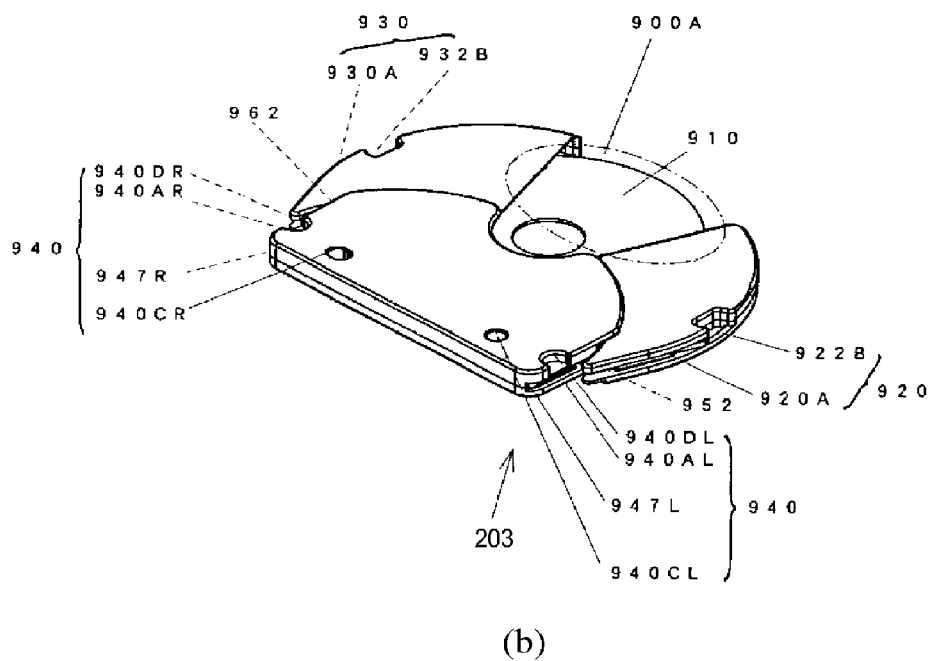

As shown in FIG. 31, the lower supporting base portion 942 has first and second positioning holes 940CL and 940CR to position the disk cartridge 203 on a plane that is parallel to the disk 910 that has been loaded in a rotatable position into a disk drive (not shown) that uses the disk cartridge 203. Also, the lower supporting base portion 942 has first and second notches 940DL and 940DR on both sides thereof. These notches 940DL and 940DR may be used to prevent the user from loading the disk cartridge 203 upside down in a tray loading system or to hold the disk cartridge 203 in a slot loading system, for example.

As shown in FIG. 30, the pivot holes 922A and 932A of the first and second disk housing portions 920 and 930 are respectively inserted into first and second pivots 942A and 942B on the lower supporting base portion 942, thereby securing the first and second disk housing portions 920 and 930 rotatably with respect to the supporting base member 940.

The first and second disk housing portions 920 and 930 further have engaging portions 922C and 932C that engage and interlock with each other. By interlocking these engaging portions 922C and 932C with each other, the first and second disk housing portions 920 and 930 can turn in mutually opposite directions and synchronously with each other.

Also, the first and second disk housing portions 920 and 930 have first and second notches 922B and 932B, which can be used to open or close the first and second disk housing portions 920 and 930.

The first and second locking members 950 and 960 have locking pivot holes 951 and 961, respectively, into which the first and second pivots 942D and 942C on the lower supporting base portion 942 are respectively inserted. In this manner, the first and second locking members 950 and 960 are secured rotatably to the supporting base member 940.

The first locking member 950 includes a latching lever portion 953, an opener/closer 952 and an elastic portion 954. The latching lever portion 953 fits into the catching portion 923 of the first disk housing portion 920, thereby preventing the first disk housing portion 920 from turning in the opening direction while the disk housing 930 is closed. If the opener/closer 952 is pressed down externally, the first locking member 950 can be biased so as to turn around the locking pivot hole 951. And the elastic portion 954 deforms elastically while overcoming the biasing force applied by the opener/closer 952, thereby producing biasing force in the first locking member 950.

Likewise, the second locking member 960 includes a latching lever portion 963, an opener/closer 962 and an elastic portion 964. The latching lever portion 963 fits into the catching portion 933 of the second disk housing portion 930, thereby preventing the second disk housing portion 930 from turning in the opening direction while the disk housing 930 is closed. If the opener/closer 962 is pressed down externally, the second locking member 960 can be biased so as to turn around the locking pivot hole 961. And the elastic portion 964 deforms elastically while overcoming the biasing force applied by the opener/closer 962, thereby producing biasing force in the second locking member 960.

The openers/closers 952 and 962 of the first and second locking members 950 and 960 are pressed by members provided for the disk drive when the disk cartridge 203 is loaded into the disk drive. The disk cartridge 203 has unlocking grooves to pass such members for pressing the openers/closers 952 and 962 of the first and second locking members 950 and 960.

Specifically, the first and second disk housing portions 920 and 930 and the supporting base member 940 have such unlocking grooves on their side surfaces that run perpendicularly to the line segment that connects together the pivot holes 922A and 932A, which are the respective centers of rotation of the first and second disk housing portions 920 and 930. More specifically, the first and second disk housing portions 920 and 930 have a first housing portion groove 920A and a second housing portion groove 930A, respectively, while the supporting base member 940 has a left body groove 940AL and a right body groove 940AR. While the first and second disk housing portions 920 and 930 are closed, the first housing portion groove 920A and the left body groove 940AL form a single continuous groove and the second housing portion groove 930A and the right body groove 940AR form another single continuous groove.

Figure 32:
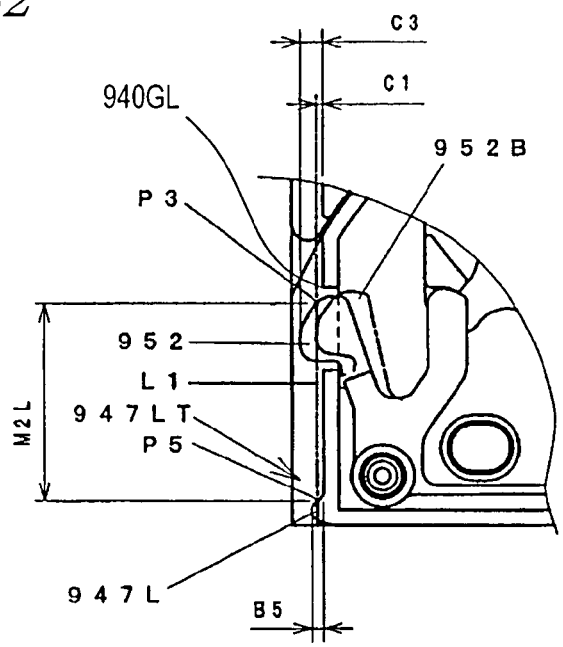
FIGS. 32(a) and 32(b) illustrate, on a larger scale, the structures of the disk cartridge of the third preferred embodiment in the vicinity of the first and second locking members, respectively.
Figure 32:
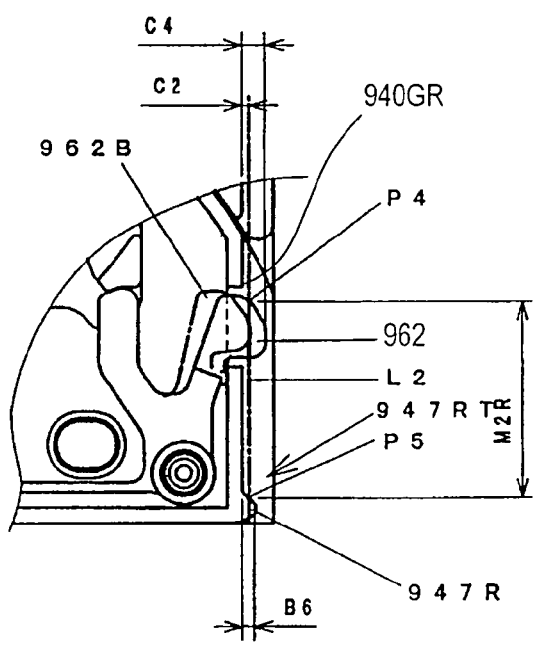

FIGS. 32(a) and 32(b) are cross-sectional views illustrating the respective structure of the first and second locking members 950 and 960 in the vicinity of their openers/closers 952 and 962. The bottoms of the left and right body grooves 940AL and 940AR of the supporting base member 940 have openings 940GL and 940GR, respectively, through which the openers/closers 952 and 962 of the first and second locking members 950 and 960 protrude into the left and right body grooves 940AL and 940AR, respectively. However, the first and second locking members 950 and 960 are arranged such that their openers/closers 952 and 962 do not stick out of the outer shell of the disk cartridge 203, i.e., do not reach outside of the left and right body grooves 940AL and 940AR. In this manner, it is possible to prevent the openers/closers 952 and 962 from being externally pressed accidentally.

As will be described in detail later, while the first and second disk housing portions 920 and 930 are locked, the openers/closers 952 and 962 protrude through the openings 940GL and 940GR and reach a first set of levels C3 and C4 inside the left and right body grooves 940AL and 940AR as indicated by 952 and 962, respectively. On the other hand, when the first and second disk housing portions 920 and 930 are unlocked, the openers/closers 952 and 962 protrude through the openings 940GL and 940GR and reach a second set of levels C1 and C2 inside the left and right body grooves 940AL and 940AR as indicated by 952B and 962B, respectively.

Furthermore, protrusions 947L and 947R are arranged on the bottom of the left and right body grooves 940AL and 940AR, respectively, so as to be located on the rear end of the disk cartridge 203, which is opposite to the front end thereof to reach the disk drive sooner than any other portion thereof when the disk cartridge 203 is inserted into the disk drive. The levels reached by these protrusions 947L and 947R that protrude from the respective bottoms of the left and right body grooves 940AL and 940AR are indicated by B5 and B6, respectively.

These protrusion levels B5 and B6 are smaller than the first set of protrusion levels C3 and C4 but greater than the second set of protrusion levels C1 and C2. If this relation is satisfied, the first and second disk housing portions 920 and 930 can be unlocked just as intended with first and second unlocking portions 762a and 762b. Also, when brought into contact with the first and second unlocking portions 762a and 762b, these protrusions 947L and 947R will serve as stoppers in a situation where the disk cartridge 203 is going to be loaded upside down into the disk drive by mistake.

Hereinafter, it will be described with reference to FIGS. 33 through 36 how to open and close the first and second disk housing portions 920 and 930 in the disk cartridge 203.

Figure 33:
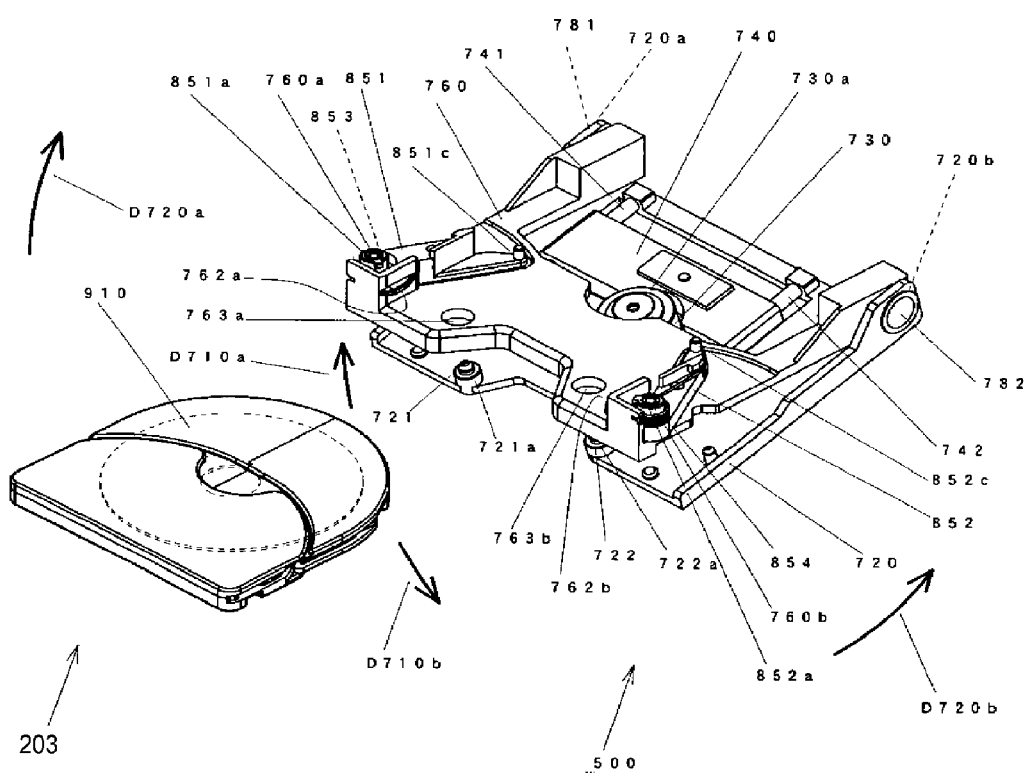
FIG. 33 is a perspective view illustrating a situation where the disk cartridge of the third preferred embodiment is yet to be loaded into a disk drive.

FIG. 33 is a perspective view illustrating a state where the disk cartridge 203 is yet to be inserted into a disk drive 500 that is compatible with the disk cartridge 203. As shown in FIG. 33, the disk drive 500 includes a traverse base 720, a spindle motor 730, an optical head 740 and a cartridge holder 760.

The spindle motor 730 has a turntable 730a and is designed to mount the disk 910 on the turntable 730a and rotate it thereon.

The optical head 740 performs a read/write operation on the disk 910. The optical head 740 is arranged so as to driven by a drive motor (not shown) along first and second guide shafts 741 and 742 and in the radial direction of the disk 910 that is mounted on the turntable 730a. The spindle motor 730 and the first and second guide shafts 741 and 742 are fixed on, and supported by, the traverse base 720.

The traverse base 720 has positioning pins 721 and 722 to be fitted into the positioning holes 940CL and 940CR of the disk cartridge 203. The positioning pins 721 and 722 position the disk cartridge 203 parallel to the information storage layer of the disk 910. Also, the positioning pins 721 and 722 have bearing surfaces 721a and 722a to position the disk cartridge 203 perpendicularly to the information storage layer of the disk 910, too.

The cartridge holder 760 is designed to hold the disk cartridge 203 and is secured to the traverse base 720 so as to rotate on shaft screws 781 and 782 and around shaft holes 720a and 720b in the directions indicated by the arrows D710a and D710b. As will be described later, the cartridge holder 760 includes first and second unlocking portions 762a and 762b to press the first and second openers/closers 952 and 962 of the first and second locking members 950 and 960, respectively, while the disk cartridge 203 is being inserted. Each of the unlocking portions 762a and 762b is formed as a rib with tapered sides on both ends, which are tilted in the directions in which the disk cartridge 203 is inserted and ejected. The cartridge holder 760 also has clearance holes 763a and 763b to avoid being interfered with by the positioning pins 721 and 722 on the traverse base 720. The positioning pins 721 and 722 pass through the clearance holes 763a and 763b, respectively, to be inserted into their associated positioning holes 940CL and 940CR of the disk cartridge 203 that is held on the cartridge holder 760.

The cartridge holder 760 is further provided with first and second opening/closing levers 851 and 852, which are secured rotatably to the cartridge holder 760 by inserting their pivot holes 851a and 852a into pivots 760a and 760b, respectively, on the cartridge holder 760. As will be described later, the engaging portions 851c and 852c of the first and second opening/closing levers 851 and 852 get engaged with first and second notches 922B and 932B of the first and second disk housing portions 920 and 930, respectively, thereby opening or closing the first and second disk housing portions 920 and 930. The first and second opening/closing levers 851 and 852 are equipped with first and second lever biasing springs 853 and 854 to bias the levers 851 and 852 in the directions indicated by the arrows D720a and D720b, respectively.

Hereinafter, it will be described with reference to FIGS. 34 through 37 how this disk drive 500 operates.

Figure 34:
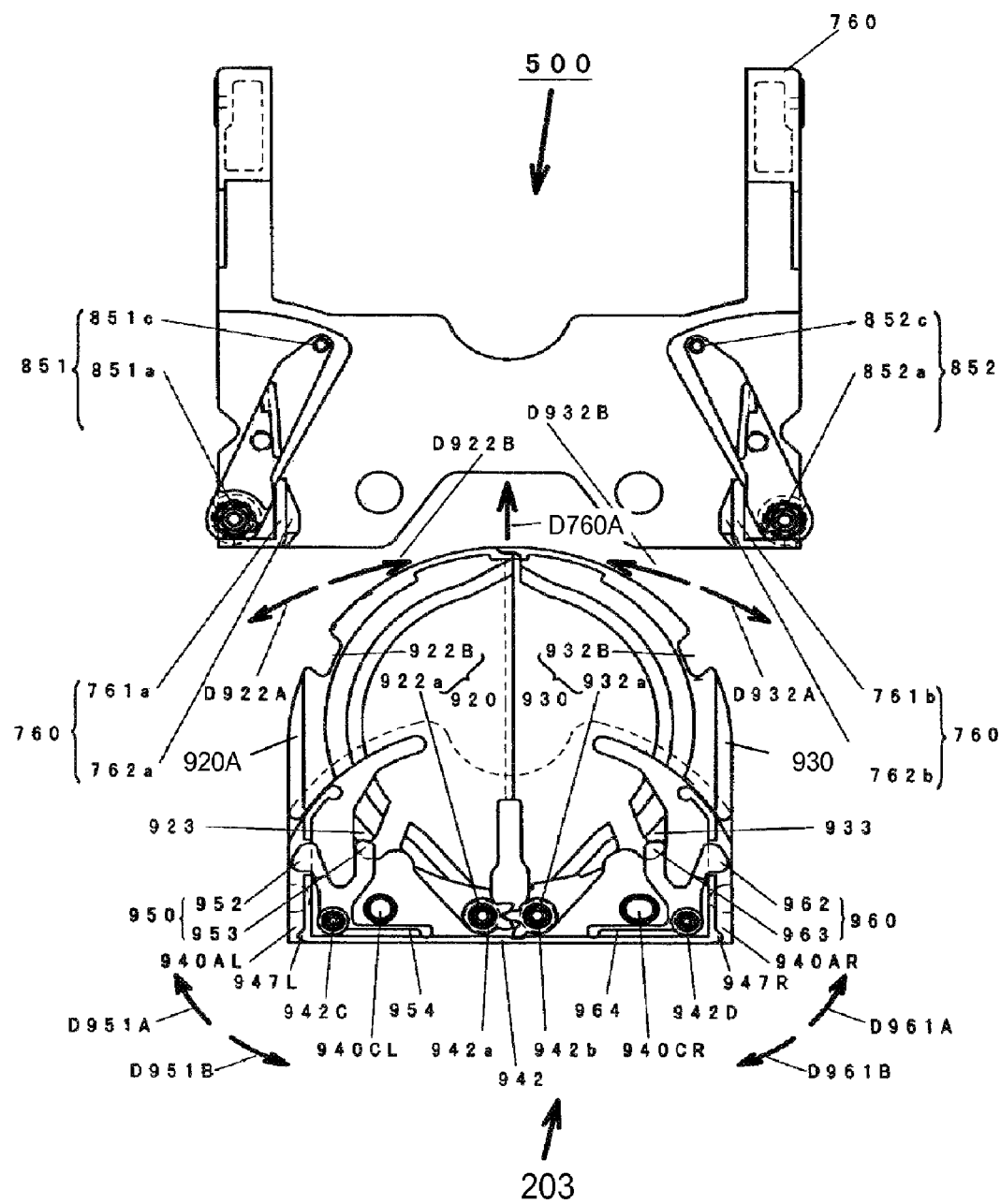
FIG. 34 illustrates how the disk cartridge of the third preferred embodiment works while being inserted into the disk drive.

FIG. 34 illustrates a situation where the disk cartridge 203 is yet to be inserted into the disk drive 500.

Figure 35:
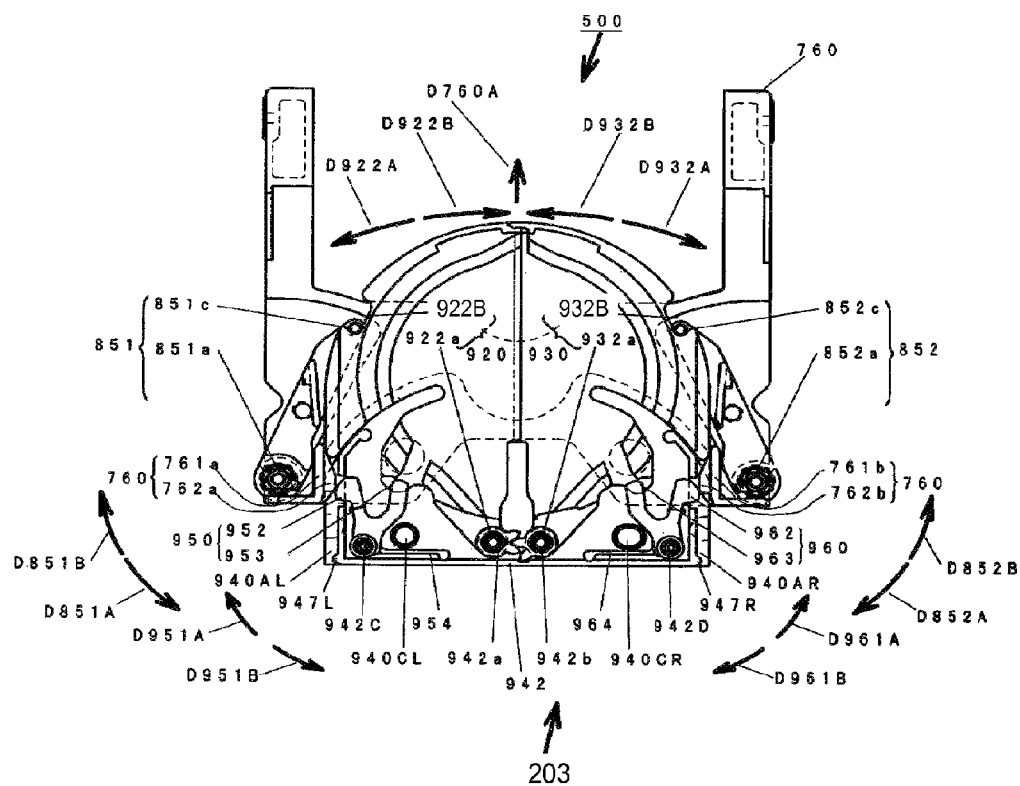
FIG. 35 illustrates how the disk cartridge of the third preferred embodiment works while being inserted into the disk drive.
Figure 36:
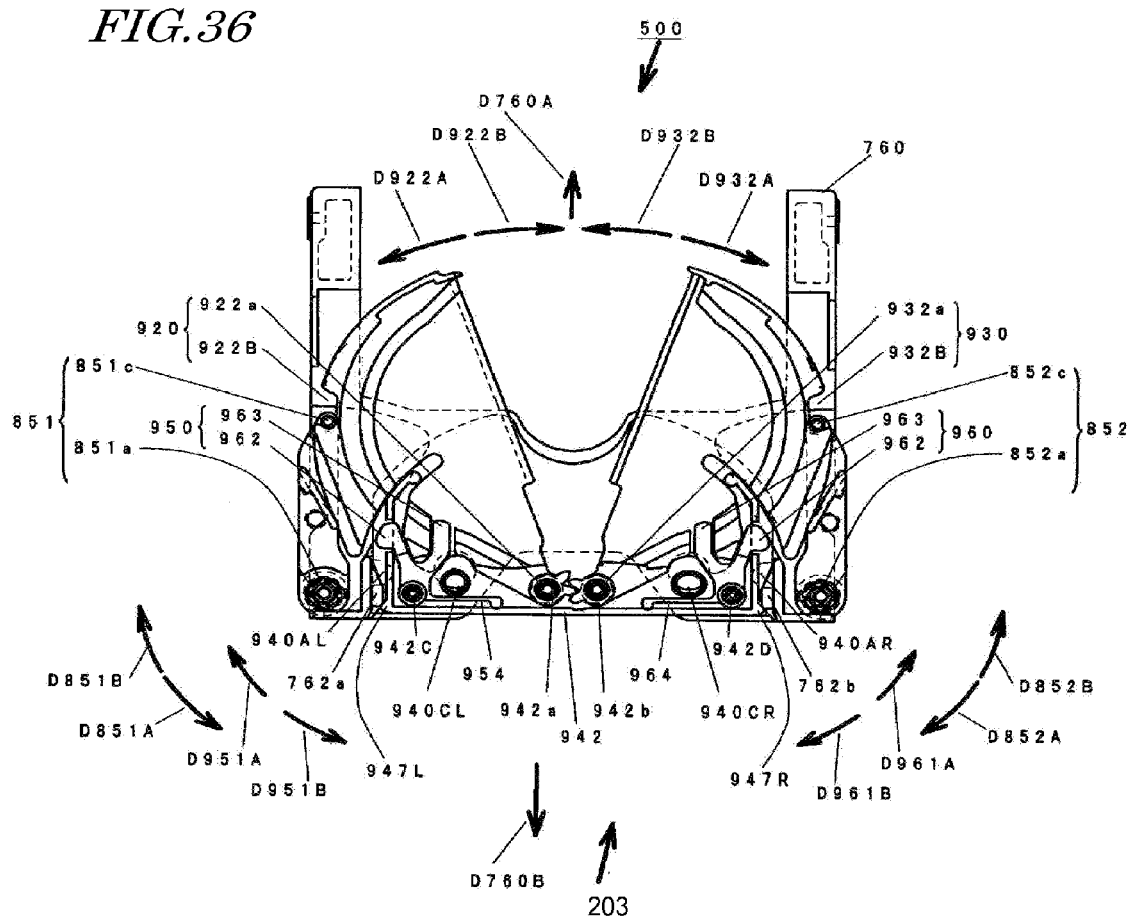
FIG. 36 illustrates how the disk cartridge of the third preferred embodiment works while being inserted into the disk drive.

FIG. 35 illustrates a situation where the disk cartridge 203 has been inserted into the disk drive 500 to the point that the first and second notches 922B and 932B contact with the engaging portions 851c and 852c, respectively. And FIG. 36 illustrates a situation where the disk cartridge 203 has been inserted into the disk drive 500 deep enough to get the first and second disk housing portions 920 and 930 opened fully. It should be noted that a set of members that are actually integrated with the traverse base 720 but do not contribute to the operation of opening the first and second disk housing portions 920 and 930 in the closed state are not illustrated in FIGS. 34 to 36 to avoid complexity.

To also avoid complexity, the upper structural parts of the disk cartridge 203 in the state shown in FIG. 29, namely, the first and second disk housing portion upper shells 931 and 932, the upper supporting base portion 941 and the disk 910, are not shown in FIGS. 34 to 36.

As shown in FIG. 34, the disk cartridge 203 is inserted through the holder opening of the cartridge holder 760 in the direction indicated by the arrow D760A while being guided by the guide walls 761a and 761b. In the meantime, the first and second unlocking portions 762a and 762b located on the guide walls 761a and 761b are inserted into, and move with respect to, the first and second housing portion grooves 920A and 930A of the first and second disk housing portions 920 and 930. As the disk cartridge 203 goes deeper, the first and second unlocking portions 762a and 762b will soon start to move inside the left and right body grooves 940AL and 940AR, respectively.

Then, as shown in FIG. 35, the first and second openers/closers 952 and 962 of the first and second locking members 950 and 960 contact with, and are pressed by, the first and second unlocking portion 762a and 762b, respectively. As a result, the first and second locking members 950 and 960 turn in the directions indicated by the arrows D951A and D961A, respectively. At this point in time, the latching lever portions 953 and 963 of the first and second locking members 950 and 960 disengage themselves from the first and second catching portions 923 and 933 of the first and second disk housing portions 920 and 930. As a result, the first and second disk housing portions 920 and 930 get unlocked and now are rotatable in the directions indicated by the arrows D922A and D932A, respectively.

At this point in time, the first and second engaging portions 851c and 852c of the first and second opening/closing levers 851 and 852 in predetermined standby positions get fitted into the first and second notches 922B and 932B of the first and second disk housing portions 920 and 930, respectively, as shown in FIG. 35.

After that, as the disk cartridge 203 continues to be inserted even deeper in the direction indicated by the arrow D760A, the first and second opening/closing levers 851 and 852 soon start to rotate in the directions indicated by the arrows D851A and D852A, respectively, with the first and second engaging portions 851c and 852c still engaged with the first and second notches 922B and 932B. As a result, the first and second disk housing portions 920 and 930 turn in the directions indicated by the arrows D922A and D932A, respectively, thereby opening the disk cartridge 203 as shown in FIG. 36. At this point in time, the first and second openers/closers 952 and 962 have already passed through the ranges of the first and second unlocking portions 762a and 762b, and the first and second locking members 950 and 960 rotate in the directions indicated by the arrows D951B and D961B under the elastic force applied by the first and second elastic portions 954 and 964 to recover their original states before this unlocking operation.

Consequently, even if the first and second elastic portions 954 and 964 are made of a resin material and form integral parts of the first and second locking members 950 and 960, it is possible to avoid keeping the first and second elastic portions 954 and 964 stressed for a long time. As a result, a creep phenomenon of the resin material can be avoided.

To close the first and second disk housing portions 920 and 930, the disk cartridge 203 in the position shown in FIG. 36 may be moved in the opposite direction (i.e., in the direction indicated by the arrow D760B) compared to the opening operation described above.

If the disk cartridge 203 is moved in the direction indicated by the arrow D760B, the first and second opening/closing levers 851 and 852 rotate in the directions indicated by the arrows D851B and D852B, respectively, with the first and second engaging portions 851c and 852c still engaged with the first and second notches 922B and 932B. As a result, the first and second disk housing portions 920 and 930 turn in the directions indicated by the arrows D922B and D932B, respectively, thereby closing the disk cartridge 203 as shown in FIG. 35.

In the state shown in FIG. 35, the first and second unlocking portions 762a and 762b are in contact with the first and second openers/closers 952 and 962, respectively, and the first and second locking members 950 and 960 have been turned in the directions indicated by the arrows D951A and D961A, respectively. Thus, if the disk cartridge 304 is further moved to the position shown in FIG. 34, then the first and second locking members 950 and 960 are turned back toward the directions indicated by the arrows D951B and D961B, respectively, under the elastic force applied by the first and second elastic portions 954 and 964. As a result, the first and second latching lever portions 953 and 963 of the first and second locking members 950 and 960 contact with the first and second catching portions 923 and 933 of the first and second disk housing portions 920 and 930, respectively, thereby keeping the first and second disk housing portions 920 and 930 from rotating.

Hereinafter, it will be described exactly how the first and second unlocking portions 762a and 762b unlock the first and second disk housing portions 920 and 930.

Figure 37:
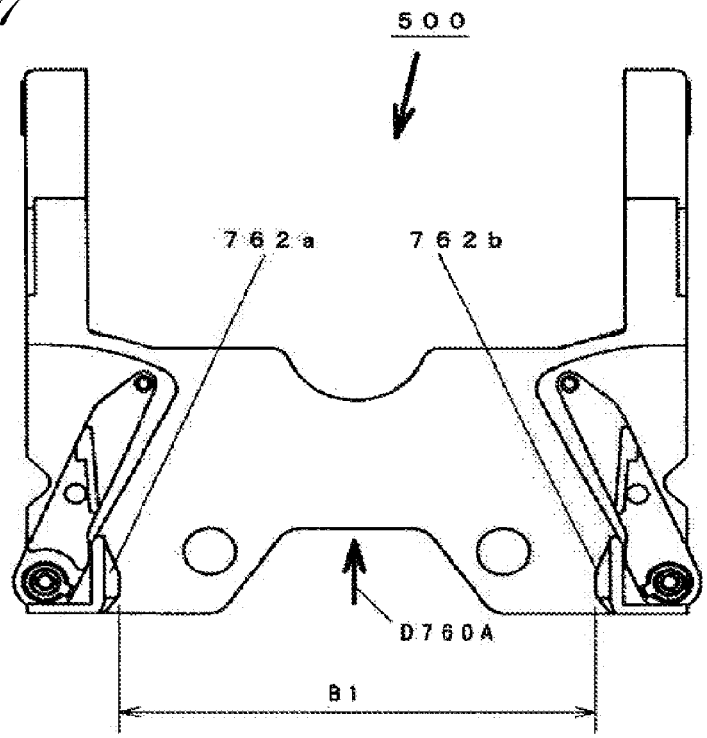
FIGS. 37(a) and 37(b) show the dimensions of respective parts of the cartridge holder and the disk cartridge that perform the function of unlocking the locking members in the third preferred embodiment.
Figure 37:
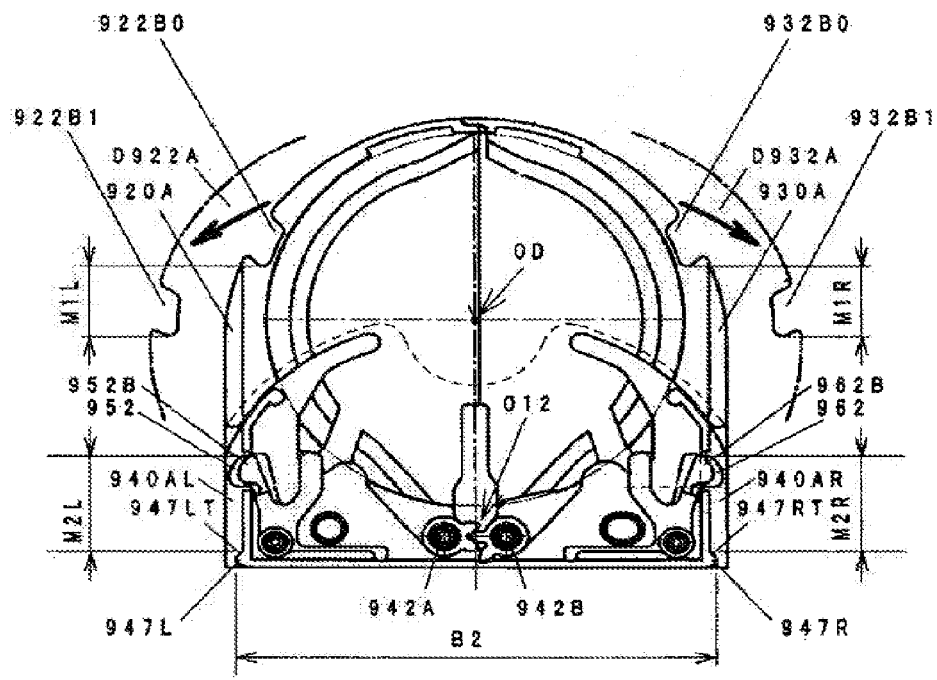

FIGS. 37(a) and 37(b) show the dimensions of respective portions of the cartridge holder 760 and the disk cartridge 203 that perform the function of disengaging the locking members 950 and 960. It should be noted that the structures in the vicinity of the first and second openers/closers 952 and 962 are shown in FIGS. 32(a) and 32(b). In FIG. 37, the outer edge of the disk 910 is indicated by the two-dot chain.

As described above, the two side surfaces of the supporting base member 940 have left and right body grooves 940AL and 940AR, and those of the first and second disk housing portions 920 and 930 have first and second housing portion grooves 920A and 930A, respectively. These grooves have almost equal depths. Also, protrusions 947L and 947R are arranged on the bottom of the left and right body grooves 940AL and 940AR, respectively, so as to be located on the rear end of the disk cartridge 203, which is opposite to the front end thereof to reach the disk drive sooner than any other portion thereof when the disk cartridge 203 is inserted into the disk drive.

In FIG. 37, suppose the center of the disk 910 is located at a point OD, the midpoint of the line segment that connects together the respective centers of the first and second pivots 942A and 942B of the lower supporting base portion 942 is a point O12, and the magnitudes of shift from the first and second notch closed positions 922B0 and 932B0 to the first and second notch opened positions 922B1 and 932B1 as measured parallel to the line segment that connects together the two points OD and O12 are identified by M1L and M1R, respectively. Also, in FIGS. 32 and 37, the positions of the first and second openers/closers 952 and 962 when the first and second locking members 950 and 960 keep the first and second disk housing portions 920 and 930 from rotating in the directions indicated by the arrows D922A and D932A are identified by 952B and 962B, respectively.

Also, suppose the lines that pass the respective tops of the first and second openers/closers 952 and 962 located at the positions 952B and 962B, which are most distant from the bottom of the left and right body grooves 940AL and 940AR, and that run parallel to the line segment that connects the points OD and O12 together are identified by L1 and L2, respectively. The intersection between the line L1 and the outer edge of the first opener/closer 952, which is located opposite to the left protrusion 947L, when the first and second locking members 950 and 960 are locked is supposed to be located at a point P3. Likewise, the intersection between the line L2 and the outer edge of the second opener/closer 962, which is located opposite to the right protrusion 947R, when the first and second locking members 950 and 960 are locked is supposed to be located at a point P4. Furthermore, the intersections between the slopes 947LT and 947RT, which connect the respective bottoms of the left and right body grooves 940AL and 940AR to the left and right protrusions 947L and 947R, and the lines L1 and L2 are identified by P5 and P6, respectively.

In that case, to get the first and second disk housing portions 920 and 930, which have been locked with the first and second locking members 950 and 960, unlocked and opened by using the first and second unlocking portions 762a and 762b as shown in FIGS. 34 to 36 by inserting the disk cartridge 203 into the disk drive 500, M1L<M2L and M1R<M2R need to be satisfied.

This is because in the interval between a point in time when the first and second unlocking portions 762a and 762b started to press the first and second openers/closers 952 and 962 and a point in time when the first and second unlocking portions 762a and 762b start to interfere with respective parts of the left and right protrusions 947L and 947R, the notches 922B and 932B need to be shifted from the first and second notch closed positions 922B0 and 932B0 to the first and second notch opened positions 922B1 and 932B1 just by inserting the disk cartridge 203.

In this case, if the slopes 947LT and 947RT are formed so as to approach first and second openers/closers 952 and 962 on the side on which the slopes 947LT and 947RT are connected to the left and right body grooves 940AL and 940AR, it is possible to prevent the first and second unlocking portions from interfering with the left and right protrusions 947L and 947R, respectively, after the disk cartridge 203 has been inserted. As a result, the overall length of the disk cartridge 203 as measured in the inserting direction can be shortened.

It should be noted that if the disk cartridge 203 has been inserted properly into the disk drive 500 as shown in FIGS. 34 to 36, then the left and right protrusions 947L and 947R will never interfere with the first and second unlocking portions 762a and 762b as shown in FIG. 36. However, if the user tried to insert the disk cartridge 203 even deeper than the position shown in FIG. 36, then the left and right protrusions 947L and 947R would interfere with the first and second unlocking portions 762a and 762b, thus preventing the disk cartridge 203 from going even deeper than this position. As a result, the disk cartridge 203 is never inserted too deep.

Figure 38:
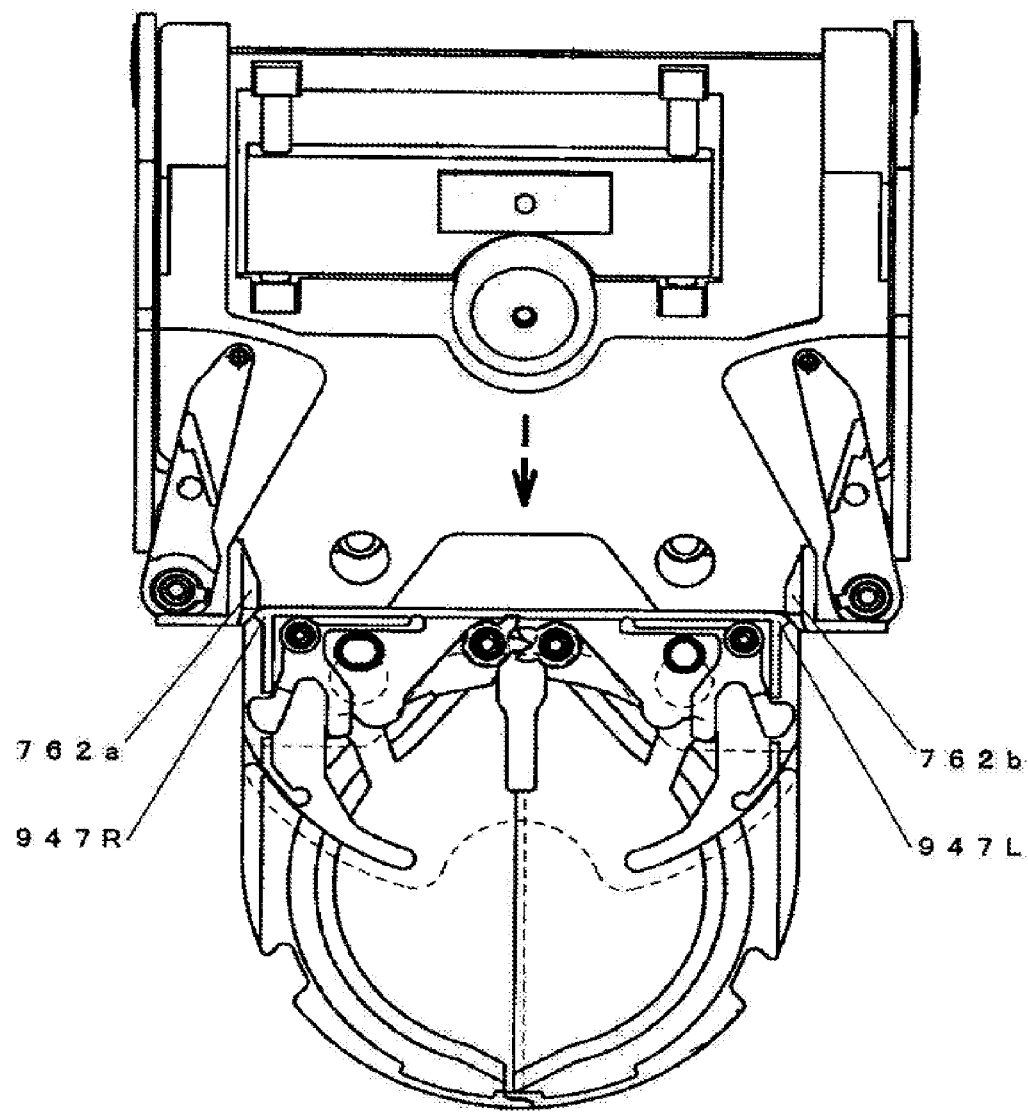
FIG. 38 illustrates what if the disk cartridge of the third preferred embodiment is going to be inserted wrong end first.

Meanwhile, if the disk cartridge 203 were inserted improperly into the disk drive 500 (e.g., if the user tried to insert the disk cartridge 203 wrong end first into the disk drive 500 as shown in FIG. 38), then the left and right protrusions 947L and 947R would interfere with the second and first unlocking portions 762b and 762a, respectively, thus preventing the user from inserting the disk cartridge 203 any deeper.

In that case, to prevent the user from inserting the disk cartridge 203 wrong end first as shown in FIG. 38, the interval B1 between the respective tops of the first and second unlocking portions 762a and 762b and the interval B2 between the respective tops of the left and right protrusions 947L and 947R should satisfy B1<B2 as shown in FIGS. 37(a) and 37(b).

However, if the interval B2 were defined to be equal to the overall width of the disk cartridge 203, then there would be no room left for avoiding interference between the first and second openers/closers 952 and 962 and the first and second unlocking portions 762a and 762b when the disk cartridge 203 is fully inserted into the disk drive 500. In that case, even after the disk cartridge 203 has been fully inserted, the first and second openers/closers 952 and 962 and the first and second unlocking portions 762a and 762b would keep interfering with each other. As a result, the first and second openers/closers 952 and 962 would be kept pressed and the first and second elastic portions 954 and 964 would be kept stressed for a long time.

In such a situation, if the first and second locking members 950 and 960, the first and second elastic portions 954 and 964 and the first and second openers/closers 952 and 962 were all formed integrally using the same resin material, for example, then the first and second elastic portions 954 and 964 would be kept stressed too long a time to avoid producing a creep deformation.

Also, to leave any room for avoiding interference between the first and second openers/closers 952 and 962 and the first and second unlocking portions 762a and 762b when the disk cartridge 203 is fully inserted with the interval B2 defined equal to the overall width of the disk cartridge 203, the left and right protrusions 947L and 947R should retreat, i.e., opposite to the inserting direction of the disk cartridge 203. That is to say, the overall length of the disk cartridge 203 as measured in its inserting direction should be increased. In that case, the disk drive 500 should also have an increased size, thus making it difficult to reduce the respective sizes of the disk cartridge 203 and the disk drive 500.

In view of these considerations, the size B2 preferably satisfies B1<B2 and is preferably as narrow as possible. Also, if the dimensions M2L and M2R were too long, then the overall size of the disk cartridge 203 would increase too much. For that reason, it is preferred that the dimensions M2L and M2R be smaller than the radius of the disk 910, roughly speaking.

As described above, in the disk cartridge of this preferred embodiment, left and/or right protrusion(s) 947L and/or 947R are/is provided for a disk cartridge that is designed to open and shut a window by rotating two disk housing portions, functioning both as shutters and a housing alike, in two opposite directions, thereby preventing the user from inserting the disk cartridge 203 wrong end first, i.e., opposite to the proper inserting direction. That is to say, it is possible to avoid an unwanted situation where the disk cartridge 203 is inserted wrong end first and the disk housing could be unlocked and opened with the first and second disk housing portions 221 and 222 sticking out of the disk drive 500. As a result, the disk 910 housed there would never be exposed or drop accidentally or carelessly and would never get scratched, either.

In addition, it is also possible to avoid an unwanted situation where the disk cartridge is inserted excessively, i.e., to more than the proper insertion depth. As a result, none of the disk housed there, the disk cartridge and the disk drive would get damaged.

Besides, the disk cartridge 203 of this preferred embodiment not only achieves the effects described above but also can position the disk cartridge 203 in the disk drive 500 easily by using the left and/or right protrusion(s) 947L and/or 947R as positioning members in the width direction that intersects at right angles with the inserting direction of the disk cartridge 203. Hereinafter, it will be described with reference to FIGS. 39 and 40 exactly how this effect is achieved.

Figure 39:
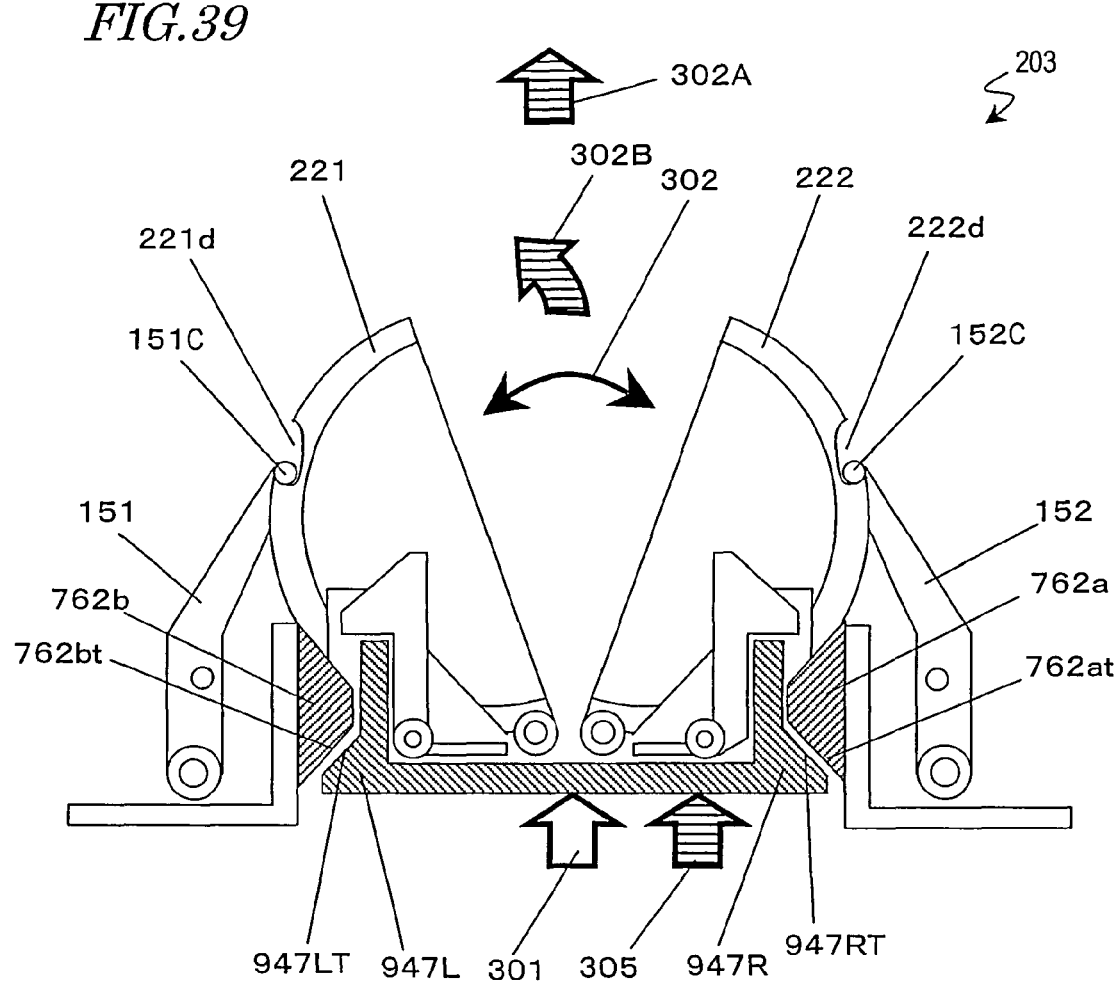
FIG. 39 illustrates how positioning is done in the disk cartridge of the third preferred embodiment by bringing left and right body grooves into contact with first and second unlocking portions.
Figure 40:
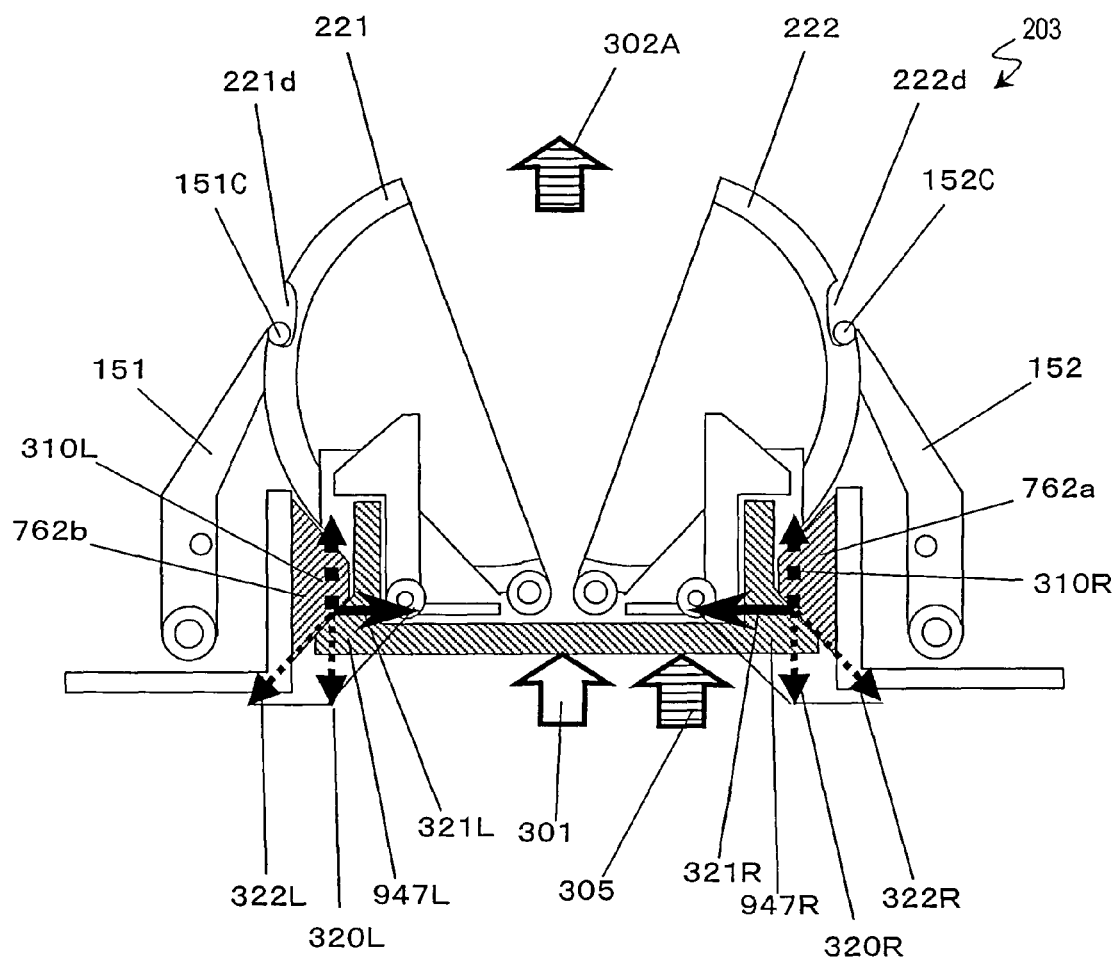
FIG. 40 illustrates how positioning is done in the disk cartridge of the third preferred embodiment by bringing the left and right body grooves into contact with the first and second unlocking portions.

FIG. 39 is a schematic representation illustrating a situation where the left and right protrusions 947L and 947R are on the verge of contacting with the first and second unlocking portions 762a and 762b while the disk cartridge 203 is being inserted into the cartridge holder 60. FIG. 40 is a schematic representation illustrating a situation where the left and right protrusions 947L and 947R have just contacted with the first and second unlocking portions 762a and 762b, respectively. As shown in FIG. 39, if force is applied to around the center of the disk cartridge 203 in the direction indicated by the arrow 301 while the disk cartridge is being inserted into the cartridge holder 60, then the disk cartridge 203 heads in the direction indicated by the arrow 302A substantially straightforward and balanced.

Meanwhile, if force were not applied to the center but in the direction indicated by the arrow 305, then the disk cartridge 203 would lose its balance and force would be produced in the direction indicated by the arrow 302B because the disk cartridge 203 is movable freely with respect to the cartridge holder 60 in the directions indicated by the arrows 302 although the first and second engaging portions 151C and 152C are still engaged with the first and second notches 221d and 222d, respectively. As a result, the disk cartridge would lose its stability in the direction that intersects with the inserting direction at right angles.

After that, when the disk cartridge 203 is inserted even deeper into the cartridge holder 60 to the position shown in FIG. 40, the slopes 947LT and 947RT of the left and right protrusions 947L and 947R will contact with the unlocking slopes 762at and 762bt of the first and second unlocking portions 762a and 762b, respectively. In this case, if force is applied to the disk cartridge 203 in the direction indicated by the arrow 301, the disk cartridge 203 will also head in the direction indicated by the arrow 302A as straightforward as in the situation shown in FIG. 39. However, even if force were not applied to the center but in the direction indicated by the arrow 305, no force would be produced but in the direction indicated by the arrow 302A and the stability would not be lost, either.

This effect is achieved for the following reasons. First of all, if force is applied to the disk cartridge 203 in the direction indicated by the arrow 305B, then forces are applied in the directions indicated by the arrows 310L and 310R to the respective interfaces between the slopes 947LT, 947RT and the unlocking slopes 762 at, 762bt as shown in FIG. 40 while these two pairs of slopes are in contact with each other. Meanwhile, the disk cartridge 203 receives their reactive forces in the directions indicated by the arrows 320L and 320R. This force produced in the direction indicated by the arrow 320L is the resultant force of two component forces 321L and 322L that are produced perpendicularly to the disk cartridge inserting direction and parallel to the interface, respectively. Likewise, the force produced in the direction indicated by the arrow 320R is the resultant force of two component forces 321R and 322R that are produced perpendicularly to the disk cartridge inserting direction and parallel to the interface, respectively. However, even if force were applied to the disk cartridge 203 in the direction indicated by the arrow 305, the forces produced in the directions indicated by the arrows 310L and 310R would still be equal to each other and the forces produced in the directions indicated by the arrows 321L and 321R would also be equal to each other. That is to say, no forces would get imbalanced perpendicularly to the inserting direction of the disk cartridge 203. Consequently, in the situation shown in FIG. 40, i.e., while the left and right protrusions 947L and 947R are in contact with the first and second unlocking portions 762a and 762b, respectively, the disk cartridge 203 can stay balanced.

By providing the left and/or right protrusion(s) 947L and/or 947R for the disk cartridge 203 of this preferred embodiment, the effect described above is achieved. Optionally, if an additional structure that uses the left and/or right protrusion(s) 947L and/or 947R is further provided for the disk drive, the positioning accuracy can be further increased when the disk drive is loaded with the disk cartridge 203.

Figure 41:
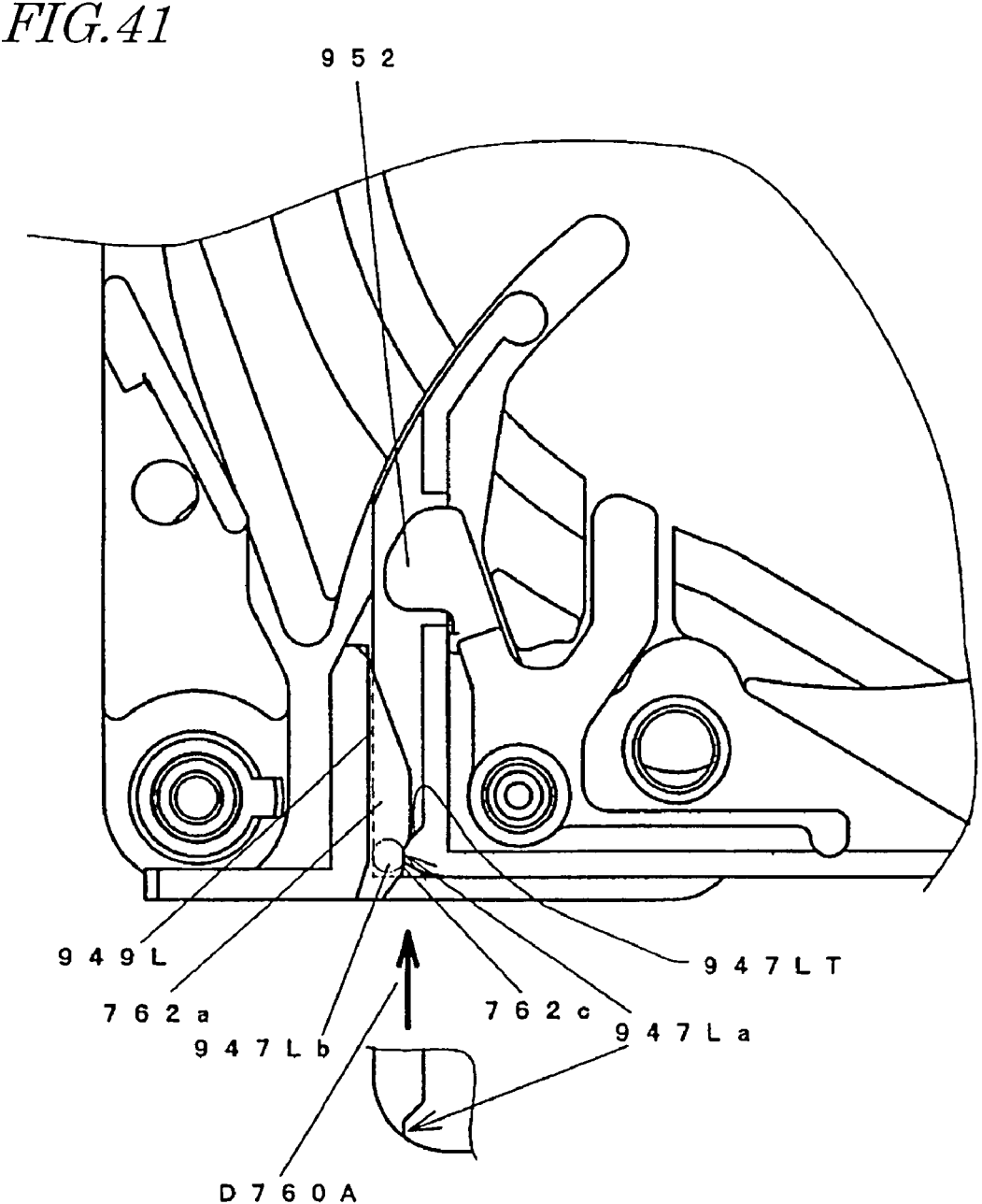
FIG. 41 illustrates the shapes of respective portions that position the disk cartridge of the third preferred embodiment in the width direction.

FIG. 41 illustrates an example in which the disk drive 500 further includes a first positioning contact portion 762c to contact with the first unlocking portion 762a. Although FIG. 41 illustrates only the structure where the disk cartridge 203 has the first locking member 950, the same structure as the one shown in FIG. 41 is also provided symmetrically on the side where the second locking member 960 is provided.

As shown in FIG. 41, if the disk cartridge 203 is inserted in the direction indicated by the arrow D760A after the first locking member 950 has been unlocked by the first unlocking portion 762a and the first and second disk housing portions 920 and 930 have been opened and until the first locking member 950 returns to its original position before the unlocking operation, the first positioning contact portion 762b will enter a sub-groove portion 947Lb at the end of the left body groove 940AL to contact with the top 947La of the left protrusion 947L. The same can be said about the side on which the second locking member 960 is provided.

In this state, the first positioning contact portion 762c contacts with the top of the left protrusion 947L, thereby getting positioning done perpendicularly to the inserting direction. As a result, even higher positioning accuracy is achieved. Optionally, if the groove width of the sub-groove portion 947Lb is also decreased in the thickness direction of the disk cartridge 203, the disk cartridge 203 can also be positioned by the sub-groove portion 947Lb in the thickness direction thereof, too, by letting the first positioning contact portion 762c enter the sub-groove portion 947Lb.

Such positioning is carried out just before the disk cartridge 203 gets inserted. That is why while the disk cartridge 203 is being inserted but before the positioning operation is not started yet, a certain degree of imbalance can be tolerated. Consequently, the disk cartridge 203 can eventually get positioned just as intended without diminishing the degree of freedom allowed during the inserting operation.

If the disk cartridge 203 needs to be positioned perpendicularly to the inserting direction thereof with the left outer surface 949L of the supporting base member, then the entire left outer surface 949L should be a high-precision plane to ensure accuracy. On the other hand, if the top 947La of the left protrusion 947L is used for positioning purposes, then only the surface to be the top should be a high-precision plane. Consequently, in making the supporting base member 940, the area of the plane to be subjected to precision control can be reduced and the precision control can get done more easily during the manufacturing process. Furthermore, since the top 947La of the left protrusion 947L is a protruding surface, the top can be finished easily by cutting, for example.

On top of that, the left protrusion 947L has a slope 947LT that is tilted non-perpendicularly to the bottom of the left body groove 940AL, and therefore, the top 947La of the left protrusion 947L and the first positioning contact portion 762c can contact with each other smoothly.

In addition, since loosening can be eliminated from inside the disk drive 500, the present invention can be used particularly effectively in mobile electronic devices, among other things. That is to say, according to the present invention, it is possible to prevent the disk cartridge 203 from shaking and rattling inside the disk drive 500 due to either external vibration on the device or internal vibration of the device itself.

Furthermore, as shown in FIG. 41, the top 947La of the left protrusion 947L, which requires very high precision, is located totally inside the left body groove 940AL and does not protrude from the groove but is protected by the left outer surface 949L. Thus, the top 947La never contacts with, or collides against, an external member easily. As a result, it is possible to prevent the positioning plane from getting scratched or deformed and losing its precision.

Also, the supporting base member 940 is formed by joining together the upper and lower supporting base portions 941 and 942 as shown in FIG. 30. If these portions are joined together by either ultrasonic welding or bonding with an adhesive, for example, then it is possible to prevent the overflowing material, which has been molten during the welding process, from reaching the left outer surface 949L of the disk cartridge 203 and diminishing the beauty of its appearance.

Figure 42:
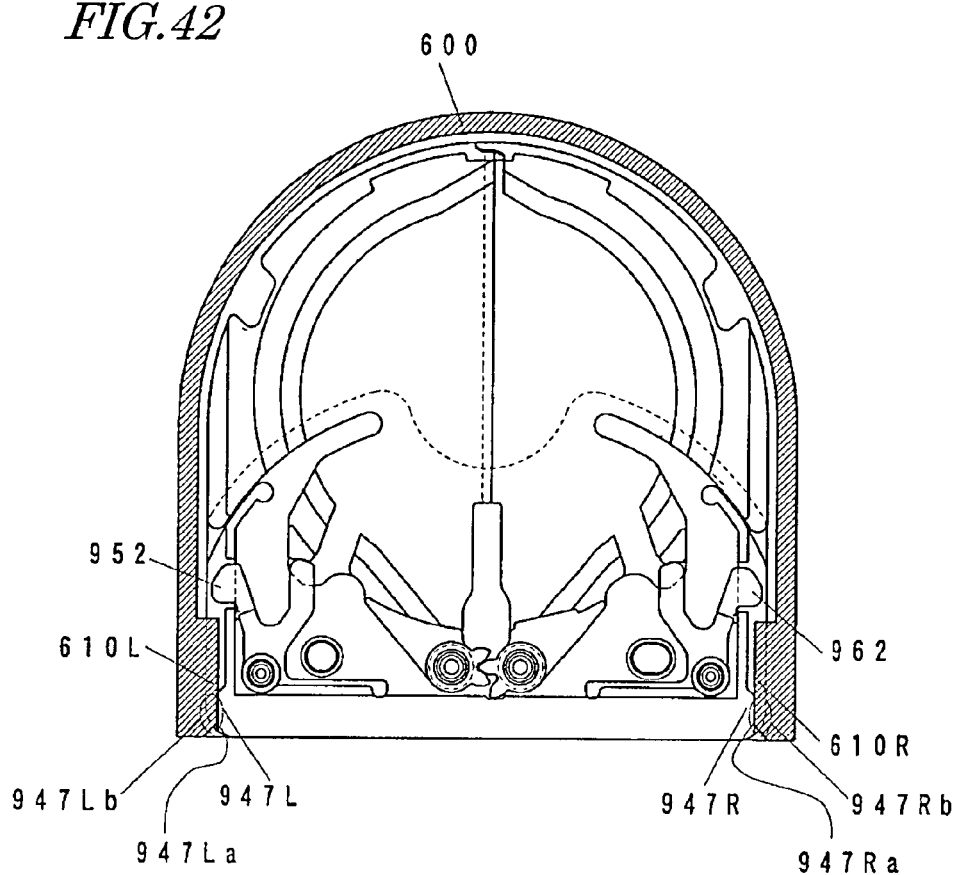
FIG. 42 illustrates how the disk cartridge of the third preferred embodiment looks when inserted into a cartridge case.

FIG. 42 illustrates how the disk cartridge 203 is housed in its dedicated cartridge case 600. In housing the disk cartridge 203 in the cartridge case 600, the disk cartridge 203 can also be positioned with the same structure as the one used for positioning the disk cartridge 203 with respect to the disk drive 500 as already described with reference to FIG. 41. Specifically, by bringing the respective tops 947La and 947Ra of the left and right protrusions 947L and 947R into contact with left and right width determining portions 610L and 610R, respectively, as shown in FIG. 42, the disk cartridge 203 can be positioned perpendicularly to the inserting direction when housed in the cartridge case 600.

Even in such a situation, the disk cartridge 203 can also be positioned just as intended inside the cartridge case 60 and can even be held more firmly with the friction produced on the contact surfaces. On top of that, since the left and right width determining portions 610L and 610R enter the sub-groove portions 947Lb and 947Rb, the disk cartridge 203 can also be positioned in the thickness direction as well.

Figure 43:
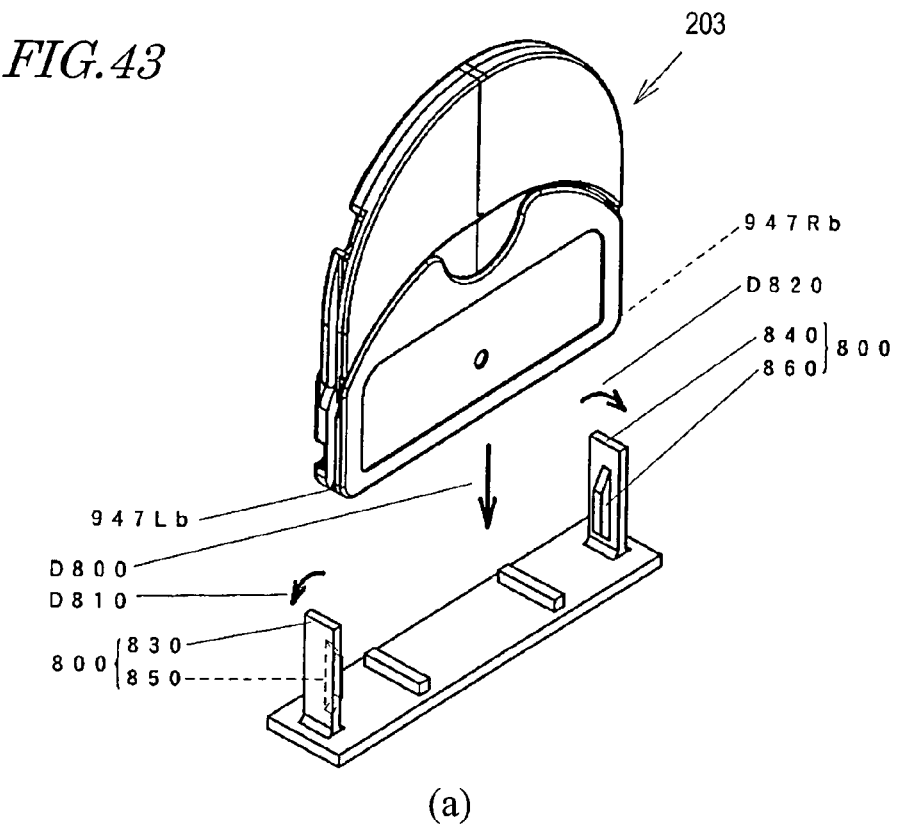
FIGS. 43(a) and 43(b) illustrate how to insert the disk cartridge of the third preferred embodiment into a cartridge stand.
Figure 43:
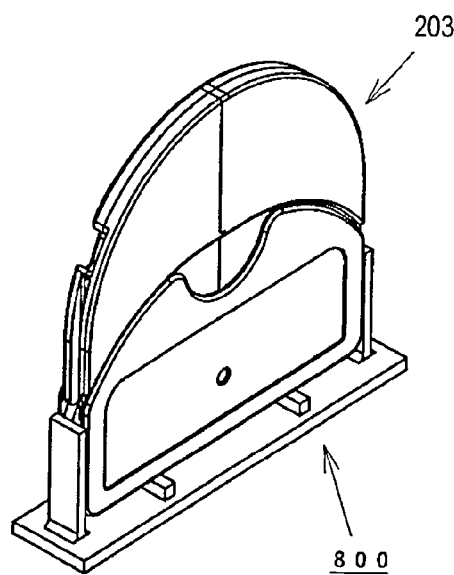

Also, as shown in FIGS. 41 and 42, the respective rear ends of the left and right body grooves 940AL and 940AR (or the sub-groove portions 947Lb and 947Rb), which are opposite to the front end of the disk cartridge 203 that reaches the disk drive earlier than anything else when the disk cartridge 203 is inserted into the disk drive, are opened. For that reason, the disk cartridge 203 can be put into a cartridge stand 800 as shown in FIG. 43. If the sub-groove portions 947Lb and 947Rb are opened, guide ribs 850 and 860 can be inserted into the opened portions as shown in FIG. 43(*a*). As a result, the disk cartridge 203 can be guided while being regulated in the thickness direction thereof.

If the disk cartridge 203 is further pushed into the cartridge stand 800 in the direction indicated by the arrow D800 so as to be guided by the guide ribs 850 and 860, then supporting walls 830 and 840 are bent in the directions indicated by the arrows D810 and D820, respectively, but will be unbent when the sub-groove portions 947Lb and 947Rb finish passing through the guide ribs 850 and 860. As a result, the disk cartridge 203 will be held on the cartridge stand as shown in FIG. 43(*b*).

In this case, the guide ribs 850, 860 are designed so as not to interfere with the first and second openers/closers 952 and 962. In this manner, the disk cartridge 203 gets loosely fixed on the cartridge stand 800 so as to be restricted to a plane that is parallel to not only the information storage layer but also the center axis of the disk 910 housed there.

Figure 44:
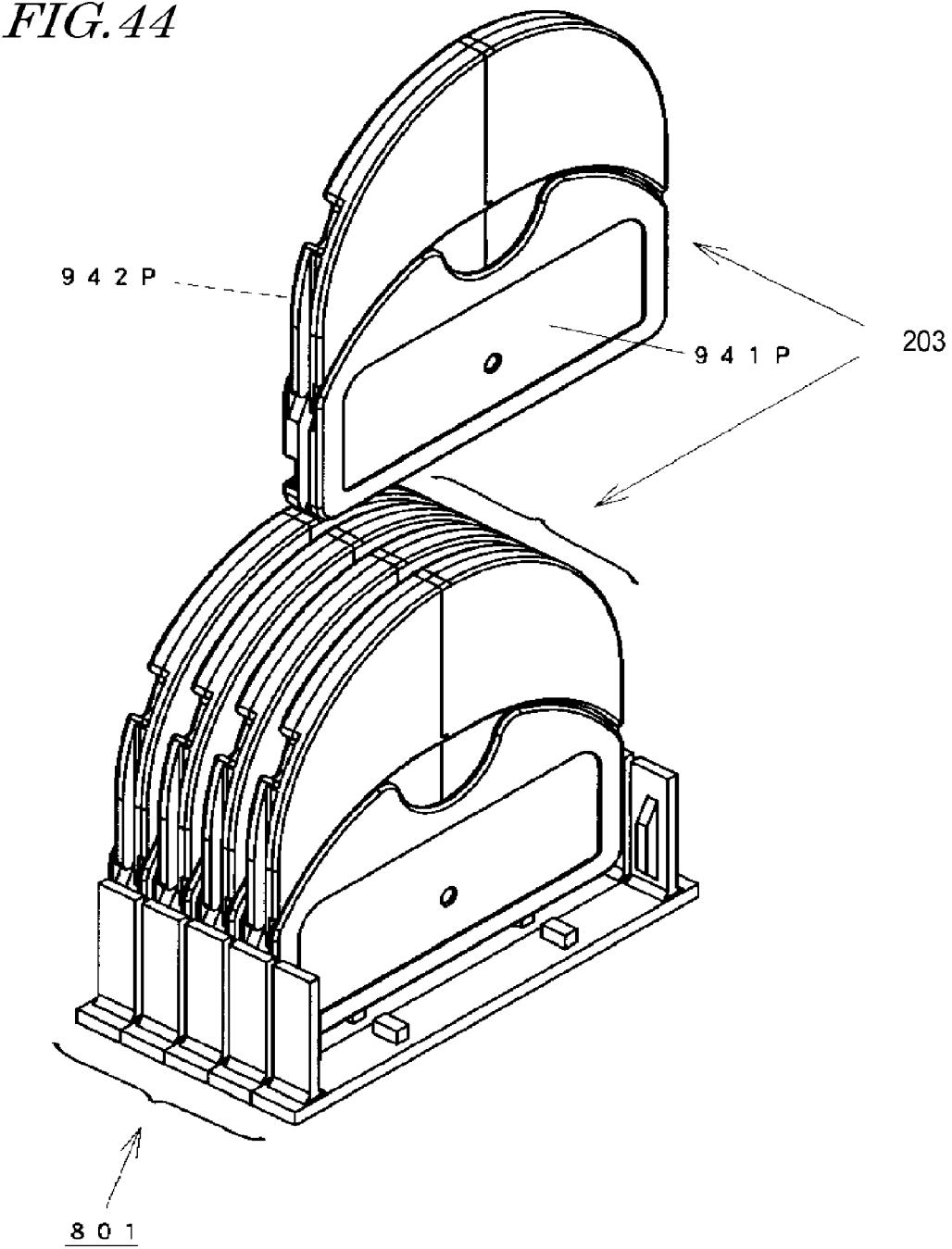
FIG. 44 illustrates how disk cartridges of the third preferred embodiment are inserted into multiple cartridge stands.

If a number of cartridge stands 800, each having the configuration shown in FIG. 43, need to be connected in parallel with each other, then the arrangement shown in FIG. 44 may be adopted. Even in the example shown in FIG. 44, disk cartridges 203 fixed on these cartridge stands 801 are also restricted by the guide ribs 850 and 860 parallel to the center axis of the disks 910 housed there as in the example shown in FIG. 43. For that reason, even if the outer surfaces 941P and 942P of the upper and lower supporting base portions 941 and 942 are not supported, the disk cartridges 203 can still support themselves on the cartridge stands 801. As a result, multiple disk cartridges 203 can be held in parallel with each other even without interposing any additional member between them, and the overall thickness can be reduced.

In the preferred embodiment described above, the first and second locking members 950 and 960 are arranged on both sides of the disk cartridge 203 and the first and second unlocking portions 762a and 762b are arranged to unlock those locking members 950 and 960, respectively. However, as the engaging portions 922C and 932C of the first and second disk housing portions 920 and 930 make the disk housing portions interlock with each other, the minimum required locking function can also be performed even with only one of those two locking members used.

Figure 45:
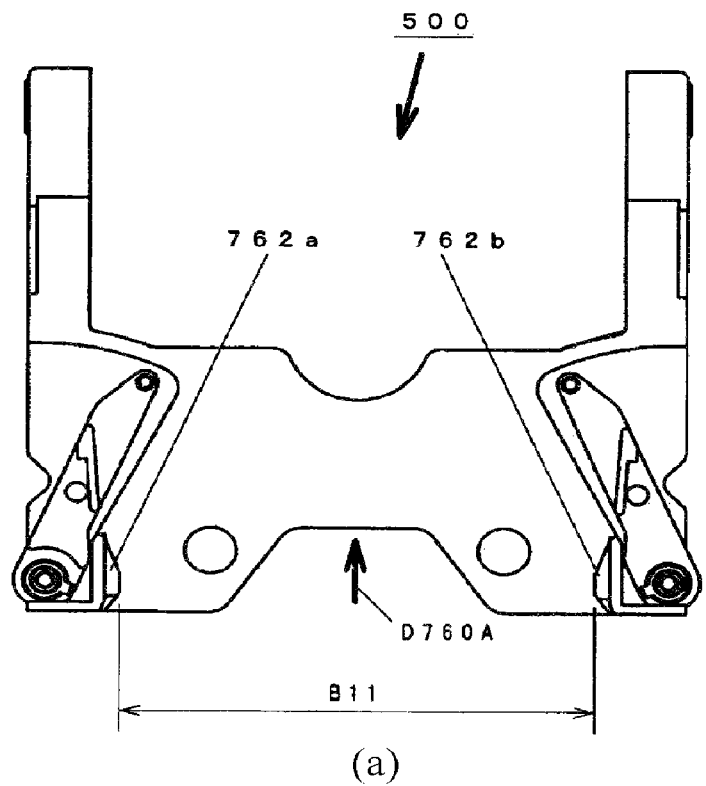
FIGS. 45(a) and 45(b) shows the dimensions of respective parts of the cartridge holder and the disk cartridge that prevent the user from inserting a disk cartridge according to modified example of the third preferred embodiment wrong end first.
Figure 45:
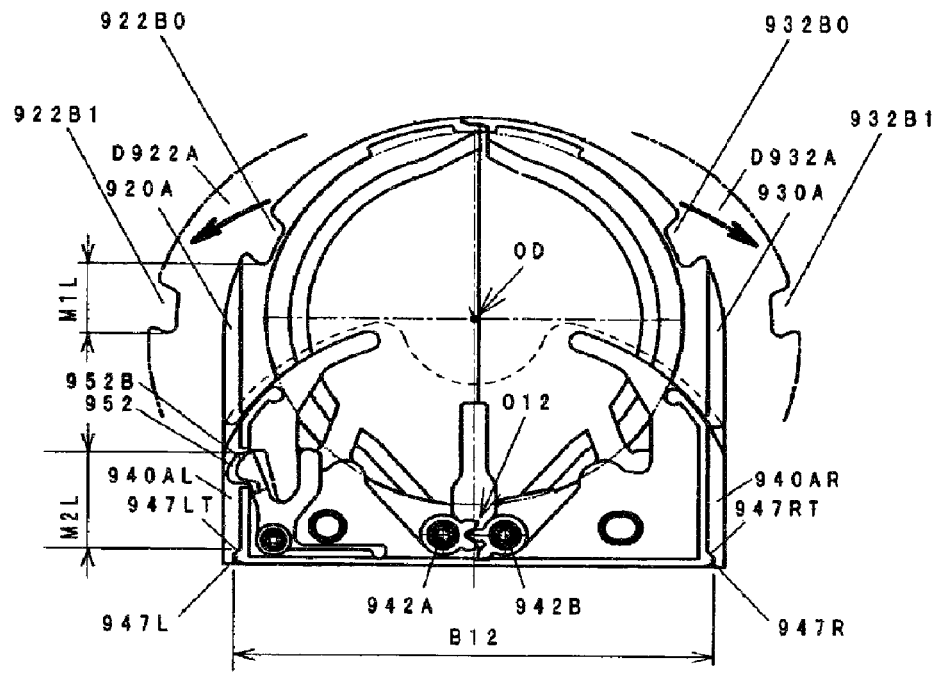

For example, even if the second locking member 960 is omitted as shown in FIG. 45, the rotation of the first disk housing portion 920 can also be restricted by the first locking member 950 and the second disk housing portion 930 can also be restricted by getting the engaging portions 932C and 922C engaged with each other. Even so, if the second unlocking portion 762b, which is symmetrical in shape to the first unlocking portion 762a, is provided for the cartridge holder 760 and if the dimensions B11 and B12 shown in FIG. 45 are defined so as to satisfy B11<B12, it is also possible to prevent the user from inserting the disk cartridge 203 wrong end first or too deep into the disk drive 500.

Also, in the preferred embodiment described above, the left and right protrusions 947L and 947R are arranged on both sides of the disk cartridge 203. To perform the minimum required function, however, at least one of the two protrusions needs to be provided. Even so, it is also possible to prevent the user from inserting the disk cartridge 203 wrong end first or too deep into the disk drive 500. If only one of the two locking members or portions is provided as described above, then one of the left and right body grooves 940AL and 940AR that has no locking members may be omitted.

Furthermore, if only one of the two locking members is provided with the groove omitted from the side with no locking members as described above, then there is no need to provide the first or second unlocking portion 762a or 762b, associated with that omitted groove, for the cartridge holder 760.

Figure 46:
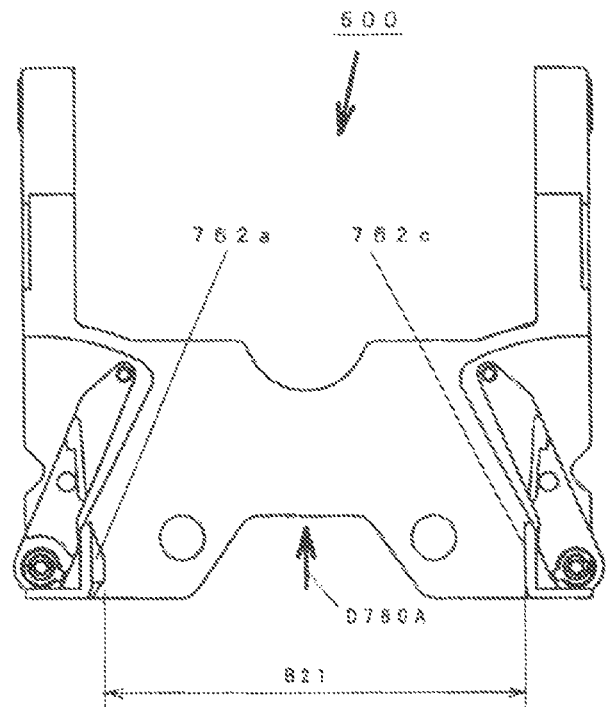
FIGS. 46(a) and 46(b) shows the dimensions of respective parts of the cartridge holder and the disk cartridge that prevent the user from inserting a disk cartridge according to modified example of the third preferred embodiment wrong end first.
Figure 46:
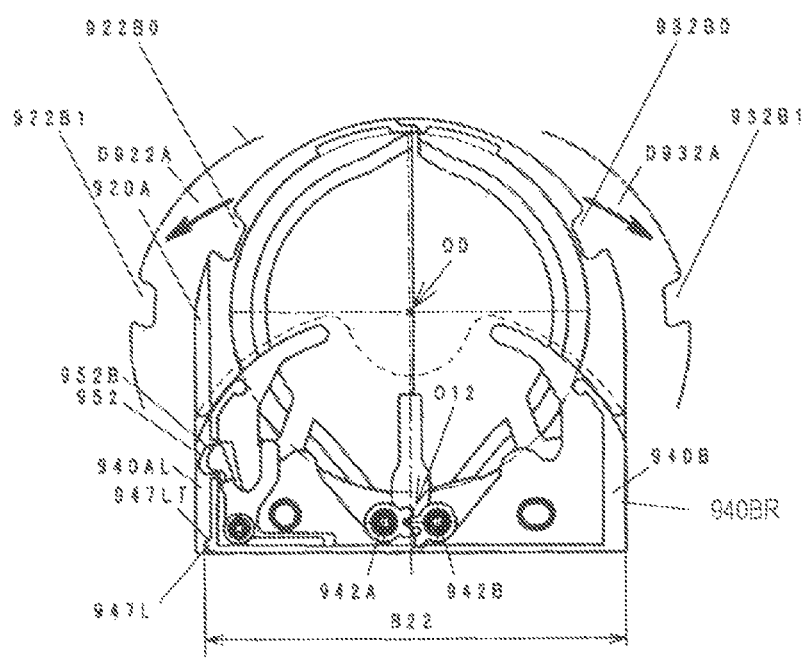
Figure 47:
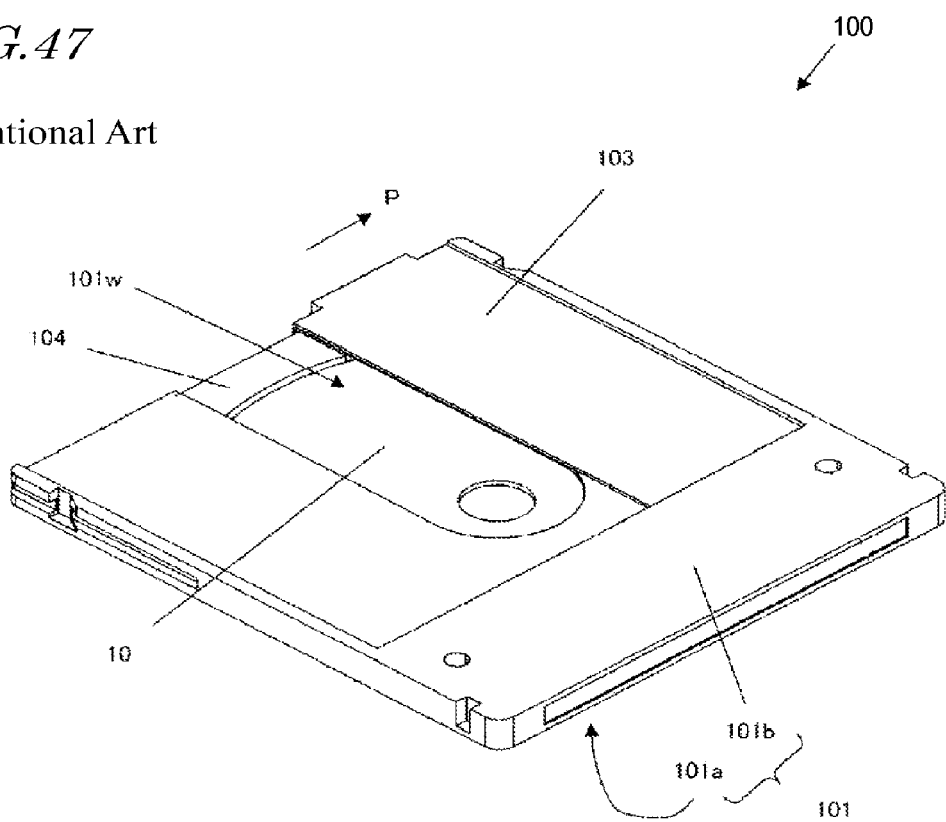
FIG. 47 is a perspective view illustrating a conventional disk cartridge.
Figure 48:
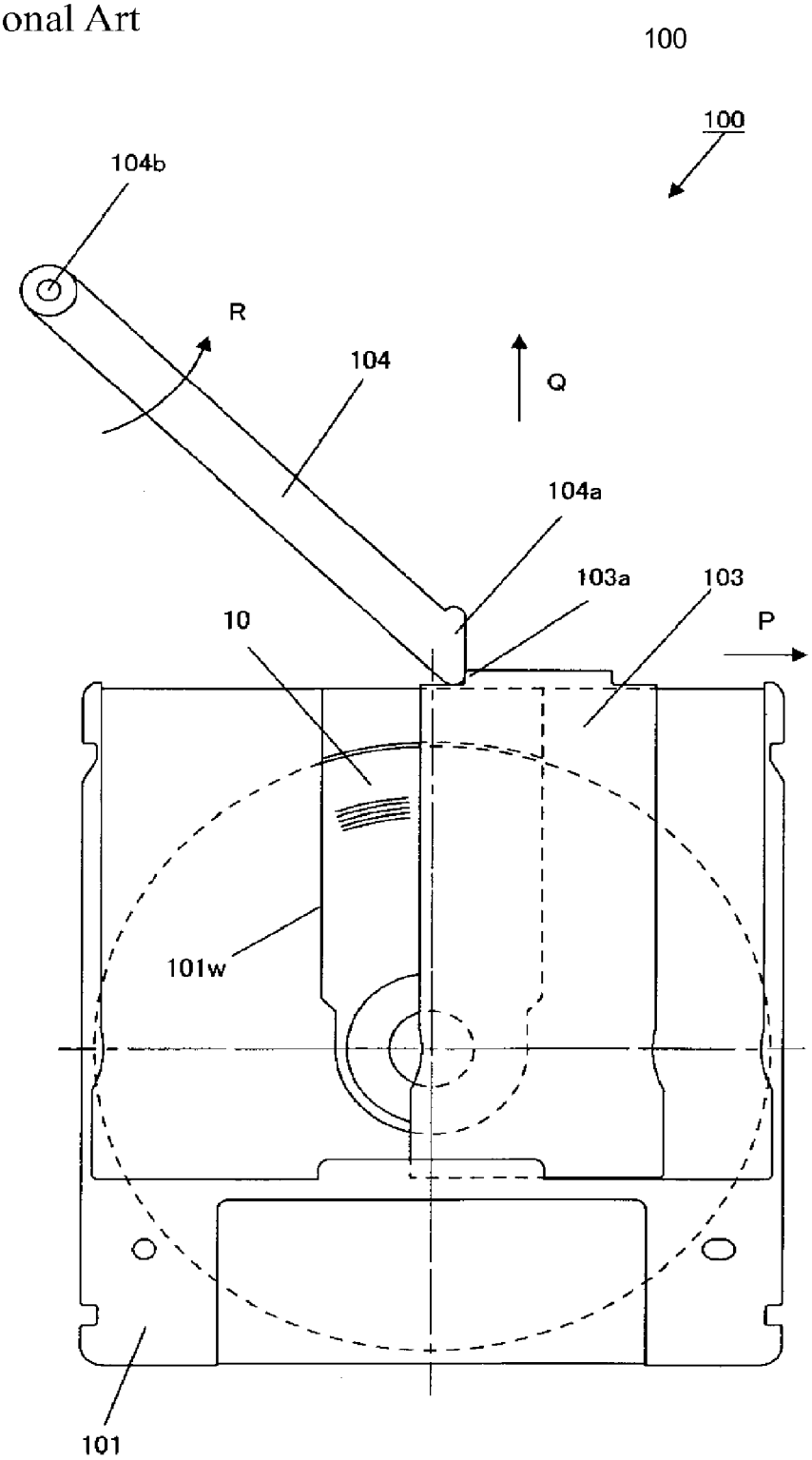
FIG. 48 illustrates how to open a shutter when the conventional disk cartridge is inserted into a conventional disk drive.

For example, if the second locking member 960 is omitted from the disk cartridge 203 and if the right wall 940BR is fully closed with the right body groove 947R and the right protrusion 940AR omitted as shown in FIG. 46, then the cartridge holder 760 does not have to have the second unlocking portion 762b but may have just the right guide wall 762c. In that case, if the interval between the first unlocking portion 762a and the right guide wall 762c is identified by B21 and if the interval between the top of the left protrusion 947L and the outer shell of the right wall 940BR is identified by B22, then the same effects as the ones described above are also achieved as long as B21<B22 is satisfied. With the second unlocking portion 762b omitted as shown in FIG. 46, there is no need to provide any portion corresponding to the first positioning contact portion 762c.

As described above, the disk cartridge of the present invention has no conventional housing, which defines the profile of the cartridge in the prior art, but includes a pair of disk housing portions that not only defines the profile of the cartridge but also functions as shutters as well.

When opened, the pair of disk housing portions can define a big window that does not have the bridge portion, which should be arranged in the window of a conventional disk cartridge with a shutter to guide the shutter on the move.

Consequently, even a cartridge of a small size can open as big a window as a cartridge of a large size and the head can be designed much more flexibly.

Also, the disk housing portions function as shutters while also serving as a housing that defines the profile of the cartridge, and therefore, can be thicker, and more rigid, than the conventional shutter. As a result, the present invention provides more secure shutters that can perfectly protect the disk with valuable information from disturbances even when the disk cartridge is dropped or trodden by mistake.

In addition, a locking unit, which not only controls the angle of the window defined by the disk housing portions but also keeps the disk housing portions in the closed state from rotating, can be inserted after the disk housing portions and the supporting base member, consisting of the supporting base portions, have been assembled together. For that reason, even after the supporting base member has been assembled, the disk housing portions can also be opened wide enough to readily remove the disk from the disk cartridge. That is why after the supporting base member has been assembled, the disk may be inserted, and the assembling process of the disk cartridge can be completed by inserting the locking unit through the insertion port of the supporting base member. As a result, the disk manufacturing process and the disk cartridge assembling process can be totally separated from each other. Consequently, a disk cartridge manufacturing process can be carried out with the disk manufacturing process and the disk cartridge assembling process, which have significantly different process and testing methods, performed in totally different places, thus increasing the degree of flexibility of the manufacturing process and cutting down the manufacturing cost significantly.

Besides, by inserting the locking unit through the insertion port, the disk housing portions can be kept from rotating when closed and can have the angle of its window controlled when opened, thus preventing the user from removing the disk carelessly.

On top of that, by forming the locking lever portions and locking lever supporting portions integrally, the number of members required and the number of assembling process steps can be both cut down significantly, thus contributing to reducing the overall cost of the disk cartridge.

Also, if cover portions, which cover the positioning holes of the supporting base member to position the disk cartridge externally, are provided for the locking unit, it is possible to prevent dust from entering the disk cartridge externally through the positioning holes just by inserting the locking unit. As a result, the dustproofness of the disk cartridge can be increased.

Moreover, when the locking unit is inserted through the insertion port into the supporting base member, either the locking lever portions or locking lever supporting portions gradually close the disk housing portions while contacting with parts of the disk housing portions. That is why the locking unit can always be inserted into the supporting base member irrespective of how wide the disk housing portions are opened. As a result, the number of errors that could happen during the disk cartridge assembling process can be reduced. In addition, since the disk housing portions can be closed by inserting the locking unit, the number of disk cartridge assembling process steps can also be cut down. Consequently, the overall manufacturing cost of the disk cartridge can be reduced.

What is more, a first pair of latching portions to engage with a first pair of catching portions on both side surfaces of a supporting base member and a second pair of latching portions to engage with a second pair of catching portions around the center of the supporting base member when the locking unit is inserted into the supporting base member are provided for the locking lever supporting portion of the locking unit. As a result, the disk cartridge can be held more firmly when the locking unit is inserted into the supporting base member. In addition, since the locking lever supporting portion is firmly held by getting the first and second pairs of latching portions engaged with the supporting member in the vicinity of the axes of rotation of the locking levers and around the respective ends of the elastic portions, the locking levers can operate with stability without getting the overall locking unit deformed elastically under the force applied externally to the locking levers.

Besides, if the locking unit is made of an elastic material and if the body of the locking lever supporting portion is formed in an easily elastically deformable shape with no reinforcing ribs, for example, the locking lever supporting portion of the locking unit is deformed elastically while the locking unit is being inserted into the supporting base member. Thus, the first and second pairs of latching portions of the locking lever supporting portion can get engaged with the first and second pairs of catching portions of the supporting base member. Also, the locking unit being inserted is flexed in its entirety, and therefore, the first pair of latching portions, arranged on both side surfaces of the insertion port, and the second pair of latching portions, arranged around the center of the insertion port, can get engaged with the supporting base member separately from each other. Consequently, when the locking unit is inserted, the force that gets the supporting base member engaged is not applied to the first and second pairs of latching portions at the same time. As a result, the locking lever supporting portion can be inserted with reduced force, and eventually the disk cartridge can be assembled more easily and more smoothly.

On top of that, even a disk cartridge consisting of the disk housing portions and the supporting base member with the locking unit not inserted yet can still be loaded into the disk drive. Thus, such a disk cartridge without the locking members may be used in a manufacturing or development process step in which the disks need to be changed frequently, e.g., in the process step of testing the disk drive or during the development of game software. As a result, a dedicated jig does not have to be prepared for the manufacturing or development purposes but could be replaced with actual products, thus contributing to cutting down the manufacturing and development costs.

Furthermore, the disk cartridge of the present invention can prevent the user from inserting the disk cartridge wrong end first, i.e., opposite to the proper inserting direction, into the disk drive. That is to say, it is possible to avoid an unwanted situation where the disk cartridge is inserted wrong end first, the unlocking portions of the disk drive reach the locking/unlocking portions to unlock the locking members that keep the disk housing in the closed state, and the disk housing is opened with the disk side sticking out of the disk drive.

On top of that, it is also possible to prevent the user from inserting the disk cartridge too deep into the disk drive to avoid doing damage to the disk cartridge, the disk and devices inside the disk drive.

In addition, as sub-groove portions are arranged at the end of the main grooves, the outer dimensions of the disk cartridge can be reduced.

Also, since the end portions never interfere with the disk housing's opening operation, it is possible to avoid obstructing the disk cartridge inserting operation.

Besides, by arranging a tapered side that connects the bottom of each main groove to that of its associated sub-groove, after the disk cartridge has been inserted into the disk drive, the unlocking portions can successfully avoid passing areas where interference could occur with the disk cartridge. As a result, the dimensions of the disk cartridge and the disk drive can be both reduced.

Optionally, if the locking member, the main groove and the sub-groove are provided for only one side of the disk cartridge, the configuration of the disk cartridge can be simplified.

Alternatively, if the main grooves and the sub-grooves are arranged on both sides of the disk cartridge with the locking member provided for just one side thereof, the number of members required can be cut down while preventing the user from inserting the disk wrong end first.

Still alternatively, if the locking members, the main grooves and the sub-grooves are all provided for both sides of the disk cartridge, it is possible to keep the disk housing closed just as intended while entirely preventing the user from inserting the disk cartridge wrong end first.

Also, by providing biasing members that apply biasing force to make the unlocked locking members recover their original positions, there is no need to perform the operation of having the locking members return to their original positions externally.

Besides, if the disk cartridge is designed such that once the disk housing has been opened, the locking members can quickly recover their original positions from the unlocked positions under a lot of stress, it is possible to release the biasing members from the stress, thus reducing the load on the biasing members.

In addition, by forming the locking members and the biasing members integrally, the number of members required and the number of assembling process steps can be both cut down.

Furthermore, if the locking members are made of a resin material, the cost of required parts can be cut down.

On top of that, it is possible to prevent the user from inserting the disk cartridge wrong end first with a simple structure.

What is more, by designing the disk cartridge such that the unlocking portions unlock the disk housing by passing through the main grooves, the outer dimensions of the disk drive can be reduced.

Optionally, if only one unlocking portion is provided for the only locking member, the configuration can be simplified.

In that case, if the interval between the unlocking portion and the opposite wall is defined to be narrower than the interval between the sub-groove of the disk cartridge and the opposite outer surface, then the disk cartridge will rarely be inserted wrong end first.

Alternatively, if the unlocking portions are provided for both of the two locking members, then the disk cartridge will be hardly inserted wrong end first.

In that case, if the interval between the unlocking portions on both sides is defined to be narrower than the interval between the bottoms of the sub-grooves of the disk cartridge, then the disk cartridge will be even less likely inserted wrong end first.

Besides, since the unlocking portions have a rib shape with tapered sides, the unlocking portions can successfully avoid the sub-groove portions and the locking/unlocking portions when the disk cartridge is inserted. As a result, the outer dimensions of either the disk cartridge or the disk drive can be reduced accordingly.

On top of that, when the disk cartridge is inserted properly, the unlocking portions do not interfere with the return of the locking members to their original positions after the disk housing has been opened. As a result, it is possible to prevent the locking members from producing a creep deformation.

INDUSTRIAL APPLICABILITY

The present invention can be used effectively in a disk cartridge of any type, which is designed to house not only an optical disk but also a magnetic disk, a magneto-optical disk or any other disklike storage medium on which data is written by any arbitrary recording method. Among other things, the present invention is applicable particularly effectively to a disk cartridge that is designed to house a disklike storage medium of a small size.

The invention claimed is:

1. A disk cartridge comprising:
   first and second disk housing portions, each of which defines a space to house a portion of a disk with an information storage layer on at least one side thereof and which house the disk in its entirety when put together;
   a supporting base member that has a disk housing rotating and supporting portion for rotating and supporting the first and second disk housing portions so as to open or shut a window with respect to the disk such that the disk gets chucked externally, and a head is able to access the disk and read and write information from/on the information storage layer thereof, though the window; and
   a locking unit, which includes first and second locking lever portions for keeping the first and second disk housing portions closed from rotating and a locking lever supporting portion that supports the first and second locking lever portions rotatably and that is attached to the supporting base member,
   wherein the supporting base member has an insertion port to insert the locking unit, and
   wherein while the locking unit is yet to be inserted into the supporting base member through the insertion port, the first and second disk housing portions open the window to such an angle of rotation that is wide enough to remove the disk easily, and
   wherein with the locking lever supporting portion inserted into the supporting base member through the insertion port, the first and second disk housing portions contact with the locking unit and have their angle of rotation limited, thereby controlling a size of the window such that the disk is unremovable.

2. The disk cartridge of claim 1, wherein while being inserted into the supporting base member through the insertion port, the locking unit rotates the first and second disk housing portions while contacting with parts of the first and second disk housing portions, thereby shutting the window.

3. The disk cartridge of claim 2, wherein the insertion port of the supporting base member has a substantially rectangular shape, and
   wherein the locking lever supporting portion includes a body that closes the insertion port fully when the locking unit is inserted into the supporting base member.

4. The disk cartridge of claim 3, wherein the supporting base member includes a first pair of catching portions in a vicinity of both ends of a body in the longitudinal direction thereof, and
   wherein the locking lever supporting portion includes a first pair of latching portions that engages with the first pair of catching portions when the locking unit is inserted into the supporting base member.

5. The disk cartridge of claim 4, wherein the supporting base member includes a second pair of catching portions around a center of the body in the longitudinal direction thereof, and
wherein the locking lever supporting portion includes a second pair of latching portions that engages with the second pair of catching portions when the locking unit is inserted into the supporting base member.

6. The disk cartridge of claim 5, wherein the locking lever supporting portion is made of an elastic material, and
wherein by inserting the locking lever supporting portion into the supporting base member through the insertion port while deforming the locking lever supporting portion elastically, the first and second pairs of latching portions get engaged with the first and second pairs of catching portions, respectively.

7. The disk cartridge of claim 1, wherein each of the first and second locking lever portions includes an elastic portion that produces biasing force in the rotating direction thereof.

8. The disk cartridge of claim 7, wherein the first and second locking lever portions and the locking lever supporting portion form an integral member and each of the first and second locking lever portions is secured to the locking lever supporting portion so as to turn on a hinge portion.

9. The disk cartridge of claim 8, wherein the supporting base member has a positioning hole to position the supporting base member externally, and
wherein the locking lever supporting portion includes a cover portion that covers the positioning hole such that a recess that has the positioning hole as an open bottom is defined when the locking unit is inserted into the supporting base member.

10. The disk cartridge of claim 9, wherein the supporting base member overlaps at least partially with the first and second disk housing portions so as to prevent the first and second disk housing portions from moving perpendicularly to the disk.

11. A disk cartridge comprising:
first and second disk housing portions, each of which defines a space to house a portion of a disk with an information storage layer on at least one side thereof and which house the disk in its entirety when put together;
a supporting base member that has a disk housing rotating and supporting portion for rotating and supporting the first and second disk housing portions so as to open or shut a window with respect to the disk such that the disk gets chucked externally, and a head is able to access the disk and read and write information from/on the information storage layer thereof, though the window; and
a locking member for keeping the first and second disk housing portions closed from rotating,
wherein the supporting base member has at least one side surface that crosses, at right angles, a line segment that connects together respective centers of rotation of the first and second disk housing portions, and
wherein the side surface runs parallel to the disk housed in the first and second disk housing portions and has a main groove that includes a bottom, an opening on the bottom, and a protrusion on the bottom, and
wherein the locking member includes a locking/unlocking portion for unlocking the first and second disk housing portions externally, and
wherein the locking/unlocking portion protrudes through the opening of the main groove to first and second levels when the first and second disk housing portions are locked and when the first and second disk housing portions are unlocked, respectively, the second level being lower than the first level, a level reached by the protrusion on the bottom of the main groove being lower than the first level but higher than the second level.

12. The disk cartridge of claim 11, wherein the protrusion is located in a vicinity of an end of the main groove.

13. The disk cartridge of claim 12, wherein the protrusion has a sloped surface that tilts non-perpendicularly to the bottom of the main groove.

14. A disk drive to be loaded with the disk cartridge of claim 11, the disk drive comprising:
a cartridge holder for holding the disk cartridge, the cartridge holder having a holder opening to externally insert the disk cartridge into the cartridge holder and eject the disk cartridge out of the cartridge holder;
a pair of guide walls, which is arranged in a vicinity of the holder opening of the cartridge holder to define a direction in which the disk cartridge is inserted;
a disk motor for mounting and rotating the disk thereon;
a head for reading and/or writing information from/on the disk; and
a base for supporting the head and the disk motor,
wherein an unlocking portion, which is arranged on the guide walls, presses the locking/unlocking portion, thereby unlocking the first and second disk housing portions.

15. The disk drive of claim 14, wherein while the disk cartridge is being inserted into the cartridge holder to open the first and second disk housing portions, the unlocking portion goes inside the main groove and contacts with the protrusion in the main groove, thereby defining how deep the disk cartridge is inserted into the cartridge holder.

16. The disk drive of claim 15, wherein the disk cartridge has two side surfaces, only one of which has the main groove, and
wherein the unlocking portion is arranged on only one of the two guide walls and a minimum width of an interval between the unlocking portion and the other guide wall with no unlocking portions is smaller than a width of an interval between the top of the protrusion on the main groove and another of the two side surfaces with no main grooves.

17. The disk drive of claim 15, wherein the disk cartridge has two side surfaces, each of which has the main groove, and
wherein the unlocking portion is arranged on each of the two guide walls and
wherein a minimum width of a width controlling guide portion, including the unlocking portions, is smaller than a width of an interval between respective tops of the protrusions on the two main grooves.

18. The disk drive of claim 14, wherein the unlocking portion is a rib that has tapered sides, which are tilted with respect to directions in which the disk cartridge is inserted and ejected, on both ends.

* * * * *